United States Patent
Iida et al.

(10) Patent No.: US 10,355,947 B2
(45) Date of Patent: Jul. 16, 2019

(54) INFORMATION PROVIDING METHOD

(71) Applicant: PANASONIC INTELLECTUAL PROPERTY CORPORATION OF AMERICA, Torrance, CA (US)

(72) Inventors: Shigehiro Iida, Tokyo (JP); Kazunori Yamada, Aichi (JP); Mitsuhiro Aso, Osaka (JP); Michiko Sasagawa, Osaka (JP); Masayuki Hiromoto, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 683 days.

(21) Appl. No.: 14/770,117

(22) PCT Filed: May 13, 2014

(86) PCT No.: PCT/JP2014/002519
§ 371 (c)(1),
(2) Date: Aug. 25, 2015

(87) PCT Pub. No.: WO2014/185056
PCT Pub. Date: Nov. 20, 2014

(65) Prior Publication Data
US 2016/0057029 A1    Feb. 25, 2016

(30) Foreign Application Priority Data

May 16, 2013  (JP) ................................. 2013-104271

(51) Int. Cl.
*H04W 4/70*  (2018.01)
*H04L 12/26*  (2006.01)
(Continued)

(52) U.S. Cl.
CPC ............ *H04L 43/028* (2013.01); *G05B 15/02* (2013.01); *G06Q 10/00* (2013.01); *H04L 12/281* (2013.01);
(Continued)

(58) Field of Classification Search
None
See application file for complete search history.

(56) References Cited

U.S. PATENT DOCUMENTS

| 8,170,886 B2 * | 5/2012 | Luff | G06Q 10/04 |
| | | | 33/361 |
| 2007/0288841 A1 * | 12/2007 | Rohrabaugh | G06F 9/4443 |
| | | | 715/238 |

(Continued)

FOREIGN PATENT DOCUMENTS

| JP | 02-024796 | 1/1990 |
| JP | 02-280296 | 11/1990 |

(Continued)

OTHER PUBLICATIONS

Ruzelli et al. 'Real-Time Recognition and Profiling of Appliances through a Single Electricity Sensor'. SECON, 2010 7th Annual IEEE Communications Society Conference, Jun. 21, 2010, [retrieved on Mar. 5, 2018]. Retrieved from the Internet: <URL: http://ieeexplore.ieee.org/stamp/stamp.jsp?tp=&arnumber=5508244>.*

(Continued)

*Primary Examiner* — Sm A Rahman
*Assistant Examiner* — Dae Kim
(74) *Attorney, Agent, or Firm* — Greenblum & Bernstein, P.L.C.

(57) ABSTRACT

An information providing method is an information providing method for consumer electronics devices, a display device, and a server, all of which are connected via a public network, the information providing method including: (a)

(Continued)

receiving, by the server from the consumer electronics devices, information pieces on the consumer electronics devices; (b) filtering, by the server, the information pieces on the consumer electronics devices received in step (a), to obtain one or more filtered information pieces, and performing, by the server, processing for generating display information for display, by the display device, in a specific display format; and (c) transmitting, by the server, the display information generated in step (b) to the display device.

19 Claims, 66 Drawing Sheets

(51) Int. Cl.
*H04W 4/38* (2018.01)
*G06Q 10/00* (2012.01)
*H04L 12/28* (2006.01)
*H04L 29/08* (2006.01)
*G05B 15/02* (2006.01)

(52) U.S. Cl.
CPC ...... *H04L 12/2812* (2013.01); *H04L 12/2825* (2013.01); *H04L 67/12* (2013.01); *H04W 4/38* (2018.02); *H04W 4/70* (2018.02); *G05B 2219/2642* (2013.01)

(56) References Cited

U.S. PATENT DOCUMENTS

| | | | | |
|---|---|---|---|---|
| 2009/0313582 | A1* | 12/2009 | Rupsingh | G06F 3/04817 715/835 |
| 2010/0124939 | A1* | 5/2010 | Osborne | G06F 17/30905 455/466 |
| 2013/0057906 | A1 | 3/2013 | Hosoda | |
| 2013/0080898 | A1* | 3/2013 | Lavian | G06F 3/16 715/728 |
| 2013/0196297 | A1* | 8/2013 | Anwar | G06F 19/3475 434/236 |
| 2013/0264128 | A1* | 10/2013 | Plato | E05B 39/00 177/132 |
| 2013/0307702 | A1* | 11/2013 | Pal | A47L 15/0047 340/870.02 |
| 2014/0046675 | A1* | 2/2014 | Harwood | G06F 19/324 705/2 |
| 2014/0108978 | A1* | 4/2014 | Yu | G06F 3/0482 715/765 |
| 2014/0201655 | A1* | 7/2014 | Mahaffey | G06F 3/04817 715/765 |
| 2014/0214596 | A1* | 7/2014 | Acker, Jr. | G06Q 30/0633 705/26.8 |

FOREIGN PATENT DOCUMENTS

| | | |
|---|---|---|
| JP | 11-120473 | 4/1999 |
| JP | 2007-316813 | 12/2007 |
| JP | 2008-046934 | 2/2008 |
| JP | 2012-089014 | 5/2012 |
| JP | 2012-221205 | 11/2012 |
| JP | 2013-054528 | 3/2013 |

OTHER PUBLICATIONS

International Search Report (ISR) from International Searching Authority (Japan Patent Office) in International Patent Application No. PCT/JP2014/002519, dated Aug. 19, 2014.

Office Action from Japan Patent Office (JPO) in Japanese Patent Appl. No. 2015-516914, dated Oct. 2, 2018.

* cited by examiner

FIG. 2

| House ID | Nickname | Owned consumer electronics |
|---|---|---|
| H000-0001 | Devilish wife in Sapporo | Vacuum cleaner<br>Washing machine |
| H000-0002 | Kobacchi | Iron<br>Washing machine |
| H000-0003 | Hana | Induction cooktop<br>Rice cooker<br>Air conditioner |

FIG. 3

| House ID | Consumer electronics type | Event key | Event value | Date | Time |
|---|---|---|---|---|---|
| H000-0001 | Washing machine | Power | ON | 2013/3/1 | 9:00:11:457 |
| H000-0001 | Washing machine | Operating state | Washing state | 2013/3/1 | 9:02:22:876 |
| H000-0001 | Vacuum cleaner | Power | ON | 2013/3/1 | 9:03:04:125 |
| H000-0001 | Vacuum cleaner | Power | OFF | 2013/3/1 | 9:09:48:236 |
| H000-0002 | Dishwasher | Select mode | Small amount mode | 2013/3/1 | 9:11:33:498 |
| H000-0001 | Vacuum cleaner | Power | ON | 2013/3/1 | 9:12:24:901 |
| H000-0002 | Dishwasher | Operating state | Washing state | 2013/3/1 | 9:12:56:745 |
| H000-0003 | Iron | Power | ON | 2013/3/1 | 9:13:07:071 |
| H000-0001 | Vacuum cleaner | Power | OFF | 2013/3/1 | 9:16:30:258 |
| H000-0001 | Washing machine | Operating state | Rinsing state | 2013/3/1 | 9:20:45:985 |
| H000-0003 | Iron | Power | OFF | 2013/3/1 | 9:35:29:644 |
| H000-0001 | Washing machine | Operating state | Spinning state | 2013/3/1 | 9:40:26:329 |
| H000-0001 | Washing machine | Power | OFF | 2013/3/1 | 9:51:01:423 |

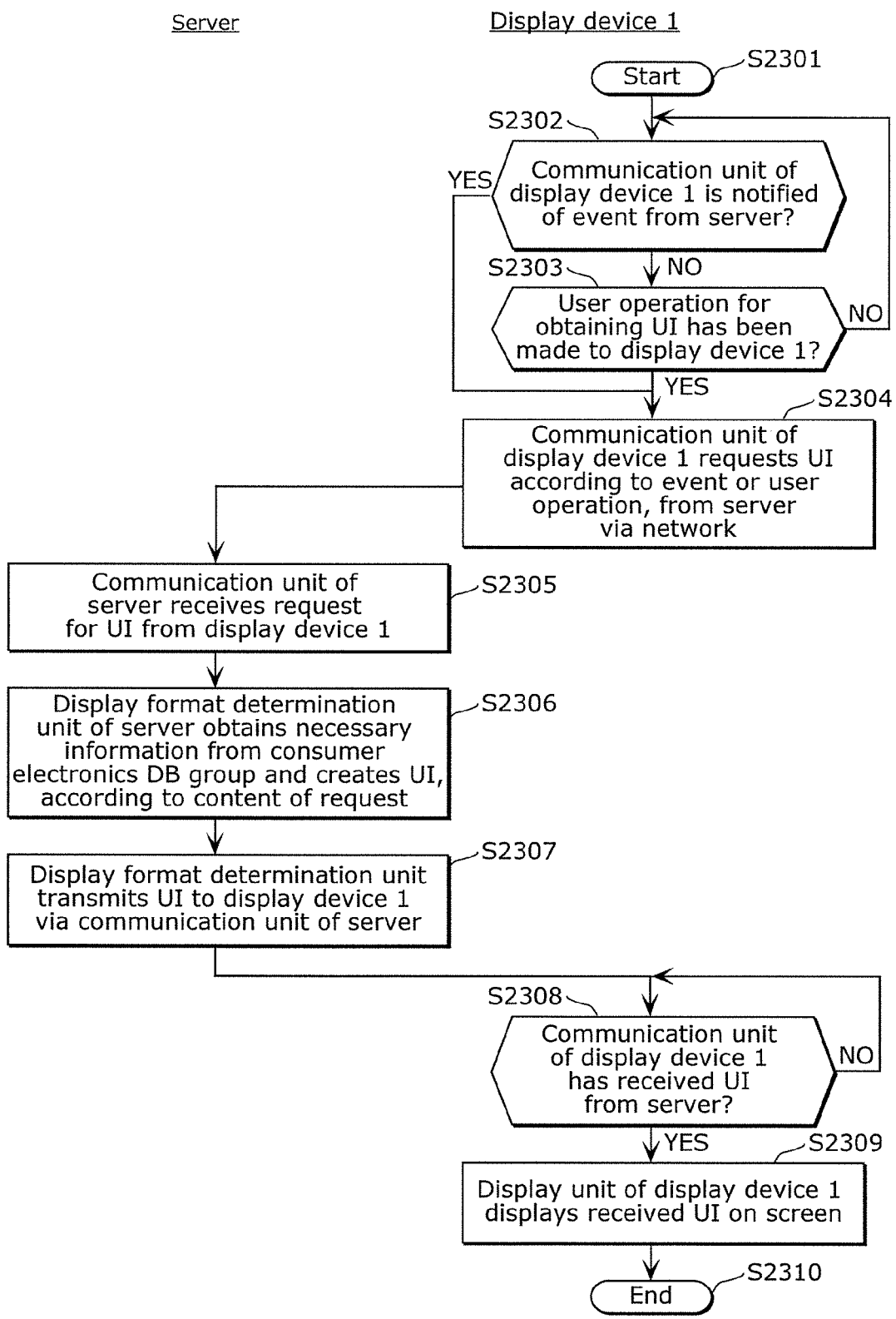

FIG. 9

| House ID | Address | The number of persons of household | Housing type |
|---|---|---|---|
| H000-0001 | Osaka-shi, Osaka | 4 | Detached house |
| H000-0002 | Minato-ku, Tokyo | 4 | Condominium |
| H000-0003 | Kadoma-shi, Osaka | 2 | Condominium |

Consumer electronics event aggregate table (Osaka)

| Consumer electronics type | Model number | The number of events | Total number of events |
|---|---|---|---|
| Washing machine | WH-100 | 21 | 124 |
|  | WH-200 | 30 |  |
|  | : | : |  |
| Vacuum cleaner | CL-220 | 18 | 32 |
|  | : | : |  |
| Iron | IR-100R | 6 | 22 |
|  | : | : |  |
| Hot water dispenser | PO-3001 | 7 | 12 |
|  | : | : |  |
| Air conditioner | AI-300X | 14 | 94 |
|  | : | : |  |
| : | : | : | : |

| Consumer electronics type | Model number | Occurrence frequency |
|---|---|---|
| Washing machine | WH-100 | 0.20 |
| | WH-200 | 0.32 |
| | ⋮ | ⋮ |
| Vacuum cleaner | CL-220 | 0.92 |
| | ⋮ | ⋮ |
| Iron | IR-100R | 0.60 |
| | ⋮ | ⋮ |
| Hot water dispenser | PO-3001 | 0.40 |
| | ⋮ | ⋮ |
| Air conditioner | AI-300X | 0.35 |
| | ⋮ | ⋮ |
| ⋮ | ⋮ | ⋮ |

| Consumer electronics type | Model number | Model number operating rate | Consumer electronics type operating rate |
|---|---|---|---|
| Washing machine | WH-100 | 21/0.20=105 | 198.75 |
| | WH-200 | 30/0.32=93.75 | |
| Vacuum cleaner | CL-220 | 18/0.92=10.87 | 103.25 |
| | ⋮ | ⋮ | |
| Iron | IR-100R | 6/0.60=10 | 22.47 |
| | ⋮ | ⋮ | |
| Hot water dispenser | PO-3001 | 7/0.40=17.5 | 38.66 |
| | ⋮ | ⋮ | |
| Air conditioner | AI-300X | 14/0.35=40 | 124.21 |
| | ⋮ | ⋮ | |
| ⋮ | ⋮ | ⋮ | ⋮ |

FIG. 13
| Consumer electronics icon type | Display size ratio |
|---|---|
| Washing machine | 1.00 |
| Vacuum cleaner | 0.52 |
| Iron | 0.11 |
| Hot water dispenser | 0.19 |
| Air conditioner | 0.62 |
| : | : |
2651, 2652
FIG. 14A
Before display update notified
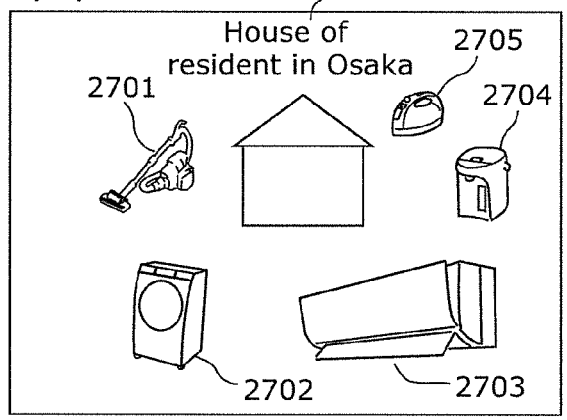
FIG. 14B
After display update notified
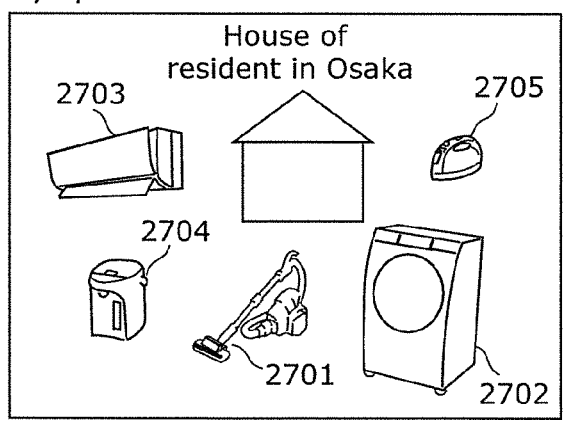

FIG. 16

| 3011 Category ID | 3012 Category display priority level | 3013 Consumer electronics type | 3014 Consumer electronics operating rate (times / day) | 3015 Operation state | 3016 Consumer electronics icon display priority level |
|---|---|---|---|---|---|
| Cleaning | 2 | Vacuum cleaner | 1.0 | OFF | 1 |
| | | Washing machine | 0.5 | OFF | 1 |
| Cooking | 1 | Induction cooktop | 3.0 | ON | 1 |
| | | Rice cooker | 5.0 | OFF | 2 |
| Beauty care | 3 | Facial sauna | 0.2 | OFF | 2 |
| | | Hair drier | 1.0 | OFF | 1 |

3017 — Cleaning row
3018 — Cooking row
3019 — Beauty care row

FIG. 19

| Category ID 3011 | Category display priority level 3012 | Consumer electronics type 3013 | Consumer electronics operating rate (times / day) 3014 | Operation state 3015 | Consumer electronics display priority level 3016 |
|---|---|---|---|---|---|
| Cleaning | 3 | Vacuum cleaner | 1.0 | OFF | 1 |
| Cooking | 2 | Washing machine | 0.5 | OFF | 1 |
| | | Induction cooktop | 3.0 | ON | 1 |
| | | Rice cooker | 5.0 | OFF | 2 |
| Beauty care | 1 | Facial sauna | 0.2 | ON | 1 |
| | | Hair drier | 1.0 | OFF | 2 |

When consumer electronics whose operating rate has less than certain value is operated, change category display priority level and consumer electronics display priority level to highest

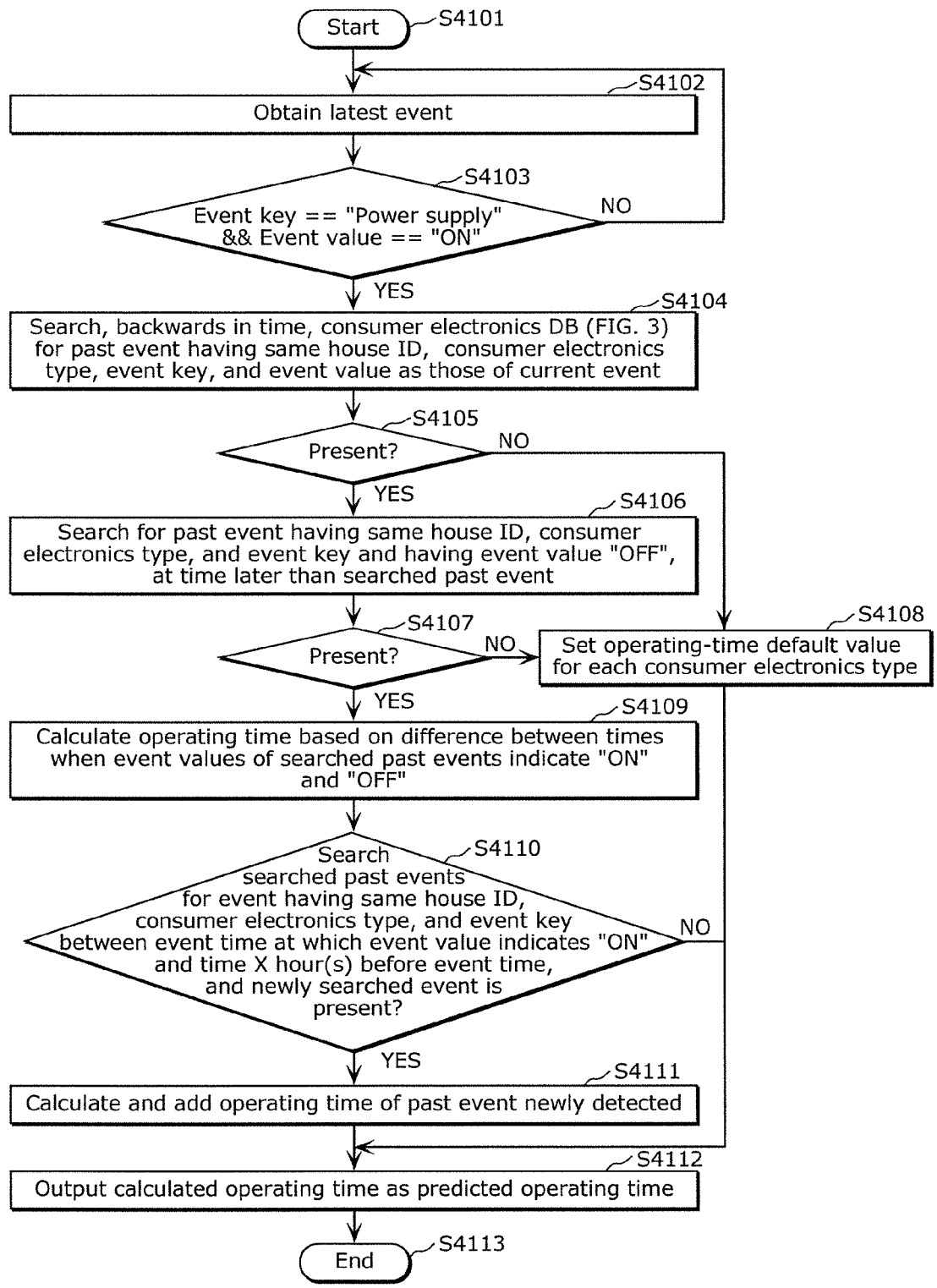

FIG. 22

| | House ID | Consumer electronics type | Event key | Event value | Date | Time |
|---|---|---|---|---|---|---|
| 2010 | H000-0001 | Washing machine | Power | ON | 2013/3/1 | 9:00 |
| 2020 | H000-0001 | Washing machine | Operating state | Washing state | 2013/3/1 | 9:02 |
| 2030 | H000-0001 | Vacuum cleaner | Power | ON | 2013/3/1 | 9:03 |
| 2040 | H000-0001 | Vacuum cleaner | Power | OFF | 2013/3/1 | 9:09 |
| 2050 | H000-0002 | Dishwasher | Select mode | Small amount mode | 2013/3/1 | 9:11 |
| 2060 | H000-0001 | Vacuum cleaner | Power | ON | 2013/3/1 | 9:12 |
| 2070 | H000-0002 | Dishwasher | Operating state | Washing state | 2013/3/1 | 9:12 |
| 2080 | H000-0003 | Iron | Power | ON | 2013/3/1 | 9:13 |
| 2090 | H000-0001 | Vacuum cleaner | Power | OFF | 2013/3/1 | 9:16 |
| 2100 | H000-0001 | Washing machine | Operating state | Rinsing state | 2013/3/1 | 9:20 |
| 2110 | H000-0003 | Iron | Power | OFF | 2013/3/1 | 9:35 |
| 2120 | H000-0001 | Washing machine | Operating state | Spinning state | 2013/3/1 | 9:40 |
| 2130 | H000-0001 | Washing machine | Power | OFF | 2013/3/1 | 10:01 |

FIG. 23

| House ID | Consumer electronics type | Event key | Event value | Date | Time |
|---|---|---|---|---|---|
| H000-0001 | Washing machine | Power | ON | 2013/3/1 | 9:00 |
| H000-0001 | Washing machine | Operating state | Washing state | 2013/3/1 | 9:02 |
| H000-0001 | Vacuum cleaner | Power | ON | 2013/3/1 | 9:03 |
| H000-0001 | Vacuum cleaner | Power | OFF | 2013/3/1 | 9:09 |
| H000-0002 | Dishwasher | Select mode | Small amount mode | 2013/3/1 | 9:11 |
| H000-0001 | Vacuum cleaner | Power | ON | 2013/3/1 | 9:12 |
| H000-0002 | Dishwasher | Operating state | Washing state | 2013/3/1 | 9:12 |
| H000-0003 | Iron | Power | ON | 2013/3/1 | 9:13 |
| H000-0001 | Vacuum cleaner | Power | OFF | 2013/3/1 | 9:16 |
| H000-0001 | Washing machine | Operating state | Rinsing state | 2013/3/1 | 9:20 |
| H000-0003 | Iron | Power | OFF | 2013/3/1 | 9:35 |
| H000-0001 | Washing machine | Operating state | Spinning state | 2013/3/1 | 9:40 |
| H000-0001 | Washing machine | Power | OFF | 2013/3/1 | 10:01 |

| Consumer electronics | Default user contact ratio (= Average operation time / operating time) | Reference to user contact tables according to functions |
|---|---|---|
| 4410 Vacuum cleaner | 1 | •——— |
| 4420 Washing machine | 0.05 | •——— |
| 4430 Iron | 0.9 | |

4401　　4402　　4403

(b)

Vacuum cleaner user contact table

| Operation | Necessity of user operation | Average operation time |
|---|---|---|
| 4440 In operation | 1 | - |
| 4450 [Input] Mode selection | 1 | 10 sec |
| 4460 [Input] Strength selection | 1 | 5 sec |

4405　　4406　　4407

(c)

Washing machine user contact table

| Operation | Necessity of user operation | Average operation time |
|---|---|---|
| 4470 In operation | 0.05 | - |
| 4480 [Input] Course selection | 1 | 30 sec |

4408　　4409　　4410

Operate using battery or environmental power

| House ID | Consumer electronics type | Event key | Event value | Date | Time | Additional information |
|---|---|---|---|---|---|---|
| H000-0001 | Coaster | Detection result | 20.5 g | 2013/3/1 | 9:00:11 :025 | Additional information |
| H000-0001 | Coaster | Detection result | 22.5 g | 2013/3/1 | 9:00:12 :032 | Additional information |
| H000-0001 | Coaster | Detection result | 24.0 g | 2013/3/1 | 9:00:13 :012 | Additional information |
|  |  |  |  |  |  |  |

(b)

Examples of additional information

| Coaster ID | Group ID | Public/ Private |  |  |  |  |
|---|---|---|---|---|---|---|
| C000-001 | G001-0030 | Private |  |  |  |  |
| C000-002 | G001-0030 | Private |  |  |  |  |
| C000-003 | G001-0055 | Public |  |  |  |  |
| C000-003 | Not assigned | Public |  |  |  |  |

FIG. 44

Examples of information obtained from coaster

| House ID | Consumer electronics type | Event key | Event value | Date | Time |
|---|---|---|---|---|---|
| H000-0001 | Coaster | Detection result | Cup placed 0 g (Cup ID) | 2013/3/1 | 9:00:11 :025 |
| H000-0001 | Coaster | Detection result | Pouring 20 g | 2013/3/1 | 9:00:12 :032 |
| H000-0001 | Coaster | Detection result | Finish pouring 250 g | 2013/3/1 | 9:00:13 :012 |
| H000-0001 | Coaster | Detection result | Lift cup | 2013/3/1 | 9:00:15 :023 |
| H000-0001 | Coaster | Detection result | Cup placed 200 g | 2013/3/1 | 9:00:18 :062 |
| | | | | | |
| | | | | | |

FIG. 48
| Set cup weight | Cup ID | Predicted amount of drink to be poured | The number of times cup is used | Main time period when cup is used | Favorite design of cup |
|---|---|---|---|---|---|
| 300 g | CID-001 | 200 g | 100 | 17:00:33 | Cup A |
| 200 g | CID-002 | 150 g | 20 | 12:35:35 | Cup B |
| 150 g | CID-003 | 80 g | 35 | 15:00:25 | Not registered |
|  |  |  |  |  |  |
FIG. 49
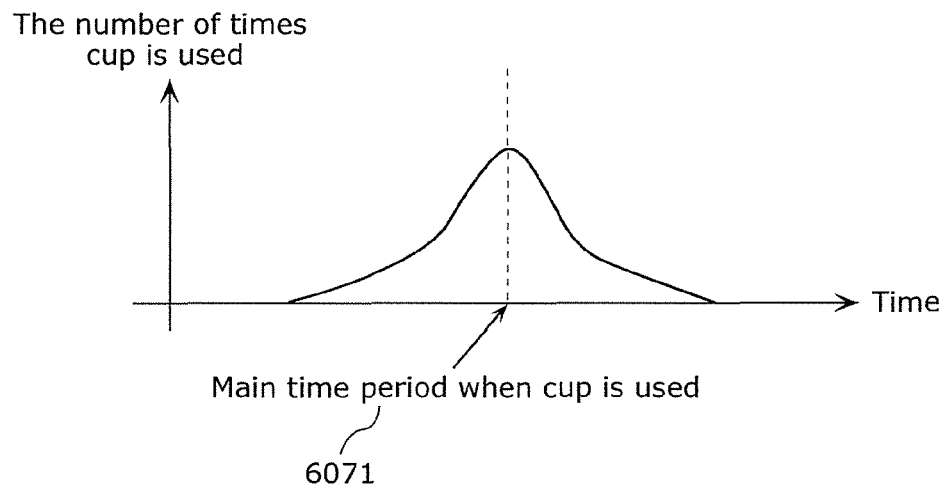
FIG. 50
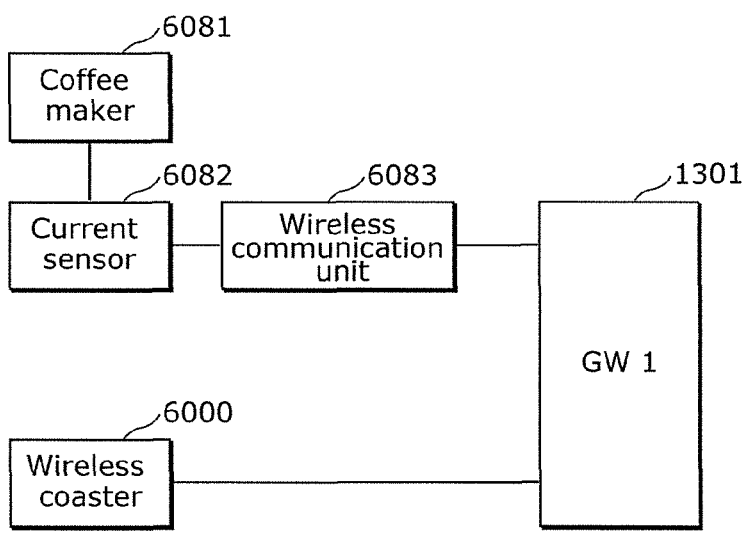

Add sound generator to toy car, baby bottle, and others

FIG. 60

| Acceleration threshold (mV/g) | Frequency (Hz) | Rhythm |
|---|---|---|
| X < -10.0 | 17 kHz | Repeat 1.0-sec sound 3 times at 0.5-sec intervals |
| -10.0 <= X < 10.0 | 18 kHz | Repeat 1.5-sec sound 3 times at 0.5-sec intervals |
| 10.0 <= X | 19 kHz | Repeat 2.0-sec sound 3 times at 0.5-sec intervals |
| Y < -10.0 | 20 kHz | Repeat 1.0-sec sound 3 times at 0.5-sec intervals |
| -10.0 <= Y < 10.0 | 21 kHz | Repeat 1.5-sec sound 3 times at 0.5-sec intervals |
| 10.0 <= Y | 22 kHz | Repeat 2.0-sec sound 3 times at 0.5-sec intervals |
| Z < -10.0 | 23 kHz | Repeat 1.0-sec sound 3 times at 0.5-sec intervals |
| -10.0 <= Z < 10.0 | 24 kHz | Repeat 1.5-sec sound 3 times at 0.5-sec intervals |
| 10.0 <= Z | 25 kHz | Repeat 2.0-sec sound 3 times at 0.5-sec intervals |

FIG. 61

| Recognition of mother's speech (7701) | State of child (7702) |
|---|---|
| Funny, laughing, enjoying | Laugh |
| Sad, don't cry, it hurts, unhappy | Cry |
| Space language, what are you saying?, what did you say?, what are you talking about? | Babble |
| Crawl, slither on stomach, bear crawl | Crawl |
| You are on your feet, you can stand | Stand |
| Bye-bye, you waved goodbye, wave your hand | Bye-bye |
| Smiling, smile, chuckle, giggle | Smile |
| Walking, you can walk, tootsy | Walk |
| Clapping, clap your hands | Clap |
| Selfish, no, stop | Shake head |
| Powder milk, milk, breast milk | Powder milk, mother's milk |
| Toy, stuffed toy | Toy |
| Weewee, wet | Weewee |
| Poo, do-do | Poo |

FIG. 65

| Distance between display device and microphone device (km) | Display effect speed (sec) |
|---|---|
| 0 km or more and 10 km or less | 1.0 |
| Longer than 10 km and 50 km or less | 1.5 |
| Longer than 50 km and 100 km or less | 2.0 |
| Longer than 100 km and 300 km or less | 2.5 |
| Longer than 300 km | 3.0 |

FIG. 66

| Elapsed time (min) 8201 | Display effect Transparency (%) 8202 |
|---|---|
| 0 min or more and 15 min or less | 0 |
| Longer than 15 min and 60 min or less | 10 |
| Longer than 60 min and 120 min or less | 30 |
| Longer than 120 min and 240 min or less | 50 |
| Longer than 240 min | 80 |

8203

Transparency 0% indicates opacity, and 100% indicates complete transparency

FIG. 68

| House ID | Date and time | State of child | Highest volume (dB) | Time (sec) | Residence area |
|---|---|---|---|---|---|
| H000-0001 | 2014.3.1 9:02 | Cry | 72 dB | 192 | Osaka |
| H000-0002 | 2014.3.1 9:16 | Smile | 70 dB | 21 | Hyogo |
| H000-0003 | 2014.3.1 9:18 | Crawl | 44 dB | 602 | Tokyo |
| H000-0004 | 2014.3.1 9:21 | Cry | 74 dB | 164 | Osaka |
| H000-0001 | 2014.3.1 9:29 | Cry | 70 dB | 272 | Osaka |
| H000-0005 | 2014.3.1 9:36 | Smile | 70 dB | 21 | Hyogo |
| H000-0006 | 2014.3.1 9:37 | Crawl | 44 dB | 470 | Kyoto |
| H000-0007 | 2014.3.1 9:40 | Cry | 78 dB | 186 | Osaka |
| H000-0005 | 2014.3.1 9:36 | Smile | 70 dB | 45 | Hyogo |
| H000-0008 | 2014.3.1 9:37 | Crawl | 44 dB | 432 | Kyoto |
| H000-0009 | 2014.3.1 9:40 | Cry | 74 dB | 193 | Osaka |
| ⋮ | | | | | |

FIG. 69A

| House ID | State of child | Highest volume (dB) | Time (sec) |
|---|---|---|---|
| H000-0001 | Cry | 72 dB | 464 |
| H000-0004 | Cry | 74 dB | 164 |
| H000-0007 | Cry | 78 dB | 186 |
| H000-0009 | Cry | 74 dB | 193 |

FIG. 69B

| House ID | Highest volume ranking | Time ranking |
|---|---|---|
| H000-0001 | 3rd | 1st |
| H000-0004 | 2nd | 4th |
| H000-0007 | 1st | 3rd |
| H000-0009 | 2nd | 2nd |

INFORMATION PROVIDING METHOD

TECHNICAL FIELD

The present disclosure relates to an information providing method, and in particular to an information providing method for plural consumer electronics devices, a display device, and a server, all of which are connected via a network.

BACKGROUND ART

In recent years, an improvement in a home network environment has promoted selling consumer electronics devices having a network connecting function, such as televisions, recorders, and even air conditioners and refrigerators, in addition to personal computers.

Accordingly, it is expected that demand will rise for collecting various types of information via a network and utilizing the collected information.

For example, Patent Literature (PTL) 1 discloses an information display method for a screen of a central monitoring control device in a monitoring control system for plural plants. According to PTL 1, various types of information can be displayed to allow a monitoring person to readily check the information at one time, without the person separately opening another screen in order to check the information.

CITATION LIST

Patent Literature

[PTL 1] Japanese Unexamined Patent Application Publication No. 2007-316813

SUMMARY OF INVENTION

Technical Problem

However, the information display method disclosed in PTL 1 has a problem that while various types of information of a certain amount can be displayed in a superimposed manner, various types of voluminous information, that is, so-called big data cannot be displayed in a readily viewable manner.

The present disclosure addresses such a problem, and provides an information providing method which can provide even various types of voluminous information in a readily viewable manner.

Solution to Problem

An information providing method according to an aspect of the present disclosure is an information providing method for consumer electronics devices, a display device, and a server, all of which are connected via a network, the information providing method including: (a) receiving, by the server from the consumer electronics devices, information pieces on the consumer electronics devices; (b) filtering, by the server, the information pieces on the consumer electronics devices received in step (a), to obtain one or more filtered information pieces, and performing, by the server, processing for generating display information for display, by the display device, in a specific display format; and (c) transmitting, by the server, the display information generated in step (b) to the display device.

It should be noted that these general and specific aspects may be implemented using a system, a method, an integrated circuit, a computer program, a computer-readable recording medium such as a CD-ROM, or any combination of systems, methods, integrated circuits, computer programs, and recording media.

Advantageous Effects of Invention

The information providing method and others according to the present disclosure can provide even various types of voluminous information in a readily viewable manner.

BRIEF DESCRIPTION OF DRAWINGS

FIG. 2 illustrates examples of house IDs and attribution information which are stored in a consumer electronics DB group in Embodiment 1.

FIG. 3 illustrates examples of event logs including state changes of consumer electronics devices and user operation stored in the consumer electronics DB group in Embodiment 1.

FIG. 5 is a flowchart illustrating an example of processing by the display device to obtain a user interface (UI), in Embodiment 1.

FIG. 9 illustrates an example of information stored in a house DB in Embodiment 1.

FIG. 10 illustrates an example of a consumer electronics event aggregate table of Osaka in Embodiment 1.

FIG. 11 illustrates an example of a consumer electronics event occurrence frequency table in Embodiment 1.

FIG. 12 illustrates examples of operating rates for consumer electronics types in Embodiment 1.

FIG. 13 illustrates an example of content of a display change notification to a display unit in Embodiment 1.

FIG. 14A illustrates an example of a UI displayed by the display unit before the processing in FIG. 8 is performed.

FIG. 14B illustrates an example of a UI displayed by the display unit after the processing in FIG. 8 is performed.

FIG. 16 illustrates an example of information stored in a consumer electronics category DB in Embodiment 2.

FIG. 19 illustrates an example of information stored in a consumer electronics category DB in Embodiment 2.

FIG. 21 is a flowchart illustrating an example of processing by a consumer electronics operating-time prediction unit to predict an operating time of a consumer electronics device, in Embodiment 3.

FIG. 22 illustrates an example of a method for calculating an operating time from event logs stored in a consumer electronics DB group in Embodiment 3.

FIG. 23 illustrates an example of a method for calculating an operating time from event logs stored in a consumer electronics DB group in Embodiment 3.

FIG. 24 illustrates in (a) to (c) examples of consumer electronics operation ratios stored in the consumer electronics DB group in Embodiment 3.

FIG. 39 illustrates in (a) and (b) an example of information obtained from the coaster in Embodiment 5.

FIG. 44 illustrates an example of information obtained from the coaster in Embodiment 5.

FIG. 48 illustrates an example of information stored in a cup DB in Embodiment 5.

FIG. 49 illustrates an example of use frequency information for calculating a main time period when a cup is used, in Embodiment 5.

FIG. 50 illustrates an example of the configuration of a system which uses coffee maker use information and coaster information at the same time, in Embodiment 5.

FIG. 60 illustrates an example of a table used to determine a sound to be output from the sound generator A in Embodiment 6.

FIG. 61 illustrates examples of states of a child associated with recognized mother's speech according to Embodiment 6.

FIG. 65 illustrates an example of the speed of a display effect according to the positional relationship between the network-connected microphone device and the display device in Embodiment 6.

FIG. 66 illustrates an example of a display effect according to an elapsed time from an event is notified to the display device in Embodiment 6.

FIG. 68 illustrates examples of events notified from the network-connected microphone device and stored in a consumer-electronics DB group, in Embodiment 6.

FIG. 69A illustrates examples of results of aggregating events stored in the consumer-electronics DB group of the server, in Embodiment 6.

FIG. 69B illustrates examples of results of aggregating events stored in the consumer-electronics DB group of the server, in Embodiment 6.

Figure 1:
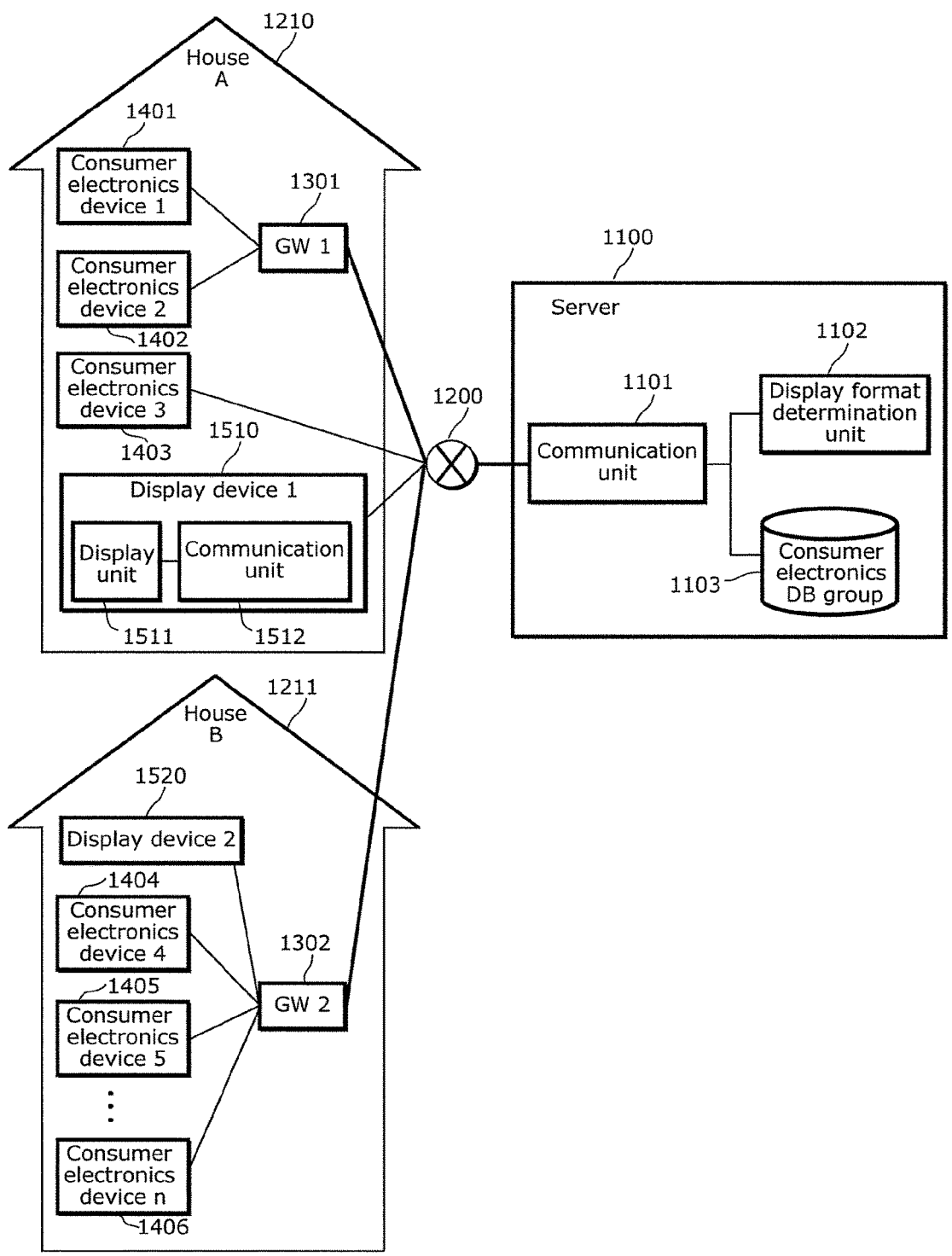
FIG. 1 illustrates an example of the configuration of an information providing system in Embodiment 1

DESCRIPTION OF EMBODIMENTS (Underlying Knowledge Forming Basis of the Present Invention)

In recent years, an improvement in a home network environment has promoted selling consumer electronics devices having a network connecting function, such as televisions, recorders, and even air conditioners and refrigerators, in addition to personal computers.

Accordingly, a function of giving centralized control of consumer electronics devices connected to the home network and a function of monitoring, for instance, power consumption of individual consumer electronics devices are also provided. Furthermore, a service for controlling consumer electronics devices even away from home by using the mobile environment has also been introduced.

However, such a network of consumer electronics devices merely allows connection and utilization of plural consumer electronics devices inside one house, and does not support a service involving consumer electronics devices connected to the network of another house.

It is expected that in the near future, information on consumer electronics devices connected to the network at individual houses is exchanged via a wide network, thus collecting various types of information (so-called big data) on the consumer electronics devices such as logs of the consumer electronics devices. The inventors consider that new services can be started using the collected information, with which, for example, use states of consumer electronics devices at a third person's house are obtained and used for reference of a user him/herself when the user uses his/her own consumer electronics device, and a screen transition is made to a screen showing a new service such as another social networking service (SNS). The inventors believe that such new services can create a completely new use style of consumer electronics devices for users of the consumer electronics devices.

In order to achieve this, first, it is preferable to prepare a portal screen so that a user at each house can collectively view information on consumer electronics devices at plural houses connected to a wide network, through a display device at his/her house, for instance. As a result, not only a user can readily transition the screen to a screen showing a new service such as another SNS and can be readily informed of the use states of consumer electronics devices at plural houses including his/her house, but also the user can utilize various services using the information as the starting point.

For example, PTL 1 discloses an information display method for a screen of, for instance, a central monitoring control device in a monitoring control system for plural plants. PTL 1 discloses a technique for displaying plural pieces of variable part display information such as alarm information being superimposed on fixed part display information such as a map of the plants in a time-sharing manner, in the central monitoring control device used for the plants or the like. Accordingly, various types of information can be displayed such that a monitoring person can readily check the information at one time without separately opening other screens to check such information.

However, the information display method disclosed in PTL 1 has a problem that various types of voluminous information, that is, so-called big data cannot be displayed in a readily viewable manner, although a certain amount of various types of information can be superimposed and displayed.

In other words, for example, if information on plural consumer electronics devices simultaneously connected to a network is collected from many houses across Japan, such information to be collected has a wide variety and is voluminous. Accordingly, as disclosed in PTL 1, merely such a display switching method using time-sharing screen display does not allow various types of voluminous information which is so-called big data cannot be displayed in a readily viewable manner.

In view of this, in order to display, within one screen in a readily viewable manner, big data such as information on, for instance, consumer electronics devices connected to a network, the inventors have created the present invention to achieve an information providing method for first, effectively selecting information to be displayed according to a purpose of use, and next displaying the selected information in a readily viewable manner and also in a manner such that the screen readily transitions to a next service screen.

The present disclosure has been achieved in view of the above circumstance, and provides an information providing method for providing even various types of voluminous information in a readily viewable manner.

An information providing method according to an aspect of the present disclosure is an information providing method for consumer electronics devices, a display device, and a server, all of which are connected via a network, the information providing method including: (a) receiving, by the server from the consumer electronics devices, information pieces on the consumer electronics devices; (b) filtering, by the server, the information pieces on the consumer electronics devices received in step (a), to obtain one or more filtered information pieces, and performing, by the server, processing for generating display information for display, by the display device, in a specific display format; and (c) transmitting, by the server, the display information generated in step (b) to the display device.

Accordingly, an information providing method can be achieved which can provide even various types of voluminous information in a readily viewable manner.

Further, the information providing method can provide various types of voluminous information on consumer electronics devices and others connected to the network in plural houses, on a portal screen readily viewable for a user in each house according to the purpose of later use.

It should be noted that "consumer electronics and others" in the statement, information on consumer electronics and others connected to the network, may include not only AV consumer electronics devices, such as televisions and recorders, and so-called white home appliances such as air conditioners and refrigerators, but also any hardware and software which are connected to a network and can communicate the device's own data, such as beauty care consumer electronics devices, health-care devices, and digital cameras. Thus, a near field communication (NFC) sensor, for instance, which can communicate data by machine to machine (M2M) may be included.

In addition, "network" includes a mobile network outside, in addition to home wired and wireless networks and short distance communications such as Bluetooth (registered trademark), infrared ray communication, ZigBee, and NFC, and any type of network can be adopted which allows one-way or two-way communication of device data.

Furthermore, any type of "display device" can be adopted with which a user can view information, such as mobile phones, smartphones, and tablet terminals, in addition to display screens of individual consumer electronics devices, and televisions, personal computers, and projectors which are connected to a network.

For example, the information providing method may further include (d) displaying, by the display device on a display screen of the display device in the specific display format, one or more objects associated with, among the consumer electronics devices, one or more consumer electronics devices including the one or more filtered information pieces, based on the display information transmitted by the server.

Here, for example, step (b) may include: (b-i) aggregating the received information pieces on the consumer electronics devices per category, at certain time intervals or when a certain number of the information pieces on the consumer electronics devices are received; and (b-ii) calculating display format information indicating the specific display format, using a result of the aggregation, the specific display format including a display size and a display position of each of one or more objects associated with, among the consumer electronics devices, one or more consumer electronics devices including the one or more filtered information pieces, wherein in step (c), the display information is transmitted to the display device, the display information including the display format information.

For example, in the step (b-i), the received information pieces on the consumer electronics devices may be aggregated according to categories determined based on information on a house of a user of the consumer electronics devices, the information including geographic information including an area, a family structure, a total number of family members, and a housing type.

For example, in step (a), the information pieces on and transmitted by the consumer electronics devices may be received when states of the consumer electronics devices change, in step (b-i), an operating rate for each of types of the consumer electronics devices may be further estimated based on a total number of times the information pieces on the consumer electronics devices are received in step (a), and in step (b-ii), the display format information may be calculated based on the operating rate.

For example, in step (b-ii), the display format information indicating the specific display format may be calculated, the specific display format being independent of a size of a display screen of the display device and including the display position and the display size which are a relative display position and a relative display size on the display screen.

For example, in step (a), the received information pieces on the consumer electronics devices may be stored in a database, step (b) may further include (b-iii) assigning a category ID indicating a category type to each of the information pieces on the consumer electronics devices received in step (a), and determining a category display priority level indicating a display priority level of the category type and a consumer-electronics display priority level indicating a display priority level of each of the consumer electronics devices, based on the information pieces on the consumer electronics devices received in step (a) and the stored information pieces on the consumer electronics devices, in step (b), the processing for generating the display information may be performed, the display information including the assigned category ID, the determined category display priority level, and the determined consumer-electronics display priority level, and in step (d), based on the display information, one or more consumer electronics devices having an identical category ID among the consumer electronics devices may be displayed in a group on the display screen, and an information piece on a consumer electronics device having a category ID given a higher category display priority level is displayed in a larger size on the display screen.

For example, in step (b-iii), the category display priority level may be determined according to a sum total of frequencies of use of the one or more consumer electronics devices having the identical category ID.

For example, in step (b), when a user uses a consumer electronics device a frequency of use of which is equal to or below a frequency of use determined in advance, the category display priority level of a category ID of the consumer electronics device used by the user may be temporarily set higher than a predetermined value.

For example, in step (b-iii), a category ID indicating an identical category type may be assigned to two or more of the consumer electronics devices which are used in a preset time period at a preset frequency of use or more frequently than the preset frequency of use.

For example, in step (d), based on the consumer-electronics display priority level, one or more icons representing the one or more consumer electronics devices having the identical category ID may be displayed in a group on the display screen, and among the one or more icons representing the one or more consumer electronics devices, an icon associated with a consumer electronics device given a higher consumer-electronics display priority level may be further displayed in a larger size.

For example, step (b) may further include: (b-iv) predicting a consumer-electronics operating time for each of the consumer electronics devices, based on the information pieces on the consumer electronics devices received in step (a), the consumer-electronics operating time indicating a time period in which the consumer electronics device has operated; and (b-v) weighting the consumer-electronics operating time with a user operation time to calculate a display index value for determining a display size and a display position of each of one or more consumer-electronics icons that are the one or more objects associated with the one or more consumer electronics devices including the one or more filtered information pieces, and in step (d), based on the display index value transmitted by the server, the display size and the display position of each of the one or more consumer-electronics icons on the display screen may be determined, and the one or more consumer-electronics icons may be displayed on the display screen.

For example, in step (d), an icon indicating that a user operation is performed may be displayed near a consumer-electronics icon associated with a consumer electronics device on which the user operation is performed among the one or more consumer-electronics icons.

For example, in step (d), the one or more consumer-electronics icons and a person icon selected, in accordance with a display priority level that is predetermined, from among person icons representing users who are display targets, may be superimposed on a background image and displayed on the display screen, as the specific display format, and the display priority level may be determined using information pieces pertaining to the users, the information pieces being the information pieces on the consumer electronics devices received in step (a).

For example, the display priority level may be determined using, as the information pieces on the consumer electronics devices, an operating time of each of the consumer electronics devices.

For example, the display priority level may be determined using, as the information pieces on the consumer electronics devices, a cumulative operating time of each of the consumer electronics devices.

For example, in step (d), the background image may be further deformed and displayed to avoid overlapping of the person icons or the consumer-electronics icons.

For example, in step (d), when the consumer-electronics icons displayed are switched after the background image is deformed and displayed, a deformed shape of the background image may be further restored to an original shape, and if consumer-electronics icons superimposed and displayed on the background image in the original shape overlap, the background image may be deformed again and displayed.

For example, the background image may be a map.

For example, the information providing method may further include: (e) measuring, by a first consumer electronics device, a change in weight of an object, the first consumer electronics device having a weight measuring function and being one of the consumer electronics devices; and (f) transmitting weight information indicating the change in weight measured in step (e) and an identifier for uniquely identifying the first consumer electronics device, to the server via the network, wherein in step (a), the transmitted identifier of the first consumer electronics device and the transmitted weight information may be received, step (b) may further include (b-vi) estimating, from a change pattern of the received weight information, a state of the object for which the measurement is performed by the first consumer electronics device, in step (b), the display information for the display device to display, in the specific display format, display content in accordance with the state of the object estimated in step (b-vi) may be generated, and in step (d), based on the display information, an avatar of a user in relation to the object may be changed in accordance with the display content, among avatars displayed on the display screen.

For example, in step (e), a weight of a cup may be measured by the cup being placed on the first consumer electronics device, and in step (b-vi), whether a user of the first consumer electronics device has placed the cup on the first consumer electronics device or lifted the cup from the first consumer electronics device may be estimated, as the state of the object, from the change pattern of the received weight information.

For example, in step (b-vi), from the change pattern of the received weight information, the weight of the object used by a user of the first consumer electronics device may be estimated, step (d) may further include (d-i) comparing, based on the display information, the estimated weight of the object with images registered in advance according to the weight of the object, and in step (d), an image showing the object in relation to the avatar displayed on the display screen may be changed to an image according to the weight of the object estimated in step (d-i).

For example, in step (e), a second consumer electronics device having an electric-current amount measuring function may further measure an amount of electric current flowing through a third consumer electronics device, in step (f), the amount of electric current flowing through the third consumer electronics device measured in step (e) may be further transmitted to the server, step (d) may further include (d-ii) disposing based on the display information, near the avatar displayed on the display screen, information indicating the third consumer electronics device which is determined to be used by the second consumer electronics device measuring the amount of electric current, and which is used within a given time difference from when the first consumer electronics device is used, and in step (d-ii), how far the information indicating the third consumer electronics device is disposed away from the first consumer electronics device may be changed according to a difference between an operation time of the third consumer electronics device estimated from the amount of electric current and a time at which the first consumer electronics device is used and which is estimated from the change pattern of the weight information.

For example, the information providing method may further include: (g) collecting a sound by a fourth consumer electronics device having a speech recognition function among the consumer electronics devices, to perform speech recognition; and (h) determining a state of an object, based on the sound recognized in step (g), wherein in step (a), the state of the object may be received as the information pieces on the consumer electronics devices, and in step (b), the display information for the display device to display, in the specific display format, display content according to the received state of the object may be generated.

For example, in step (g), a sound generated by a sound generator included in a fifth consumer electronics device used by the object may be collected, and the state of the object which uses the fifth consumer electronics device may be determined based on the sound recognized in step (g).

For example, in step (h), the state of the object may be further determined based on a word included in the sound recognized in step (g), in step (a), the state of the object may be further received, and in step (b), the display information for the display device to display, in the specific display format, display content according to the received state of the object may be further generated.

It should be noted that these general or specific aspects may be implemented using a system, a method, an integrated circuit, a computer program, a computer-readable recording medium such as a CD-ROM, or may be implemented using an arbitrary combination of systems, methods, integrated circuits, computer programs, or recording media.

The following specifically describes an information providing method and others according to an aspect of embodiments of the present disclosure, with reference to the drawings.

Each of the exemplary embodiments described below shows a specific example of the present disclosure. The numerical values, shapes, materials, constituent elements, the arrangement and connection of the constituent elements, steps, the processing order of the steps, and the like described in the following embodiments are mere examples, and thus are not intended to limit the present invention. Therefore, among the constituent elements in the following exemplary embodiments, constituent elements not recited in any of the independent claims defining the most generic part of the inventive concept are described as arbitrary constituent elements.

Embodiment 1

The present embodiment describes a method for collecting, as events, operation information and state change information of a consumer electronics device in a house which are generated by, for instance, user operation, and creating an information-display screen for sharing the events on a social network.

[Configuration]

FIG. 1 illustrates an example of the configuration of an information providing system in Embodiment 1. An information providing system illustrated in FIG. 1 includes plural consumer electronics devices, display devices, and a server (1100) all of which are connected via a public network (1200).

In a house A (1210), a display device 1 (1510), a gateway (GW) 1 (1301), and consumer electronics devices 1 (1401), 2 (1402), and 3 (1403) which are plural consumer electronics devices are disposed. In the house A (1210), event information which includes state changes which have occurred in the consumer electronics devices 1 (1401) and 2 (1402) in the house A (1210), which are registered in the GW 1 (1301) in advance, and user operation on the consumer electronics devices are transmitted to the server (1100) via the GW 1 (1301) and the public network (1200). Furthermore, event information on an event which has occurred in the consumer electronics device 3 (1403) is directly transmitted to the server (1100) via the public network (1200), but not via the GW 1 (1301).

In a house B (1211), a display device 2 (1520), a GW 2 (1302), and consumer electronics devices 4 (1404), 5 (1405), and up to n (1406) which are plural consumer electronics devices are disposed.

In the house B (1211), event information which includes state changes which have occurred in the consumer electronics devices 4 (1404), 5 (1405), and up to n (1406) in the house B (1211), which are registered in the GW 2 (1302) in advance, and user operation on the consumer electronics devices are transmitted to the server (1100) via the GW 2 (1302) and the public network (1200).

The server (1100) includes a communication unit (1101), a display format determination unit (1102), and a consumer electronics DB group (1103).

The communication unit (1101) receives information pieces on plural consumer electronics devices from the plural consumer electronics devices. The communication unit (1101) transmits display information created (generated) by the display format determination unit (1102) to a display device. The communication unit (1101) receives information pieces on plural consumer electronics devices which are separately transmitted by the consumer electronics device when the state of each of the plural consumer electronics devices has changed.

The hardware configuration of the server (1100) (in particular, the communication unit (1101) and the display format determination unit (1102)) includes a first memory and a CPU, for example. The first memory stores therein, for example, a program for achieving a function as the communication unit (1101) and a program for achieving a function as the display format determination unit (1102). The first memory is a readable recording medium or a readable and writable recording medium, for example. Examples of the recording medium include a semiconductor memory, an optical disc, a hard disk, and others.

The server (1100) has a configuration of, for example, reading the above programs from the first memory and causing the CPU to execute the programs, thus allowing the communication unit (1101) and the display format determination unit (1102) to function. Although the above example shows a configuration of causing the CPU to execute the program for achieving a function as the communication unit (1101) and the program for achieving a function as the display format determination unit (1102), the present embodiment is not limited to this. For example, the configuration may include a dedicated signal processing circuit which functions as the communication unit (1101) and a dedicated signal processing circuit which functions as the display format determination unit (1102).

The server (1100) further includes a memory (not illustrated) which stores the consumer electronics DB group (1103). The memory which stores the consumer electronics DB group (1103) is a readable and writable recording medium, for example. Examples of the readable and writable recording medium include a semiconductor memory, an optical disc, a hard disk, and others.

In the present embodiment, the communication unit (1101) receives event information of consumer electronics devices transmitted from the house A (1210) and the house B (1211), and stores the received event information into the consumer electronics DB group (1103). The communication unit (1101) provides screen information created (generated) by the display format determination unit (1102) in response to a request from the display device 1 (1510).

The display format determination unit (1102) filters information pieces on plural consumer electronics devices received by the communication unit (1101), and performs processing for generating display information for a display device to display information in a specific display format.

More specifically, the display format determination unit (1102) aggregates, per category, information pieces on plural consumer electronics devices received by the communication unit (1101) at certain time intervals or when the communication unit (1101) receives a certain number of information pieces on plural consumer electronics devices. The display format determination unit (1102) calculates, using the aggregation result, display format information indicating the specific display format which includes display sizes and display positions of objects associated with consumer electronics devices and including filtered information on one or more consumer electronics devices.

Here, the display format determination unit (1102) may, for example, aggregate the received information pieces on the consumer electronics devices according to categories determined based on information on a house of a user of the consumer electronics devices, the information including geographic information including an area, a family structure, a total number of family members, and a housing type. Further, the display format determination unit (1102) may estimate an operating rate for each of types of the consumer electronics devices, based on a total number of times the information pieces on the consumer electronics devices are received by the communication unit (1101), and calculate the display format information, based on the estimated operating rate. It should be noted that the display format determination unit (1102) calculates the display format information indicating the specific display format independent of a size of a display screen of the display device and including a relative display position and a relative display size on the screen.

In the present embodiment, the display format determination unit (1102) retrieves event information which a user desires from the consumer electronics DB group (1103), for example, based on information set by the user who owns the display device 1 (1510), and creates screen information using information pieces on houses, based on a type of event information and frequency information. The display format determination unit (1102) provides screen information created via the communication unit (1102) in response to a response from the display device 1 (1510). The display format determination unit (1102) regularly provides the display device 1 (1510) with screen update information, based on a type of event information and frequency information.

The display device 1 (1510) includes a display unit (1511) and a communication unit (1512). It should be noted that the display device 1 (1510) may be a device which can display screen information, such as a television, a smart phone, or a personal computer.

The display unit (1511) displays information on a screen (display screen). More specifically, the display unit (1511) displays, on the display screen of the display device 1 (1510) in the specific display format, based on the display information transmitted by the server (1100), one or more objects associated with one or more consumer electronics devices including the one or more filtered information pieces.

The communication unit (1512) obtains a user interface to be displayed on a screen, and receives a update notification of display content.

The display device 1 (1510) includes a second memory and a CPU as a hardware configuration, for example. The second memory stores a program for achieving a function as the display unit (1511) and a program for achieving a function as the communication unit (1512), for example. Examples of the second memory include a readable recording medium and a readable and writable recording medium. Examples of the recording medium include a semiconductor memory, an optical disc, a hard disk, and others.

The display device 1 (1510) has a configuration of reading the above programs from the memory and causing the CPU to execute the programs, thus allowing the display unit (1511) and the communication unit (1512) to function.

Although the above example describes a configuration of causing the CPU to execute a program for achieving a function as the display unit (1511) and a program for achieving a function as the communication unit (1512), the present embodiment is not limited to this. For example, the configuration may include a dedicated signal processing circuit which functions as the display unit (1511), and a dedicated signal processing circuit which functions as the communication unit (1512).

Furthermore, the program for achieving a function as one of the display unit (1511) and the communication unit (1512) may be stored in the second memory, and the other may be configured using a dedicated signal processing circuit.

The GW 1 (1301) and the GW 2 (1302) may be access points of a wireless LAN, or dedicated GWs connected to devices by low power radio and furthermore connected to the server (1100) via the public network (1200) such as the Internet, for example.

[Information Stored in Consumer Electronics DB Group]

FIG. 2 illustrates examples of house IDs and attribution information which are stored in the consumer electronics DB group (1103) in Embodiment 1. FIG. 2 illustrates house IDs (2001), nicknames (2002), and owned consumer electronics devices (2003), as examples of information stored in the consumer electronics DB group (1103) in FIG. 1.

Identifiers for uniquely identifying the house A (1210) and the house B (1211) are stored in a house ID (2001), and names determined for houses are stored in a nickname (2002). Consumer electronics devices such as consumer electronics devices 1 (1401) and 4 (1404) owned in the houses are stored in a owned consumer electronics device (2003).

FIG. 3 illustrates examples of event logs including state changes of consumer electronics devices and user operation stored in the consumer electronics DB group in Embodiment 1. FIG. 3 illustrates examples of event logs stored in the consumer electronics DB group (1103), and event information of consumer electronics devices transmitted from the houses A (1210) and B (1211) in FIG. 1 is stored.

One event information piece is stored in each one of rows (2010) to (2130). Identifiers (identification IDs) for uniquely identifying the houses A (1210) and B (1211) are stored in a house ID (2001), as with FIG. 2. The types of consumer electronics devices in which events stored as event information have occurred are stored in a consumer electronics type (2202). The reasons why event information, such as user operation on consumer electronics devices and state changes of consumer electronics devices, is notified are stored in an event key (2203). Details of user operation and state changes of consumer electronics devices are stored in an event values (2204). Year, month, day, time, second, and millisecond when events in the rows of corresponding event information pieces have occurred are stored in a date (2205) and a time (2206).

[Example of Screen Information]

Figure 4A:
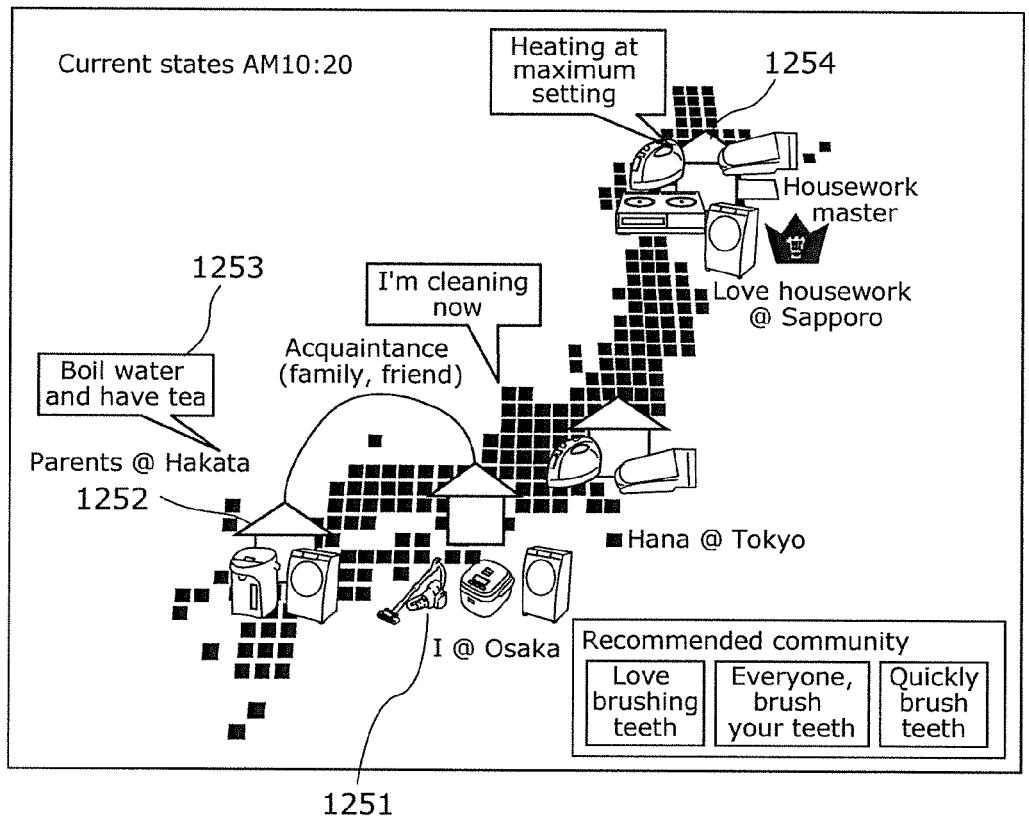
FIG. 4A illustrates an example of screen information of an information-sharing service in Embodiment 1.
Figure 4B:
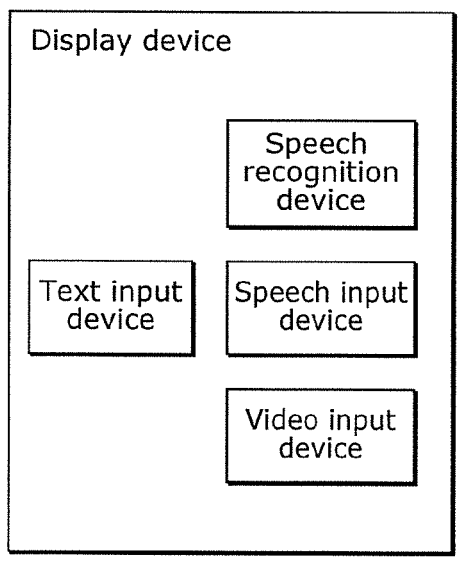
FIG. 4B illustrates an example of the configuration of a display device in Embodiment 1.
Figure 4C:
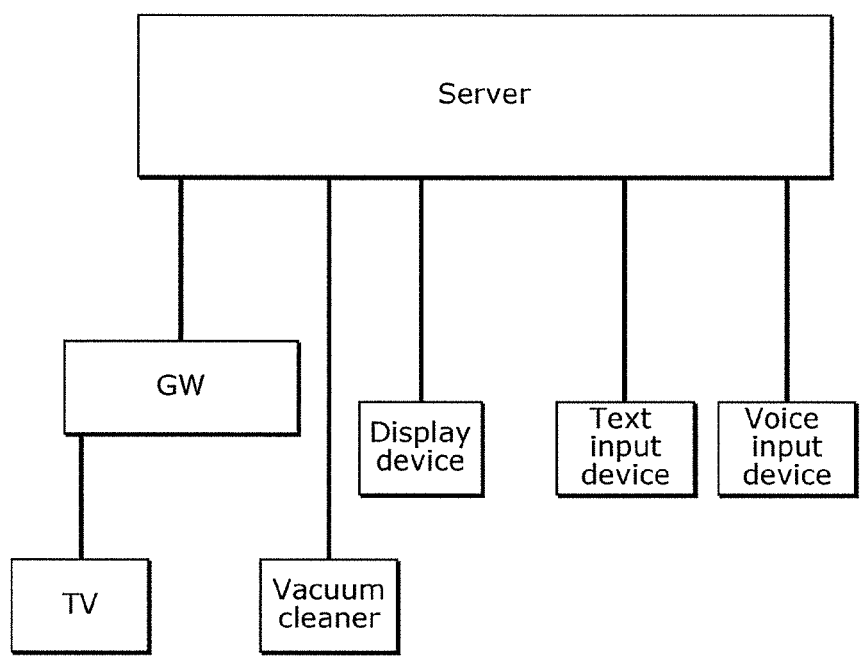
FIG. 4C illustrates an example of the configuration of a server in Embodiment 1.

FIG. 4A illustrates an example of screen information of an information-sharing service in Embodiment 1. FIG. 4B illustrates an example of the configuration of the display device in Embodiment 1, and FIG. 4C illustrates an example of the configuration of the server in Embodiment 1.

The screen information illustrated in FIG. 4A is an example of shared information displayed in a specific display format on a display screen. On a display device (display screen) of a user illustrated in FIG. 4A, information on operating states (state information) of consumer electronics devices at houses that the user wants to see are superimposed and displayed on a background image which is, for example, a map, using, for instance, consumer electronics icons showing the appearance of consumer electronics devices in small images.

For example, it can be seen that a space heater among plural consumer electronics devices is used at the MAX setting (space heater is used most frequently) at a house icon (1254). Then, if a user of a community who shares the screen information in FIG. 4A wants to see air conditioning states, only houses in which a space heater is used can be selected and displayed without displaying houses in which a space heater is not used. Furthermore, a setting can be made such that, for example, six divided block areas, for instance, are set on a Japanese map which is the background image, and one house is selected, for each area, in which the use of an air conditioner is noticeable, and the selected houses are displayed. Thus, deviceful display can be achieved by displaying information on a house in which the use of an air conditioner is noticeable while displaying houses in which cleaning events often occur, or in other words, houses in which a consumer electronics device such as a vacuum cleaner is frequently used.

Furthermore, a message (1253) illustrated in FIG. 4A is linked to, for instance, a message posted to another SNS site via a communication application program interface (API) in the same time range. Accordingly, messages from houses, for instance, can also be displayed. At this time, as illustrated in FIG. 4B and the lower part of FIG. 4C, if user's devices (a display device and a server) include an information input device, the user inputs a message in this service, and can display that information according to an event.

Furthermore, a user's device may include a speech input device, and user's speech data may be input. Furthermore, the user's device may include a video input device, and a video may be shared. If a speech recognition function is provided, speech data may be put into a text and displayed.

It should be noted that a house to be displayed on a display screen of a display device is selected based on information of a transmitter user who makes information public and information set by a viewer user. For example, if a transmitter user wants to emphasize cooking and if a certain number of events or more of cooking related consumer electronics devices occur, the priority level is increased in the selection of a house displayed at a receiver, and thus cooking related consumer electronics devices are displayed in a larger size than other consumer electronics devices or displayed at more noticeable positions. Furthermore, a house may be selected based on preference of a viewer user and information set by the user. Of course, it is conceivable that the transmitter user and the viewer user are the same person. Furthermore, if information set by a transmitter user indicates that cooking housework is preferentially displayed, screen information to be viewed can be displayed according to the priority level.

[Processing Flow]

FIG. 5 is a flowchart illustrating an example of processing by a display device to obtain a user interface (UI), in Embodiment 1. FIG. 5 illustrates processing by the display device 1 (1510) to obtain a UI from the server.

In FIG. 5, S2301 to S2304 and S2308 to S2310 indicate processing by the display device 1 (1510) and S2305 to S2307 indicate processing by the server (1100), which are described in the following.

First, the display device 1 (1510) starts a flow for obtaining a UI in S2301.

Next, the display device 1 (1510) determines in S2302 whether the server (1100) has notified the communication unit (1512) of the display device 1 (1510) of an event. Here, S2304 is performed if an event has been notified (YES in S2302), whereas S2303 is performed if an event has not been notified (NO in S2302).

Next, if an event is not notified in S2302 (NO in S2302), the display device 1 (1510) determines in S2303 whether a user operation for obtaining an UI has been made. Here, S2304 is performed if a user operation has been made (YES in S2303), whereas the processing returns to the determination in S2302 if a user operation has not been made (NO in S2303).

Next, in S2304, the communication unit (1512) of the display device 1 (1510) requests a UI according to an event or user operation, from the server (1100) via the public network (1200).

Next, in S2305, the communication unit 1101 of the server (1100) receives the UI request from the display device 1 (1510).

Next, in S2306, the display format determination unit (1102) of the server (1100) obtains necessary information from the consumer electronics DB group (1103) and creates a UI, according to the content of the received UI request.

Next, in S2307, the display format determination unit (1102) transmits the created UI to the display device 1 (1510) via the communication unit 1101 of the server (1100).

Next, in S2308, the communication unit (1512) of the display device 1 (1510) determines whether a UI has been received from the server (1100). Here, S2309 is performed if a UI has been received (YES in S2308), whereas the determination in S2308 is performed again if a UI has not been received (NO in S2308).

Next, in S2309, the display unit (1511) of the display device 1 (1510) displays the received UI on the screen.

Then, a processing flow by the display device 1 (1510) to obtain a UI from the server (1100) ends in S2310. It should be noted that the server (1100) may store a UI to be displayed by the display device 1 (1510).

Figure 6:
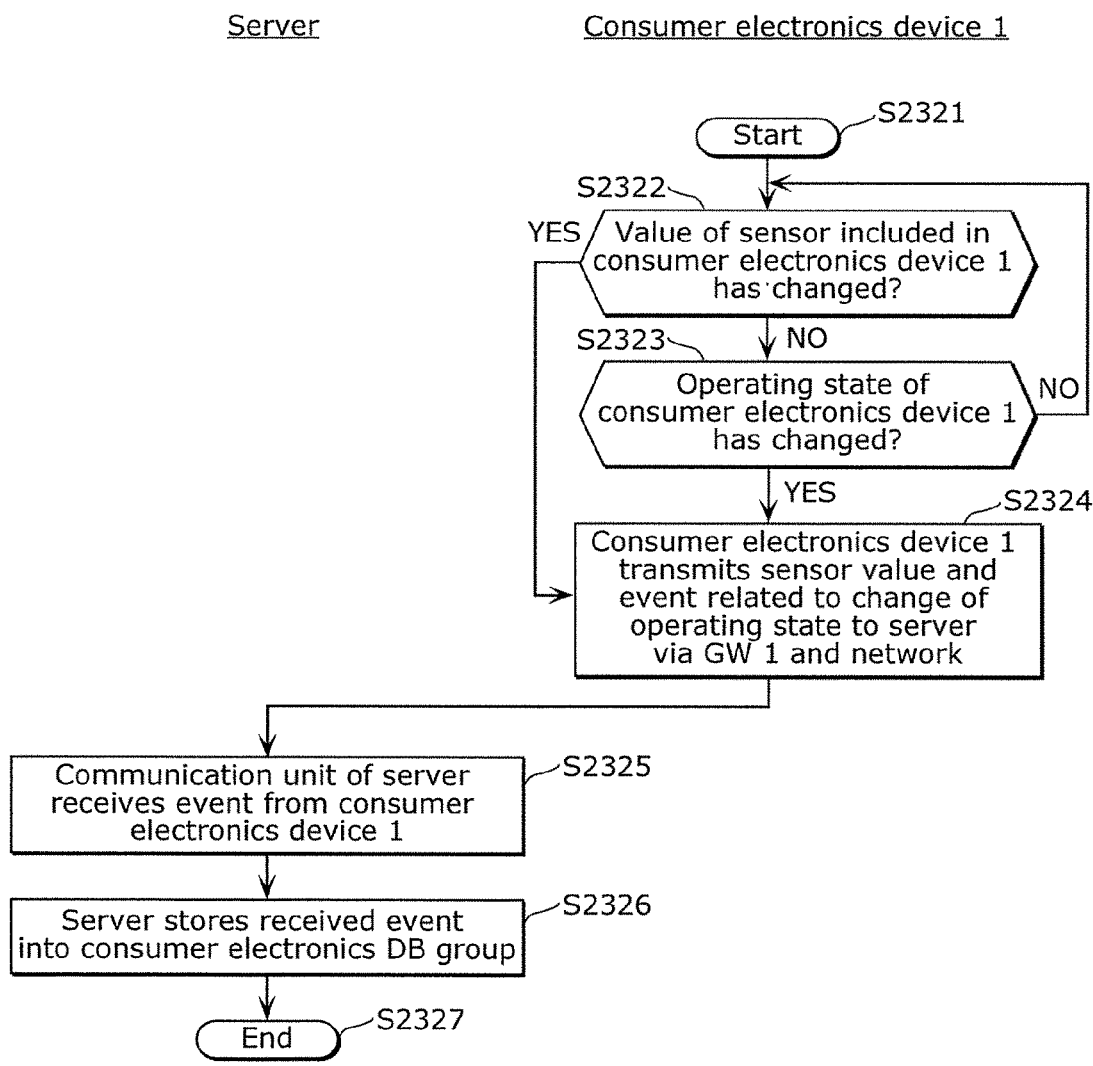
FIG. 6 is a flowchart illustrating an example of processing until a consumer electronics device notifies the server of an event, in Embodiment 1.

FIG. 6 is a flowchart illustrating an example of processing until a consumer electronics device notifies a server of an event, in Embodiment 1. FIG. 6 illustrates processing up to when the consumer electronics device 1 (1401) notifies the server (1100) of an event.

In FIG. 6, S2321 to S2324 indicate processing by the consumer electronics device 1, and S2325 to S2327 are processing by the server (1100), which are described in the following.

First, in S2321, the consumer electronics device 1 (1401) starts a processing flow for notifying the server (1100) of an event.

Next, in S2322, the consumer electronics device 1 (1401) determines whether the value of a sensor included therein has changed. Here, if the value has changed (YES in S2322), S2324 is performed, whereas S2323 is performed if the value has not changed (NO in S2322).

Next, in S2323, the consumer electronics device 1 (1401) determines whether the operating state thereof has changed. Here, S2324 is performed if the state has changed (YES in S2323), whereas S2322 is performed if the state has not changed (NO in S2323).

Next, in S2324, the consumer electronics device 1 (1401) transmits a sensor value and an event related to a change of an operating state to the server (1100) via the GW 1 (1301) and the public network (1200).

Next, in S2325, the communication unit 1101 of the server (1100) receives the event from the consumer electronics device 1 (1401).

Next, in S2326, the server (1100) stores the received event into the consumer electronics DB group (1103).

Then, in S2327, a processing flow up to when the consumer electronics device 1 (1401) notifies the server (1100) of an event ends. It should be noted that in S2324, an event may be transmitted to the server (1100) not via the GW 1 (1301), as with the consumer electronics device 3 (1403).

Figure 7:
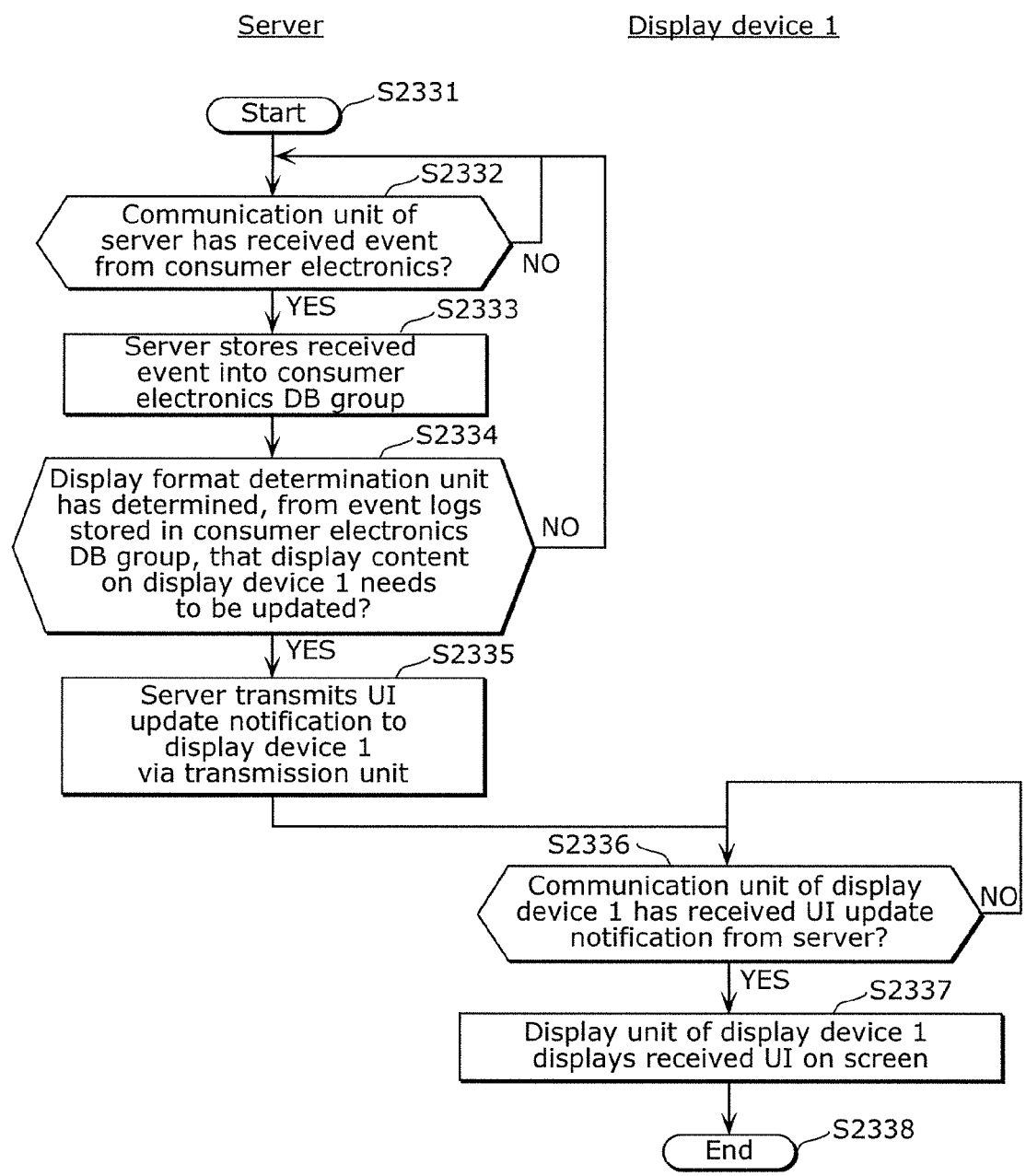
FIG. 7 is a flowchart illustrating an example of processing by the server to notify the display device of an update of a UI, in Embodiment 1.

FIG. 7 is a flowchart illustrating an example of processing by the server to notify a display device of an update of a UI, in Embodiment 1. FIG. 7 illustrates processing by the server (1100) to notify the display device 1 (1510) of an update of a UI.

In FIG. 7, S2331 to S2335 indicate processing by the server (1100), and S2336 to S2338 indicate processing by the display device 1 (1510), which are described in the following.

First, in S2331, the server (1100) starts a processing flow for notifying the display device 1 (1510) of an update of a UI.

Next, in S2332, the communication unit (1101) of the server (1100) determines whether an event has been received from a consumer electronics device. Here, S2333 is performed if an event has been received (YES in S2332), whereas S2332 is performed again if an event has not been received (NO in S2332).

Next, in S2333, the server (1100) stores the received event into the consumer electronics DB group (1103). Here, the received event is stored in the event logs illustrated in FIG. 3.

Next, in S2334, the display format determination unit (1102) determines, from the event logs stored in the consumer electronics DB group (1103), whether display content on the display device 1 (1510) needs to be updated. If updating is necessary (YES in S2334), S2335 is performed, whereas S2332 is performed if updating is unnecessary (NO in S2334).

Next, in S2335, the server (1100) transmits a UI update notification to the display device 1 (1510) via the communication unit (1101).

Next, in S2336, the communication unit (1512) of the display device 1 (1510) determines whether a UI update notification has been received from the server (1100). Here, S2337 is performed if the notification has been received (YES in S2336), whereas the determination in S2336 is performed again if the notification has not been received (NO in S2336).

Next, in S2337, the display unit (1511) of the display device 1 (1510) displays the received UI on the screen.

Then, in S2338, processing by the server (1100) to notify the display device 1 (1510) of the update of a UI ends.

Figure 8:
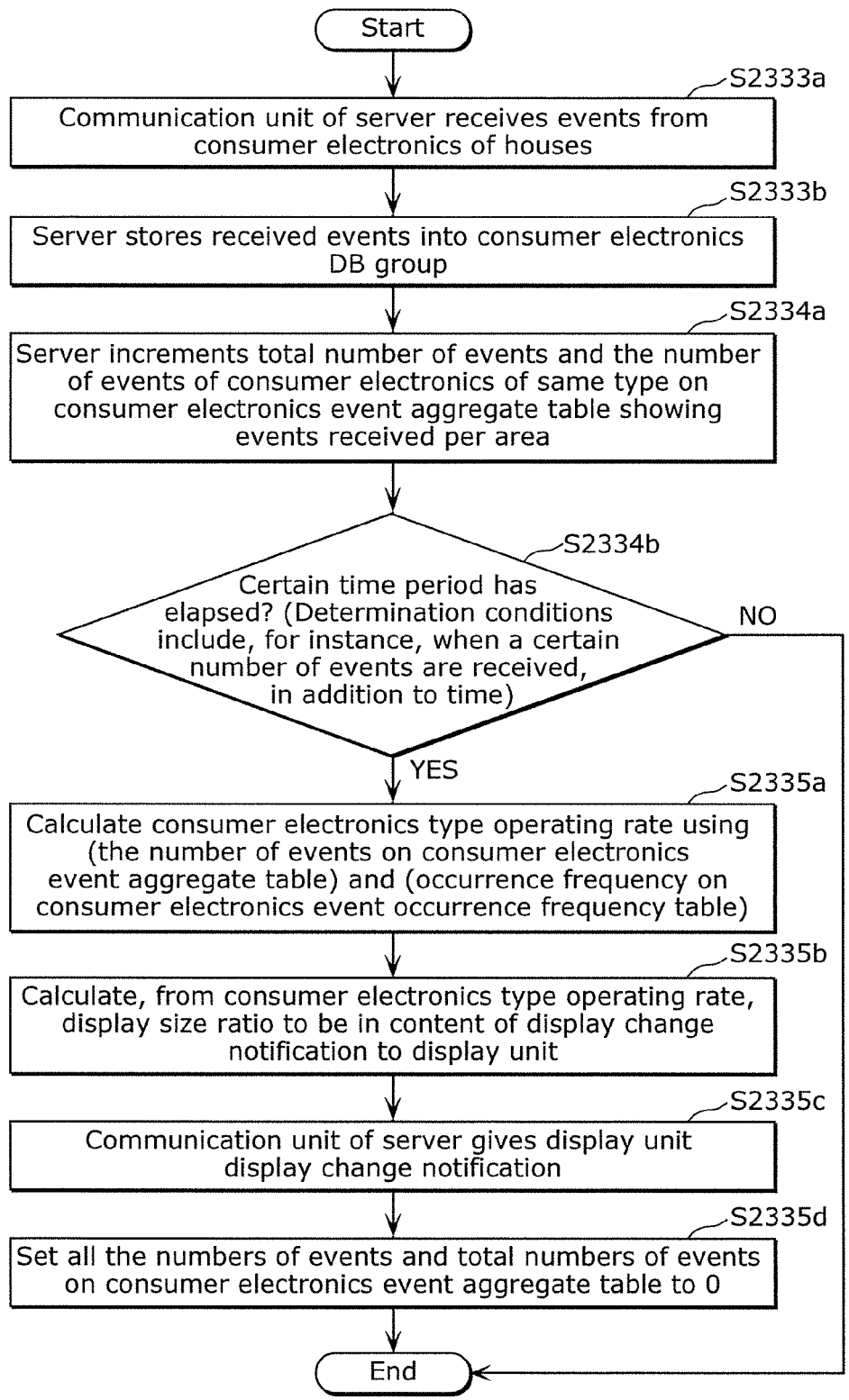
FIG. 8 is a flowchart illustrating detailed processing of S2333, S2334, and S2335 in FIG. 7.

FIG. 8 is a flowchart illustrating an example of detailed processing of S2333, S2334, and S2335 in FIG. 7. Specifically, FIG. 8 illustrates detailed processing of S2333, S2334, and S2335 which indicate the processing performed by the server (1100) described with reference to FIG. 7. Specifically, processing of S2333a and S2333b in FIG. 8 is performed in S2333 in FIG. 7, and processing of S2334a and S2334b in FIG. 8 is performed in S2334 in FIG. 7. Processing of S2335a, S2335b, S2335c, and S2335d in FIG. 8 is performed in S2335 in FIG. 7.

Specifically, first, in S2333a, the communication unit (1101) of the server (1100) receives events from consumer electronics devices in houses.

Next, in S2333b, the server (1100) stores the received events into the consumer electronics DB group (1103).

Next, in S2334a, the server (1100) increments the number of events of consumer electronics devices of the same type on a consumer electronics event aggregate table showing events received per area. Which area includes a house from which an event has been transmitted is determined by referring to addresses (2004) in a house DB illustrated in FIG. 9, based on the house ID (2001) of an event received by the server (1100) from a consumer electronics device, as illustrated in FIG. 3, for example. Here, FIG. 9 illustrates an example of information stored in a house DB in Embodiment 1. The house DB illustrated in FIG. 9 is a DB stored in the consumer electronics DB group (1103), and stores, for each house ID (2001) which is an ID of a house, attribute information of an address (2004), the number of persons of a household (2005), and a housing type (2006).

Next, in S2334b, the server (1100) determines whether a certain time period determined as a processing timing has elapsed. Here, if the certain time period has elapsed (YES in S2334b), the processing proceeds to S2335a, whereas the processing ends if the certain time period has not elapsed (NO in S2334b).

Next, in S2335a, the server (1100) calculates a consumer electronics type operating rate, using (the number of events on a consumer electronics event aggregate table) and (an occurrence frequency on a consumer electronics event occurrence frequency table).

Here, a specific description is given with reference to FIGS. 10 to 12.

FIG. 10 illustrates an example of a consumer electronics event aggregate table of Osaka in Embodiment 1. In the consumer electronics event aggregate table illustrated in FIG. 10, aggregates are obtained per category, such as geographic information including an area, the number of persons in a family structure, and a housing type.

FIG. 11 illustrates an example of a consumer electronics event occurrence frequency table in Embodiment 1. The consumer electronics event occurrence frequency table illustrated in FIG. 11 shows consumer electronics devices according to consumer electronics types, and shows model numbers (consumer electronics model numbers) of consumer electronics devices and event occurrence frequencies of the consumer electronics devices. Event occurrence frequencies are different for consumer electronics devices and consumer electronics model numbers, and thus aggregating the number of events does not allow calculation of operation states of consumer electronics devices. Thus, a property of the event occurrence frequency per unit time according to a consumer electronics device is defined using the consumer electronics event occurrence frequency table illustrated in FIG. 11. Accordingly, operation states of consumer electronics devices can be more accurately calculated, using only the number of events transmitted from consumer electronics devices.

FIG. 12 illustrates examples of operating rates for consumer electronics types in Embodiment 1. FIG. 12 illustrates model number operating rates showing a calculation process when calculating the operating rate for each consumer electronics type.

Specifically, in S2335a, the server (1100) calculates a model number operating rate (2603) for each model number (2602) illustrated in FIG. 12, using the number of events (2504) on the consumer electronics event aggregate table (Osaka) illustrated in FIG. 10 and the occurrence frequency (2553) on the consumer electronics event occurrence frequency table illustrated in FIG. 11. After that, the server (1100) calculates a sum total of model number operating rates for the same consumer electronics type (2601), to calculate a consumer electronics type operating rate (2604). Here, a model number operating rate (2603) can be calculated by (the number of events on the consumer electronics event aggregate table)/(the occurrence frequency on the consumer electronics event occurrence frequency table), and the consumer electronics type operating rate (2604) can be calculated using a sum total of model number operating rates for the same consumer electronics type.

Next, in S2335b, the server (1100) calculates, from the calculated consumer electronics type operating rate (2604), content of a display change notification to the display unit (1511). In the present embodiment, the server (1100) calculates a display size ratio (2652) illustrated in FIG. 13 as content of a display change notification. Here, FIG. 13 illustrates an example of content of a display change notification to the display unit (1511) in Embodiment 1. The display size ratio (2652) illustrated in FIG. 13 is a value calculated by (a consumer electronics type operating rate)/(the greatest value of consumer electronics type operating rates), and is a numerical value obtained by normalizing the consumer electronics type operating rate (2604) in FIG. 12 to 0 or more and 1 or less. The display size ratio (2652) can be calculated by dividing each consumer electronics type operating rate by the greatest value of consumer electronics type operating rates (2604). In the present embodiment, for example, the greatest value is 198.75 which is the consumer electronics type operating rate of a washing machine, as illustrated in FIG. 12.

Next, in S2335c, the communication unit (1101) of the server (1100) notifies the display unit (1511) of content of a display change notification. In the present embodiment, the communication unit (1101) notifies the display size ratio (2652) illustrated in FIG. 13 as content of the display change notification.

Next, in S2335d, the server (1100) sets all the numbers of events and all the total numbers of events on the consumer electronics event aggregate table to 0, and ends processing. In the present embodiment, the server (1100) sets, to 0, for example, all the numbers of events (2503) and all the total numbers of events (2504) on the consumer electronics event aggregate table illustrated in FIG. 10, and thereafter ends the processing.

It should be noted that the consumer electronics event aggregate table in FIG. 10 may be sorted according to the number of persons of a household (2005) and the housing type (2006) in FIG. 9, other than per area.

Furthermore, in the determination processing in S2334b, determination may be made based on whether a certain number of events have been received, other than making a determination based on whether a certain time period has elapsed.

After processing in FIG. 8 is performed, the display unit (1511) of the display device 1 (1510) updates the display, for example, from a UI before a display update is notified as illustrated in FIG. 14A to a UI after a display update is notified as illustrated in FIG. 14B. Here, FIG. 14A illustrates an example of a UI displayed by the display unit (1511) before the processing in FIG. 8 is performed, whereas FIG. 14B illustrates an example of a UI displayed by the display unit after the processing in FIG. 8 is performed.

As illustrated in FIGS. 14A and 14B, consumer electronics icons 2701, 2702, 2703, 2704, and 2705 on the UI before the display update is notified are each updated to have a display size determined based on the display size ratio (2652) illustrated in FIG. 13. An icon 2706 indicates the doorplate of a house, and means in what category information is collected for determining the display sizes of the consumer electronics icons around the house.

Advantageous Effects

As described above, the information providing method according to the present embodiment can provide even various types of voluminous information in a readily viewable manner.

Then, the information providing method can provide various types of voluminous information on consumer electronics devices and others connected to the network in plural houses, on a portal screen readily viewable for a user in each house according to the purpose of later use.

Embodiment 2

The present embodiment describes an aspect of a method for displaying a UI on a display device such as a display device 1 (1510) or a display device 2 (1520). In the present embodiment, various information pieces (operation information and state change information) which can be obtained from consumer electronics devices are collected as events, by a user operation on the consumer electronics devices, and information on related consumer electronics devices is collected as a category. This achieves a method for displaying a UI readily viewable for a user, while displaying as much information as possible on the limited screen area of the display device. It should be noted that the drawings described in Embodiment 1 are not repeatedly described.

[Configuration]

Figure 15:
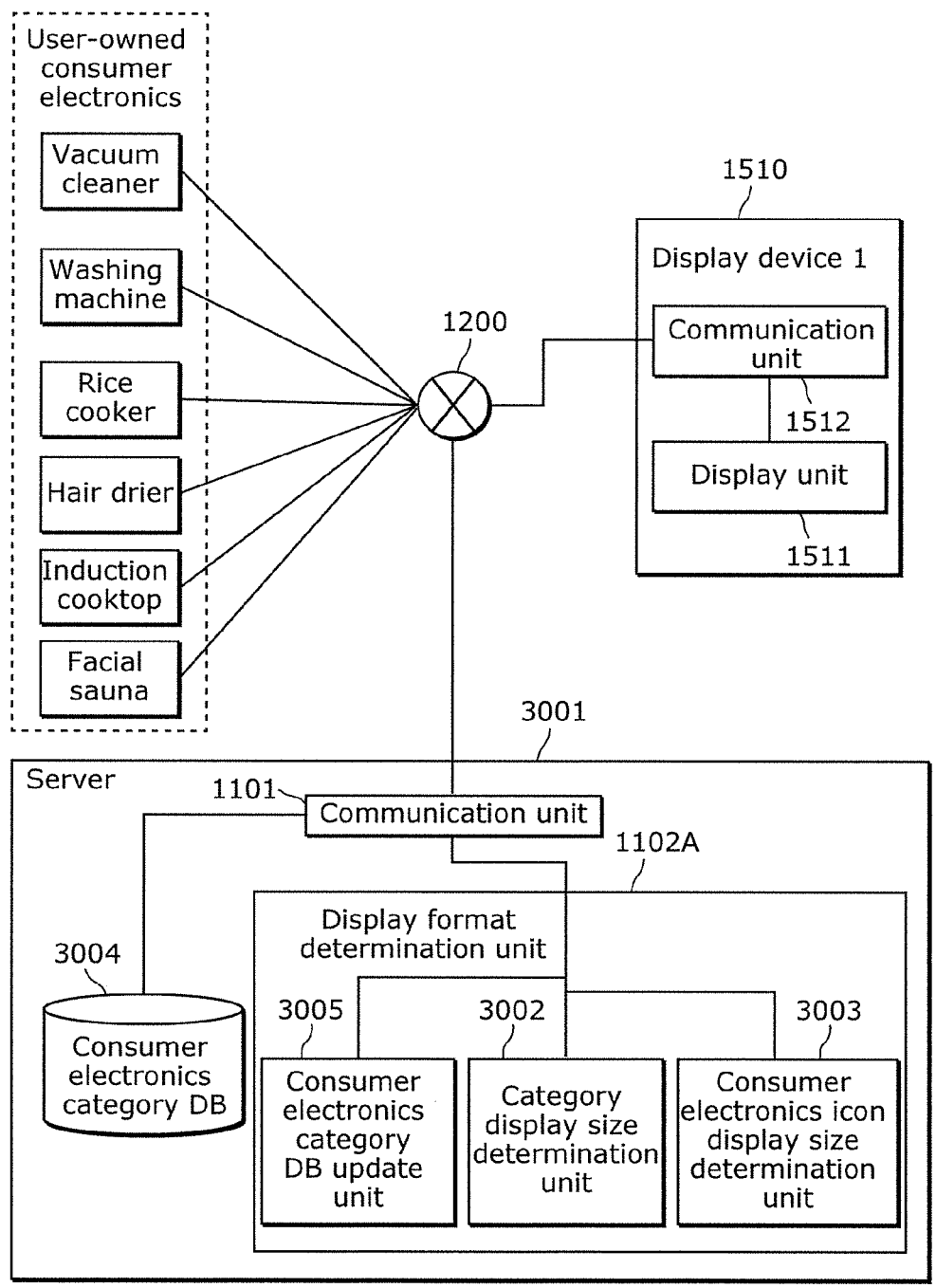
FIG. 15 illustrates an example of the configuration of an information providing system in Embodiment 2.

FIG. 15 illustrates an example of the configuration of an information providing system in the present embodiment. A difference from FIG. 1 is that a server (3001) illustrated in FIG. 15 includes a consumer electronics category (DB3004), as an example of a consumer electronics DB group (1103), and the configuration of a display format determination unit (1102A) is different.

The server (3001) (in particular, a communication unit (1101) and the display format determination unit (1102A)) includes a first memory and a CPU, for example, as a hardware configuration. The first memory stores, for example, a program for achieving a function as the communication unit (1101) and a program for achieving a function as the display format determination unit (1102A). The first memory is a readable recording medium or a readable and writable recording medium, for example. Examples of the recording medium include a semiconductor memory, an optical disc, a hard disk, and others.

The server (3001) has a configuration of, for example, reading the above programs from the first memory, and causing the CPU to execute the programs, thus allowing the communication unit (1101) and the display format determination unit (1102A) to function. Although the above example shows a configuration in which the CPU executes the program for achieving a function as the communication unit (1101) and the program for achieving a function as the display format determination unit (1102A), the present embodiment is not limited to this. For example, a dedicated signal processing circuit which functions as the communication unit (1101), and a dedicated signal processing circuit which functions as the display format determination unit (1102A) may be used for the configuration.

The program for achieving a function as one of the communication unit (1101) and the display format determination unit (1102A) may be stored in the first memory, whereas the other of the units may be configured using a dedicated signal processing circuit.

The consumer electronics category (DB3004) is stored in a memory (not illustrated). An example of the memory which stores the consumer electronics category (DB3004) is a readable and writable recording medium. Examples of the readable and writable recording medium include a semiconductor memory, an optical disc, a hard disk, and others.

The following gives a specific description.

FIG. 16 illustrates an example of information stored in a consumer electronics category DB in Embodiment 2.

The consumer electronics category DB (3004) is an example of the consumer electronics DB group (1103), and stores information for displaying consumer electronics icons all together for each category. Information in the consumer electronics category DB (3004) is tied to house IDs illustrated in FIG. 2. Accordingly, information (data) stored in the consumer electronics category DB (3004) can be obtained using a house ID as a search key.

In the present embodiment, the consumer electronics category DB (3004) stores information on plural consumer electronics devices received by the communication unit (1101). Information stored in the consumer electronics category DB (3004) has a category ID (3011), a category display priority level (3012), a consumer electronics type (3013), a consumer electronics device operating rate (3014), an operation state (3015), and a consumer electronics icon display priority level (3016), as illustrated in FIG. 16.

The category ID (3011) indicates a category type of a consumer electronics device owned by a user. The category IDs shown in the present embodiment are cleaning (3017), cooking (3018), and beauty care (3019).

The consumer electronics type (3013) defines a type of a consumer electronics device. It should be noted that the type of a consumer electronics device is equivalent to what is defined by the consumer electronics type (2202) in FIG. 3.

In the present embodiment, for example, if a category ID is the cleaning (3017), consumer electronics devices used for cleaning and washing belong to this category. In the example illustrated in FIG. 16, a vacuum cleaner and a washing machine belong to the category ID of the cleaning (3017), among user owned consumer electronics devices classified according to the consumer electronics types (3013). Similarly, if the category ID is the cooking (3018), cooking related consumer electronics devices belong to this category, and in the example illustrated in FIG. 16, an IH cooking heater and a rice cooker belong to the category ID of the cooking (3018). If the category ID is the beauty care (3019), beauty-care related consumer electronics devices belong to the category, and a facial sauna, a drier, and the like belong to the category ID of the beauty care (3019) in the example illustrated in FIG. 16. It should be noted that the category ID stated above is an example, and thus may be set for each consumer electronics device in advance or optionally set by a user.

The category display priority level (3012) shows a display priority level for each category type. In the example shown in FIG. 16, the category display priority level (3012) is defined such that category display priority level 1 is the highest, and the priority level decreases in the descending order.

The consumer electronics device operating rate (3014) shows an averaged use frequency of a consumer electronics device per day. The operation state (3015) shows a current operating state of a consumer electronics device. ON shown in FIG. 16 means that the consumer electronics device is operating, whereas OFF indicates that the consumer electronics device is not operating.

The consumer electronics icon display priority level (3016) shows a display priority level of a consumer electronics icon within a category indicated by the category ID (3011). Here, the consumer electronics icon display priority level (3016) is defined such that consumer electronics icon display priority level 1 is the highest, and a priority level decreases in the descending order.

The display format determination unit (1102A) generates display information for display by a display device in a specific display format for causing the display device to display, on a display screen, one or more consumer electronics devices having the same category ID in a group, and information on plural consumer electronics devices having a category ID with a higher category display priority level in a larger size. Furthermore, the display format determination unit (1102A) generates display information for display by a display device in a specific display format for causing the display device to display, on a display screen, one or more consumer electronics devices having the same category ID in a group, and information on plural consumer electronics devices having a category ID with a higher category display priority level in a larger size. Furthermore, the display format determination unit (1102A) generates display information for display by a display device in a specific display format for causing the display device to display, on a display screen, one or more consumer electronics devices having the same category ID in a group, and an icon associated with a consumer electronics device given a higher consumer electronics display priority level in a larger size, among one or more icons representing the one or more consumer electronics devices.

In the present embodiment, the display format determination unit (1102A) includes a category display size determination unit (3002), a consumer electronics icon display size determination unit (3003), and a consumer electronics category DB update unit (3005).

The present embodiment describes the display device 1 (1510) illustrated in FIG. 15, as a display device.

The category display size determination unit (3002) obtains the category display priority level (3012) illustrated in FIG. 16, and determines the display sizes and the display positions for category types indicated by category IDs.

The consumer electronics icon display size determination unit (3003) determines the display sizes of consumer electronics icons for each category type, and the display positions in a category, based on display sizes for category types determined by the category display size determination unit (3002) and the consumer electronics icon display priority levels (3016) in the consumer electronics category DB (3004).

The consumer electronics category DB update unit (3005) assigns category IDs indicating category types to information pieces on plural consumer electronics devices received by the communication unit (1101).

The consumer electronics category DB update unit (3005) determines the category display priority level which indicates a display priority level for a category type, and the consumer electronics device display priority level which indicates a display priority level of each of plural consumer electronics devices, based on information pieces on plural consumer electronics devices received by the communication unit (1101) and information pieces on consumer electronics devices stored in the consumer electronics category DB3004. The consumer electronics category DB update unit (3005) stores the determined category display priority levels and consumer electronics device display priority levels, into the consumer electronics category DB3004.

The consumer electronics category DB update unit (3005) performs processing for generating display information that includes the determined category display priority levels and consumer electronics device display priority levels.

It should be noted that the consumer electronics category DB update unit (3005) may determine the category display priority level, according to a sum total of frequencies of use of one or more consumer electronics devices having the same category ID. Further, when a user uses a consumer electronics device a frequency of use of which is equal to or below a frequency of use determined in advance, the consumer electronics category DB update unit (3005) may temporarily set the category display priority level of a category ID of the consumer electronics device used by the user to a value higher than a predetermined value. Furthermore, the consumer electronics category DB update unit (3005) may assign a category ID indicating the same category type to plural consumer electronics devices which are used in a preset time period at a preset frequency of use or more frequently than the preset frequency of use.

In the present embodiment, the consumer electronics category DB update unit (3005) updates information in the consumer electronics category DB (3004). For example, if the operation state of a consumer electronics device changes or if a new consumer electronics device is connected to the server (3001), the consumer electronics category DB update unit (3005) adds and updates information on the consumer electronics device the operation state of which has changed and the new consumer electronics device, using, as a key, the category ID (3011) in the consumer electronics category DB (3004).

The consumer electronics category DB update unit 3005 notifies the update of a UI, if the information in the category DB (3004) is updated. For example, when the operation state has changed as described above, the consumer electronics category DB update unit 3005 notifies the display device 1 (1510) or the display device 1 (1510) connected to the server (3001) of the update of a UI.

Furthermore, if the display device 1 (1510) notifies the consumer electronics category DB update unit 3005 of a request for obtaining a UI including the display size and the display position of a consumer electronics icon, the consumer electronics category DB update unit 3005 obtains, from the category display size determination unit (3002) and the consumer electronics icon display size decision unit (3003), the display size and display position for each category type and the display size and display position of each consumer electronics icon, and transmits the sizes and positions to the display device 1 (1510).

It should be noted that the display size can be provided based on the product (the number of pixels) of the width and the height in the coordinate system (for example, two-dimensional XY coordinate system) with which the UI is displayed on the screen (display screen) of the display device 1 (1510). The display position is provided as a coordinate position on the screen.

The following describes processing by the information providing system having the configuration as described above.

[Processing Flow]

Figure 17:
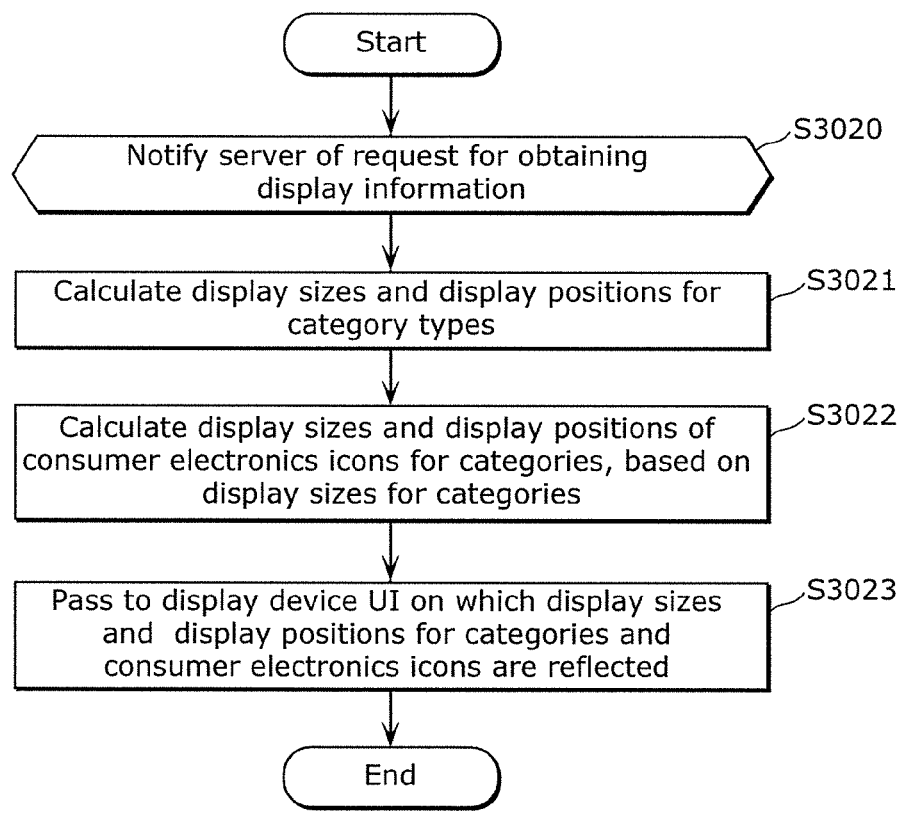
FIG. 17 is a flowchart illustrating processing by a server to determine a category type and a display size in Embodiment 2.
Figure 18:
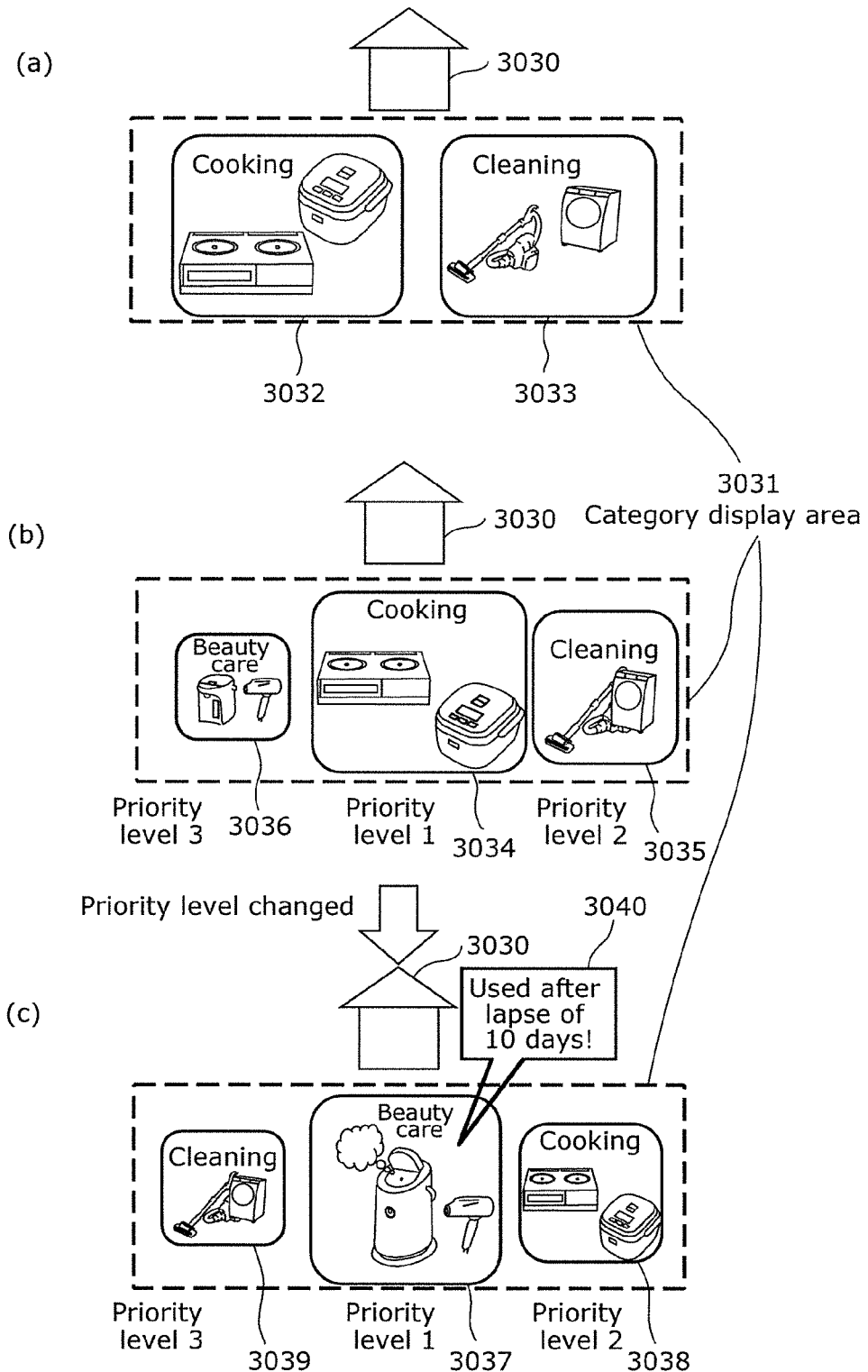
FIG. 18 illustrates in (a) to (c) an example of a UI displayed by a display unit in Embodiment 2.

The following describes processing for determining a category type of a consumer electronics device which a user owns and the display size of a consumer electronics icon, with reference to FIGS. 17 and 18.

FIG. 17 is a flowchart illustrating processing by the server to determine a category type and a display size in Embodiment 2. FIG. 18 illustrates an example of a UI displayed by the display unit in Embodiment 2.

FIG. 18 illustrates an example of a UI displayed on the display device 1 (1510), as a result of the processing in FIG. 17. On the display screens illustrated in (a) to (c) of FIG. 18, category display areas (3031) which are rectangular areas indicated by broken lines are displayed near a house icon (3030) indicating a house to which a specific house ID (2001) is assigned. Round-cornered rectangular areas included in the category display area (3031) are individual category display areas (3032) to (3039) corresponding to category IDs. In each of the individual category display areas (3032) to (3039), consumer electronics icons of all the consumer electronics devices associated with a category ID are displayed. Parts (a) and (b) of FIG. 18 illustrates examples of the case where a display format is changed by processing illustrated in FIG. 17, and will be described below. Thus, a description is omitted here.

It should be noted that rectangular areas indicated by broken lines and showing the category display areas (3031) and round-cornered rectangles showing the individual category display areas (3032) to (3039) are shown for convenience of a description of the present embodiment, and are not necessarily needed as a UI display. An important point in the present embodiment is that the size and display position of an individual category display area in the category display area (3031) are determined. In this manner, although the greatest possible number of consumer electronics icons are displayed in the category display area (3031) which is a limited area, consumer electronics icons grouped for each category type are displayed, so that the grouped icons are readily viewable to a user.

The following describes processing of determining a category type of a consumer electronics device and the display size of a consumer electronics icon.

First, in S3020, suppose a request for obtaining a UI is notified to the server (3001) from the display device 1 (1510).

Next, in S3021, the server (3001) calculates the display sizes and display positions for the category types.

In the present embodiment, the category display size determination unit (3002) obtains, from the consumer electronics category DB (3004), the category display priority levels (3012) for the category IDs (3011), and determines the display sizes, such that the display sizes for the categories increase in descending order of the category display priority levels (3012).

For example, the category display size determination unit (3002) can determine the display sizes using a formula in which the size (indicated by SIZE in the equations) of the category display area (3031) in a UI display area of the predetermined specific house ID (2001), and given coefficients (referred to as category priority coefficients) a, b, c . . . ($0.5 \le a, b, c, \le 1.0$) are used.

The display size of the cooking (3018) which is a category ID having a highest priority level among the category IDs (3011) illustrated in FIG. 16 can be determined using the formula, $Sa = SIZE \times a$, and the display size of the cleaning (3017) which is a category ID having the second highest priority level can be determined using the formula, $Sb = SIZE \times (1-a) \times b$. The display size of the beauty care (3019) which is a category ID having the third highest priority level can be determined using the formula, $Sc = (SIZE - Sa - Sb) \times c$.

It should be noted that although an example has been described in which the display sizes for category IDs having a priority level up to the third priority level, the present embodiment is not limited to this. If the category priority coefficients (a, b, c) are further more defined, the display sizes for four or more category IDs can also be calculated.

Furthermore, if two or more category IDs have the same priority level, the category priority coefficients may be divided by the same priority level. An example in this case is illustrated in (a) of FIG. 18, and the individual category display areas (3032) and (3033) have the same category priority level, and thus have the same size.

Furthermore, the display width and the display height of the category display area (3031) can also be used, instead of the size (SIZE) of the category display area (3031). In that case, the height and width of the individual category area (3032), for instance, may be obtained, rather than the size of the individual category area (3032) for a category type, such as Sa and Sb.

Furthermore, the category display size determination unit (3002) determines the display positions of individual category areas such that an individual category area having the highest category display priority level (3012) is disposed at the center of the category display area (3031). The category display size determination unit (3002) determines the coordinate positions such that individual category areas are disposed alternately on the right and left in the priority level order.

An example in this case is illustrated in (b) of FIG. 18. Specifically, the individual category display area (3034) for category priority level 1 is displayed at the center of the category display area (3031) in the largest size. Next, the individual category display area (3035) for category priority level 2 is displayed on the right of the individual category display area (3034) in the second largest size. The individual category display area (3036) for category priority level 3 is displayed on the left of the individual category display area (3034) in the smallest size. It should be noted that the coordinate positions may be determined such that individual category display areas are disposed side-by-side from the center, the left, and the right, in the order of priority levels for the categories.

Next, in S3022, the server (3001) calculates the display sizes and display positions of consumer electronics icons of consumer electronics devices belonging to the same category, based on the display sizes and the display positions for the categories determined in S3021 as described above.

In the present embodiment, the consumer electronics icon display size determination unit (3003) determines the display sizes of consumer electronics icons for category types, and the display positions of consumer electronics icons in a category, based on the display sizes for category types determined by the category display size determination unit (3002), and the consumer electronics icon display priority levels (3016) in the consumer electronics category DB (3004).

Here, the consumer electronics icon display size determination unit (3003) can determine the display sizes and display positions of consumer electronics icons, using a formula similar to the formula described in S3021.

Specifically, the display sizes (Sa, Sb, Sc) of individual category areas in the formula used in S3021 are replaced with the display sizes of consumer electronics icons, and also the category priority coefficients (a, b, c) are replaced with consumer electronics priority coefficients a', b', c' . . . ($0.5 \leq a'$, b', c' . . . $\leq 1.0$), thus determining the display sizes and display positions of consumer electronics icons. The consumer electronics icon display size determination unit (3003) can calculate, using this formula, the display sizes of consumer electronics icons in each category, in descending order of the consumer electronics icon display priority levels (3016). It should be noted that a formula may not be used to obtain the display sizes of consumer electronics icons. The display sizes of consumer electronics icons may be the same for the same category, and further may be proportional sizes obtained by dividing by the number of consumer electronics devices belonging to the same category.

Furthermore, the consumer electronics icon display size determination unit (3003) may determine display positions of consumer electronics icons such that a consumer electronics icon having a high consumer electronics icon display priority level (3016) is disposed at the center of the category display area (3031). After that, the consumer electronics icon display size determination unit (3003) determines coordinate positions such that consumer electronics icons are disposed alternately on right and left in the priority order of the consumer electronics device display priority levels (3016). It should be noted that the consumer electronics icon display size determination unit (3003) may determine coordinate positions such that consumer electronics icons are disposed in a line starting from on the left or right in the priority order.

Next, in S3023, the server (3001) generates a UI on which the determined display sizes and display positions for categories and consumer electronics icons are reflected, and passes the generated UI to the display device 1 (1510), thus completing the processing.

Advantageous Effects

As described above, the information providing method according to the present embodiment can provide various types of voluminous information in a readily viewable manner.

According to the information providing method of the present embodiment, consumer electronics icons are displayed in groups for categories, and furthermore, the display size of the individual category display area for a high priority level and the display size of a consumer electronics icon having a high priority level can be increased.

Accordingly, even if the number of consumer electronics devices owned by a user increases, information can be displayed in sizes and groups based on categories which allow a user to readily view the information, while displaying as much information as possible on the screen area of the limited display screen area of the display device.

Furthermore, according to the information providing method according to the present embodiment, the consumer electronics category DB update unit (3005) can dynamically change the category display priority level (3012) and the consumer electronics icon display priority level (3016), according to the operating state of a consumer electronics device.

For example, the consumer electronics category DB (3004) may be updated using the consumer electronics operating rate (3014) such that the higher an average value of the consumer electronics operating rates for each category is, the higher priority level is given. In this manner, a consumer electronics icon of a consumer electronics device that is highly frequently used can be largely displayed in a readily viewable manner.

It should be noted that if the operation state (3015) of any of consumer electronics devices whose consumer electronics device operating rate (3014) is equal to or below a predetermined value indicates "ON", the consumer electronics category DB update unit (3005) may increase the consumer electronics icon display priority level of the consumer electronics device and the category display priority level of a category to which the consumer electronics device belongs, and set the increased priority levels in the consumer electronics category DB (3004).

FIG. 19 illustrates an example of information stored in a consumer electronics category DB in Embodiment 2.

For example, as illustrated in FIG. 16, suppose that there is a facial sauna which is a consumer electronics device whose operating rate is 0.2. The consumer electronics category DB update unit (3005) updates information in the consumer electronics category DB (3004) when the facial sauna is operated such that the consumer electronics icon display priority level of the facial sauna and the category display priority level of a category ID of the facial sauna are temporarily increased, as illustrated in FIG. 19.

An example in this case is illustrated in (c) of FIG. 18. Specifically, when the screen as illustrated in (b) of FIG. 18 is displayed, if the facial sauna which is a consumer electronics device whose operating rate is low starts operating and is given a high priority level, the screen is updated as illustrated in (c) of FIG. 18.

More specifically, in (c) of FIG. 18, the individual category display area (3037) for the updated category priority level 1, to which the facial sauna which starts operating belongs, is displayed at the center of the category display area (3031) in the largest size. Next, the individual category display area (3038) for the updated category priority level 2 is displayed on the right of the individual category display area (3037) in the second largest size. The individual category display area (3039) for the updated category priority level 3 is displayed on the left of the individual category display area (3037) in the smallest size. Furthermore, a consumer electronics icon for the facial sauna which has started operating is displayed in the largest size in the individual category display area (3037).

In this manner, when a consumer electronics device whose operating rate is low starts operating, a high priority is assigned to the consumer electronics device, thus displaying a UI such that a consumer electronics device which a user rarely uses is recognized visually. Furthermore, information which further emphasizes the use of such a consumer electronics device as shown by a balloon (3040) in (c) of FIG. 18 may be added to the UI.

This achieves a UI which allows a user to readily view that the use state of the consumer electronics device is special and different from a usual state.

Although the consumer electronics category DB update unit (3005) may set consumer electronics devices which are used, in a time period in which the consumer electronics device operating rate (3014) is preset, at a preset frequency of use or more frequently than the preset frequency of use to have the same category ID, and update the consumer electronics category DB (3004). Accordingly, consumer electronics devices which operate in the same time period can be automatically displayed in a group, and thus information on the consumer electronics devices operating in a specific time period can be readily viewable to a user.

Furthermore, in the present embodiment, the category display size determination unit (3002) and the consumer electronics icon display size determination unit (3003) may be included as display units of display devices such as the display device 1 (1510) and the display device 2 (1520). Such a configuration achieves distribution of the operating load of the server involving UI display, as processing of a display device.

In this case, such a display unit of a display device may display, in a group, one or more consumer electronics devices having the same category ID on the display screen, based on display information received from the server (3001), and may display information on plural consumer electronics devices having a category ID with a higher category display priority level in a larger size.

Furthermore, a display unit of a display device may display, in a group, one or more icons representing consumer electronics devices having the same category ID on the display screen, based on a consumer electronics device display priority level, and may further display an icon associated with a consumer electronics device having a higher consumer-electronics display priority level in a larger size, among one or more icons representing consumer electronics devices.

Embodiment 3

The present embodiment describes an information providing method focusing on operation which in particular requires a user to operate a consumer electronics device.

[Configuration]

Figure 20:
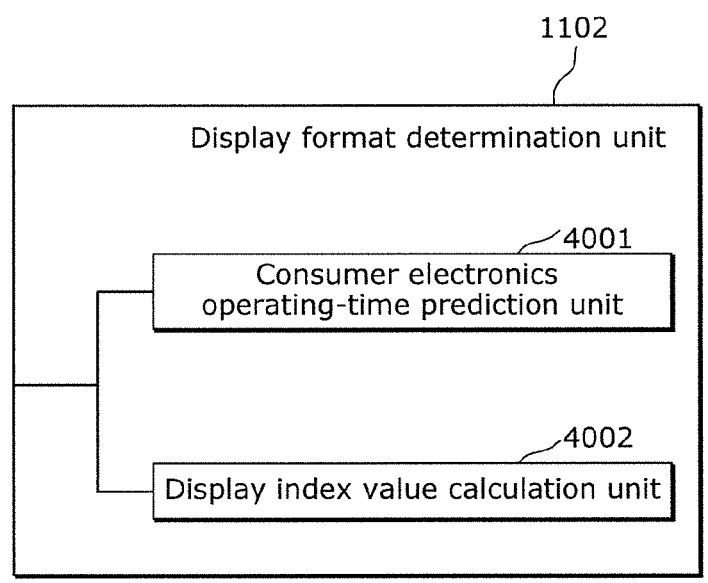
FIG. 20 illustrates an example of the configuration of a display format determination unit in Embodiment 3.

FIG. 20 illustrates an example of the configuration of a display format determination unit in Embodiment 3.

A display format determination unit (1102) illustrated in FIG. 20 includes a consumer electronics operating-time prediction unit (4001) and a display index value calculation unit (4002) which uses a user operation time for the calculation.

The consumer electronics operating-time prediction unit (4001) predicts consumer-electronics operation times which are time periods when plural consumer electronics devices operate, based on, for example, information pieces on the plural consumer electronics devices received by the communication unit (1101). In the present embodiment, the consumer electronics operating-time prediction unit (4001) uses, for example, event logs stored in the consumer electronics DB group (1103), to predict, for each consumer electronics type, an operating time period of consumer electronics devices having the consumer electronics type, from which the latest event is received.

The display index value calculation unit (4002) which uses a user operation time for the calculation weights a consumer electronics device operating time with a user operation time, thus calculating a display index value for determining a display size and a display position of a consumer electronics icon representing one of one or more objects associated with one or more consumer electronics devices including one or more filtered information pieces.

In the present embodiment, the display index value calculation unit (4002) which uses a user operation time for the calculation stores and manages a consumer electronics operation ratio DB described below in the consumer electronics DB group (1103), for example. The display index value calculation unit (4002) which uses a user operation time for the calculation calculates a display index value for determining the display size and position of the latest event, using the operating-time prediction unit (4001) and the consumer electronics operation ratio DB.

[Processing Flow]

FIG. 21 is a flowchart illustrating an example of processing by a consumer electronics operating-time prediction unit to predict the operating time of a consumer electronics device, in Embodiment 3.

First, in S4101, the consumer electronics operating-time prediction unit (4001) starts processing for predicting an operating time.

Next, in S4102, the consumer electronics operating-time prediction unit (4001) obtains the latest event. In the present embodiment, the consumer electronics operating-time prediction unit (4001) obtains information indicating a state change of a consumer electronics device stored in the consumer electronics DB group (1103) and if a latest event is stored as an event value of a user operation, that latest event.

Next, in S4103, the consumer electronics operating-time prediction unit (4001) refers to an event key and an event value of the obtained event, and checks whether the event key indicates "power supply" and the event value indicates "ON" (S4103). It should be noted that if conditions that an event key of the obtained event indicates "power supply" and an event value thereof indicates "ON" are not satisfied (NO in S4103), the arrival of a new event is waited for again and the latest event is obtained. On the other hand, if the above conditions are satisfied in S4013 (YES in S4103), the processing proceeds to S4104.

Next, in S4104, the consumer electronics operating-time prediction unit (4001) searches, backwards in time, through the event logs (FIG. 3) stored in the consumer electronics DB group for a past event having the same house ID, consumer electronics type, event key, and event value as those of the obtained event.

Next, in S4105, the consumer electronics operating-time prediction unit (4001) checks whether the same event as the obtained event has been present in the past. Here, if a past event which satisfies such conditions is not present (NO in S4105), the processing proceeds to S4108, and an operating-time default value for each consumer electronics type is set. On the other hand, if a past event which satisfies these conditions is present (YES in S4105), the processing proceeds to S4106.

Next, in S4106, the consumer electronics operating-time prediction unit (4001) searches for a past event having the same house ID, consumer electronics type, and event key as those of the obtained event and having an event value "OFF", at a time later than searched past event.

Next, in S4107, the consumer electronics operating-time prediction unit (4001) checks whether a past event has been present which is the same as the event obtained at a time later than the searched past event. Here, if the past event which satisfies the conditions is not present (NO in S4107), the processing proceeds to S4108, and an operating-time default value for each consumer electronics type is set. On the other hand, if the past event which satisfies the conditions is present (YES in S4107), the processing proceeds to S4109.

Next, in S4109, the consumer electronics operating-time prediction unit (4001) calculates the operating time based on a difference between times when event values of the searched past events indicate "ON" and "OFF."

Next, in S4110, the consumer electronics operating-time prediction unit (4001) searches the searched past events for the presence of an event having the same house ID, consumer electronics type, and event key at a time preceding a time when the event value indicates "ON" by X hour(s). Here, if such an event is not present (NO in S4110), the operating time calculated in S4109 is set as it is, and the processing proceeds to S4112. On the other hand, if such an event is present (YES in S4110), the processing proceeds to S4111.

Next, in S4111, the consumer electronics operating-time prediction unit (4001) calculates and adds the operating time of the past event newly detected.

Next, in S4112, the consumer electronics operating-time prediction unit (4001) outputs the operating time calculated in S4111 as the predicted operating time.

Then, this processing flow ends in S4113.

It should be noted that the processing described with reference to FIG. 21 shows the simplest operating-time calculating method, yet processing of S4104 to S4109 may be performed to search for a past event indicating operation at the same time over the past several days, and the average value for the several days may be used.

Furthermore, the processing described for S4110 to S4111 shows a method of adding the operating time, assuming that if "ON" and "OFF" of a power supply are repeated during X hour(s) in the past, the repetitions are regarded as involving a series of the same operations, the processing is not limited to this method. For example, the method may be a method in which if plural "ONs" and "OFFs" are present in a designated time, all the operating times defined by the "ONs" and "OFFs" are added. Furthermore, the designated time X is assumed to be a unit time, yet may be any time.

[Example of Calculation of Operating Time]

FIG. 22 illustrates an example of a method for calculating an operating time from event logs stored in a consumer electronics DB group in Embodiment 3.

FIG. 22 illustrates an example of a method for calculating the operating time of a consumer electronics device by processing of S4104 to S4109, using event logs illustrated in FIG. 3 and including a state change of a consumer electronics device and user operation. In the example illustrated in FIG. 22, from event logs whose house ID is the same and consumer electronics type is a "washing machine", event logs whose event key is "power supply" are searched for to obtain a time until when an event value is changed from "ON" to "OFF". More specifically, event logs illustrated in rows 2010 and 2130 have the same house ID "H000-0001", the same consumer electronics type "washing machine", and the same event key "power supply". Thus, this shows that an interval 4203 showing a time between times 4201 and 4202 at which event values are "ON" and "OFF", respectively, can be calculated as the operating time of a washing machine.

On the other hand, FIG. 23 illustrates an example of a method for calculating the operating time of a consumer electronics device by processing of S4110 to S4111, using event logs illustrated in FIG. 3 and including a state change of a consumer electronics device and user operation. In the example illustrated in FIG. 23, through event logs whose house ID is the same and whose consumer electronics type is "vacuum cleaner", an event log whose event key is "power supply" is searched for to obtain a time from when an event value is "ON" until when an event value is changed to "OFF". More specifically, event logs illustrated in rows 2030, 2040, 2060, and 2090 have the same house ID "H000-0001", the same consumer electronics type "vacuum cleaner", and the same event key "power supply". Accordingly, this shows that a total of an interval 4303 indicating a time between times 4301 and 4302 at which event values are "ON" and "OFF", respectively, and an interval 4306 showing a time between times 4304 and 4305 at which event values are "ON" and "OFF", respectively, can be calculated as the operating time of a vacuum cleaner.

[Consumer Electronics Operation Ratio and a User Contact Table]

FIG. 24 illustrates examples of consumer electronics operation ratios stored in a consumer electronics DB group in Embodiment 3.

Part (b) of FIG. 24 illustrates an example of a user contact table of a vacuum cleaner in Embodiment 3, and (c) of FIG. 24 illustrates an example of a user contact table of a washing machine in Embodiment 3.

Part (a) of FIG. 24 illustrates a consumer electronics operation ratio which indicates a time which a user needs to spend for operation during the operation time when the user operates a consumer electronics device, which is stored in the consumer electronics DB group (1103).

In the present embodiment, the display index value calculation unit (4002) calculates display indexes for determining the display order on a portal screen, using a consumer electronics operation ratio illustrated in (a) of FIG. 24, when a state change of a consumer electronics device stored in the consumer electronics DB group (1103) is made or when an event including a user operation is stored thereinto.

Specifically, in (a) of FIG. 24, a column 4401 indicates a consumer electronics type, and a column 4402 indicates a default user contact ratio. The default user contact ratio indicated by the column 4402 can be calculated by dividing an average operation time for when a consumer electronics device in the column 4401 is operated by the operating time (average operation time/operating time). For example, for a vacuum cleaner which is a consumer electronics device indicated by a row 4410 requires user operation all the time during operation, a default user contact is calculated to be "1" and set to "1". Furthermore, for example, a default user contact ratio is a low value for a device that does not require user operation except for the setting at the beginning and pressing a start button, like a washing machine which is a consumer electronics device indicated by a row 4420.

Furthermore, in (a) of FIG. 24, a column 4403 indicates reference to user contact tables according to functions. As examples of user contact tables according to functions, (b) of FIG. 24 illustrates a vacuum cleaner user contact table, and (c) of FIG. 24 illustrates a washing machine user contact table.

In the vacuum cleaner user contact table illustrated in (b) of FIG. 24, a column 4405 shows details of operation on a vacuum cleaner, and a column 4406 shows the necessity of user operation on the vacuum cleaner. A column 4407 shows the average operation time for the operation shown in the column 4405.

A row 4440 shows that a user needs to operate a vacuum cleaner all the time when the vacuum cleaner is in operation. It should be noted that the operating time of a vacuum cleaner can be calculated using the method described above, and thus the average operation time is not defined. Furthermore, a row 4450 defines that when the event "mode select" of a vacuum cleaner is stored in the consumer electronics DB group (1103), user operation is necessary and an average necessary operation time is 10 seconds. Similarly, a row 4460 defines that when the event of "strength selection" of a vacuum cleaner is stored in the consumer electronics DB group (1103), user operation is necessary and an average necessary operation time is 10 seconds.

In the washing machine user contact table illustrated in (b) of FIG. 24, equivalent definitions to those of a washing machine are applied to columns 4408 to 4410, and thus a description is omitted.

In (b) of FIG. 24, a row 4470 shows that a user does not need to always operate a washing machine while the washing machine is in operation. In a row 4480, "select course" of a washing machine requires user operation, and an average operation time is 30 seconds.

[Example of Method for Calculating Display Indexes]

Figure 25:
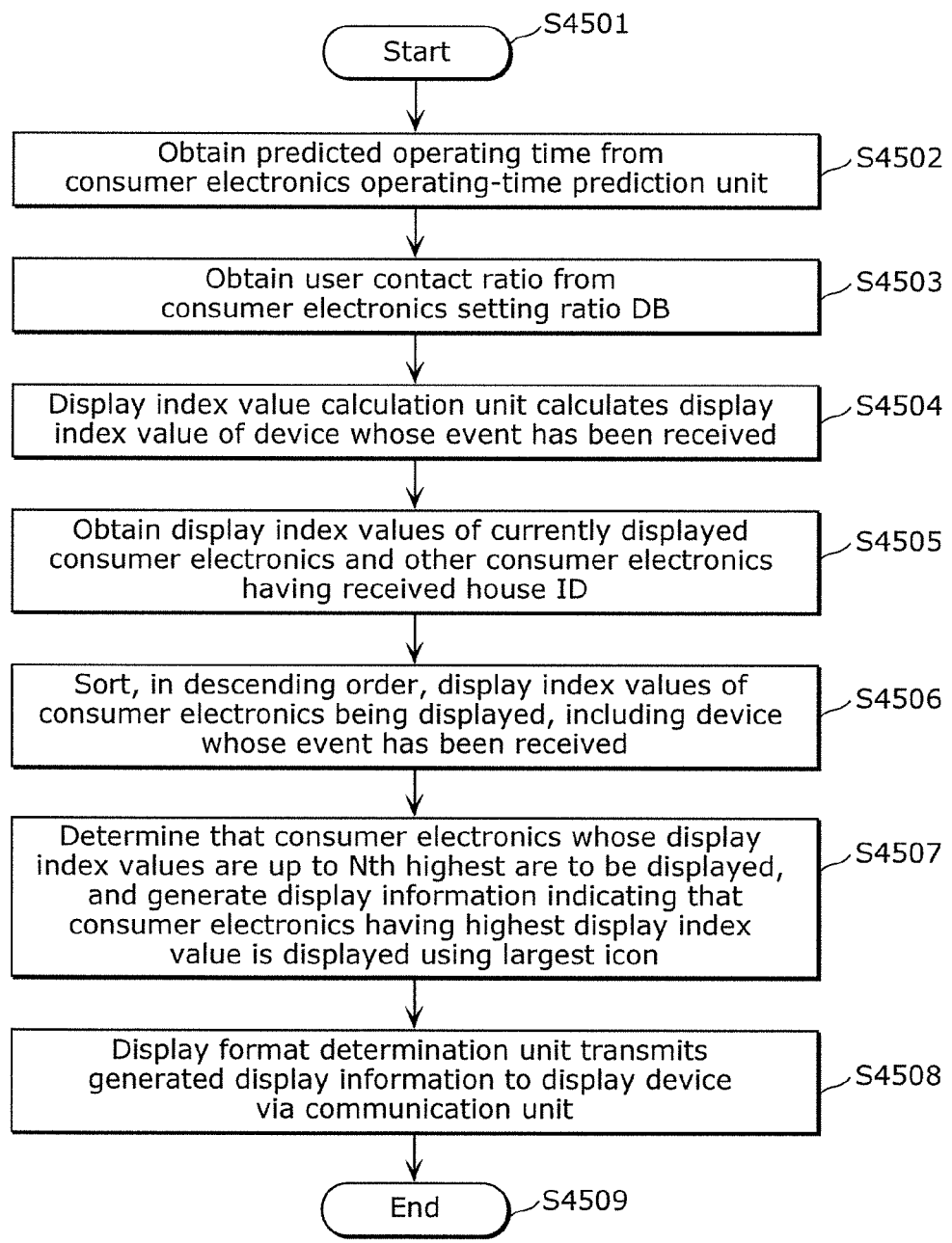
FIG. 25 is a flowchart illustrating an example of processing by a display index value calculation unit to calculate display indexes, in Embodiment 3.

FIG. 25 is a flowchart illustrating an example of processing by the display index value calculation unit to calculate display indexes, in Embodiment 3.

First, in S4501, the display index value calculation unit (4002) starts calculating a display index.

Next, in S4502, the display index value calculation unit (4002) obtains a predicted operating time from the consumer electronics operating-time prediction unit (4001).

Next, in S4503, the display index value calculation unit (4002) obtains a user contact ratio from, for example, the table illustrated in FIG. 24.

Next, in S4504, the display index value calculation unit (4002) calculates a display index value of a device whose event has been received.

In the present embodiment, the display index value calculation unit (4002) calculates a display index value using, for example, the formula below.

Display index value=(predicted operating time×user operation ratio during operating time for consumer electronics type)+(sum total of average operation times of user operation events)

Here, a description is given of an example of calculation of a display index value, with reference to FIGS. 22 to 24.

For example, the consumer electronics operating-time prediction unit (4001) refers to FIG. 22, to calculate that the operating time 4203 of a washing machine is 61 minutes. Next, the consumer electronics operating-time prediction unit (4001) refers to (a) of FIG. 24, to obtain a default user contact ratio of a washing machine, that is, 0.05.

In this manner, the consumer electronics operating-time prediction unit (4001) can calculate the display index value of the washing machine illustrated in FIG. 22, that is, "3.05". It should be noted that although a user operation event is not present in the example illustrated in FIG. 22, if a user operation event is present, a total value of average operation times for the operation illustrated in (c) of FIG. 24 is added.

Furthermore, the consumer electronics operating-time prediction unit (4001) refers to FIG. 23, to calculate the operating time of a vacuum cleaner (a total of the times 4303 and 4306) which is 10 minutes. Next, the consumer electronics operating-time prediction unit (4001) refers to (a) of FIG. 24, to obtain the default user contact ratio of a vacuum cleaner, that is, "1".

In this manner, the consumer electronics operating-time prediction unit (4001) can calculate the display index value of the vacuum cleaner illustrated in FIG. 23, that is, "10"

Consequently, the priority levels of the consumer electronics devices illustrated in FIGS. 22 and 23 are in the order of "vacuum cleaner" and "washing machine".

It should be noted that the above has described an example of weighting with a user operation ratio for each consumer electronics device, but the present embodiment is not limited to this. It is sufficient that, for example, weighting with a user operation ratio during the operation of a consumer electronics device is performed, and the result can be used for a display index value.

Next, referring back to FIG. 25, in S4505, the display index value calculation unit (4002) obtains consumer electronics devices already displayed on the portal screen and having a house ID with which the latest event has been received, and display index values for the consumer electronics devices.

Next, in S4506, the display index value calculation unit (4002) sorts, in descending order, all the display index values for consumer electronics types included in the latest events calculated in S4504 and currently displayed consumer electronics devices having the same house ID and obtained in S4505.

Next, in S4507, the display format determination unit (1102) determines that consumer electronics devices corresponding up to the Nth highest display index value are to be displayed, and generates an instruction (display information) indicating that a consumer electronics device having the highest display index value is displayed using the largest icon.

Figure 26:
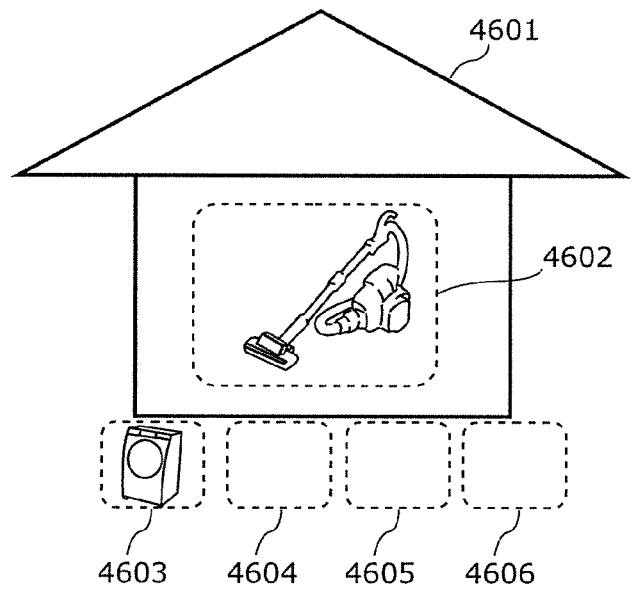
FIG. 26 illustrates an example of a display screen displayed in a specific display format in Embodiment 3.

Here, a description is given of a relation between a display index value and a display position on the display screen of a display device, with reference to FIG. 26.

FIG. 26 illustrates an example of a display screen displayed in a specific display format in Embodiment 3.

FIG. 26 illustrates a house icon (4601) identified by a house ID. An area 4602 in and areas 4603 to 4606 below the house icon (4601) show consumer electronics devices being operated in a house associated with the house icon (4601).

In the specific display format illustrated in FIG. 26, for example, a consumer electronics device having the highest display index value is shown in the area 4602 in the house icon (4601). Consumer electronics devices having the second, third, fourth and fifth highest display index values are shown in the areas below the house icon (4601) starting from the area 4603 to the right.

In the present embodiment, in S4507, the display format determination unit (1102) determines that, among consumer electronics devices having the house ID, consumer electronics devices corresponding up to the Nth highest display index value are to be displayed on a portal screen. The display format determination unit (1102) generates an instruction (display information) indicating that a consumer electronics icon for a consumer electronics device having the highest display index value is to be displayed in the area 4602 in the house icon (4601) and consumer electronics devices having the second, third, fourth, and fifth highest display index values are to be displayed in the areas 4603 to 4606.

It should be noted that an icon display method illustrated in FIG. 26 is an example, and is not limited to such a case. It is sufficient that a method is for displaying icons such that the higher a user operation ratio is, the more noticeable an icon for a device having the user operation ratio is displayed.

Next, in S4508, the display format determination unit (1102) transmits the generated instruction (display information) to a display device via the communication unit (1101).

Then, this processing flow ends in S4509.

[Example of Display Screen]

Figure 27:
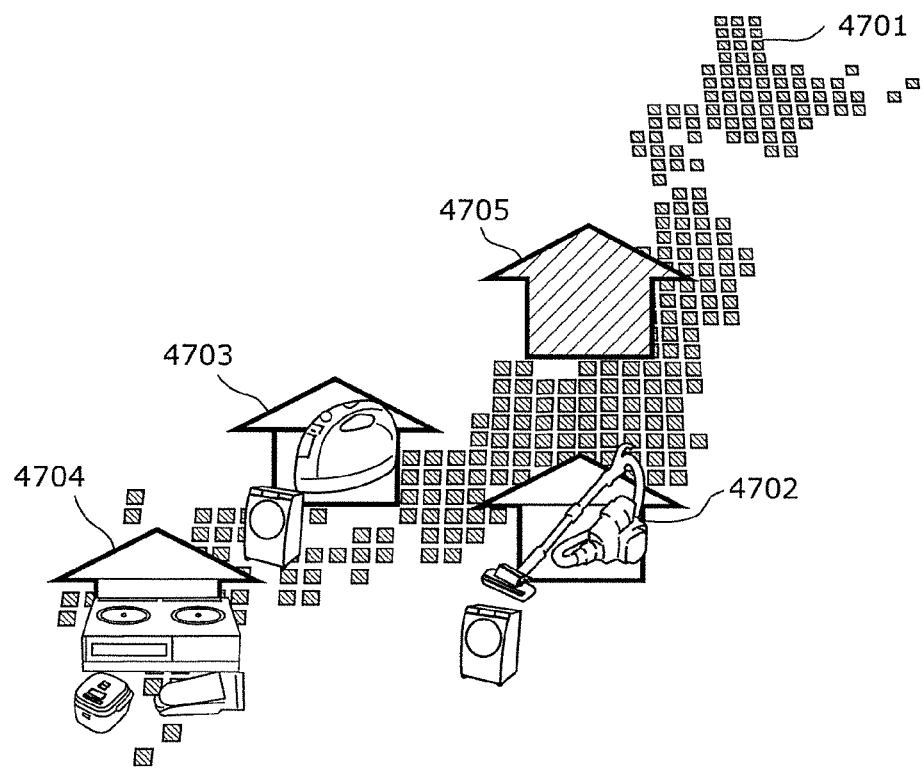
FIG. 27 illustrates another example of a display screen displayed in a specific display format in Embodiment 3.

FIG. 27 illustrates another example of the display screen displayed in a specific display format in Embodiment 3.

FIG. 27 illustrates an example of a display screen displayed on the display device, based on the display information generated by processing illustrated in FIG. 25. House icons are mapped on the map on the portal screen (display screen) illustrated in FIG. 27, and it can be determined at a glance what consumer electronics device is currently operated in a house in which area. It should be noted that as illustrated in FIG. 27, a house icon (4705) of a house in which no consumer electronics device is operating may be displayed shaded.

Figure 28:
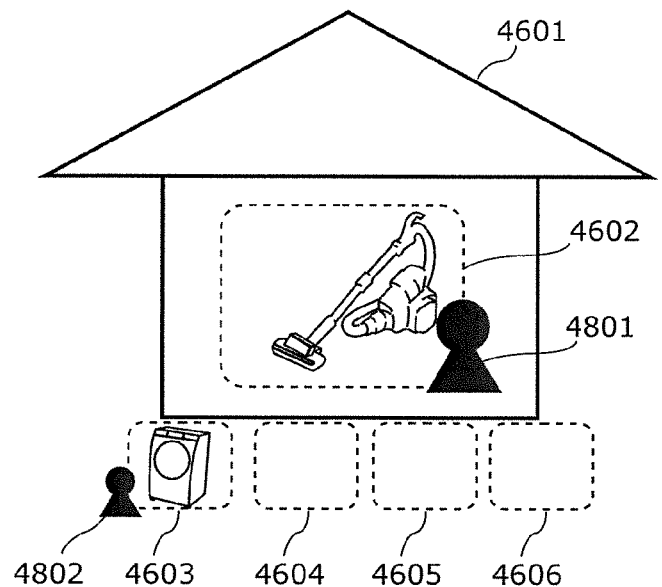
FIG. 28 illustrates an example of a display screen obtained by modifying the display screen in FIG. 26.
Figure 29:
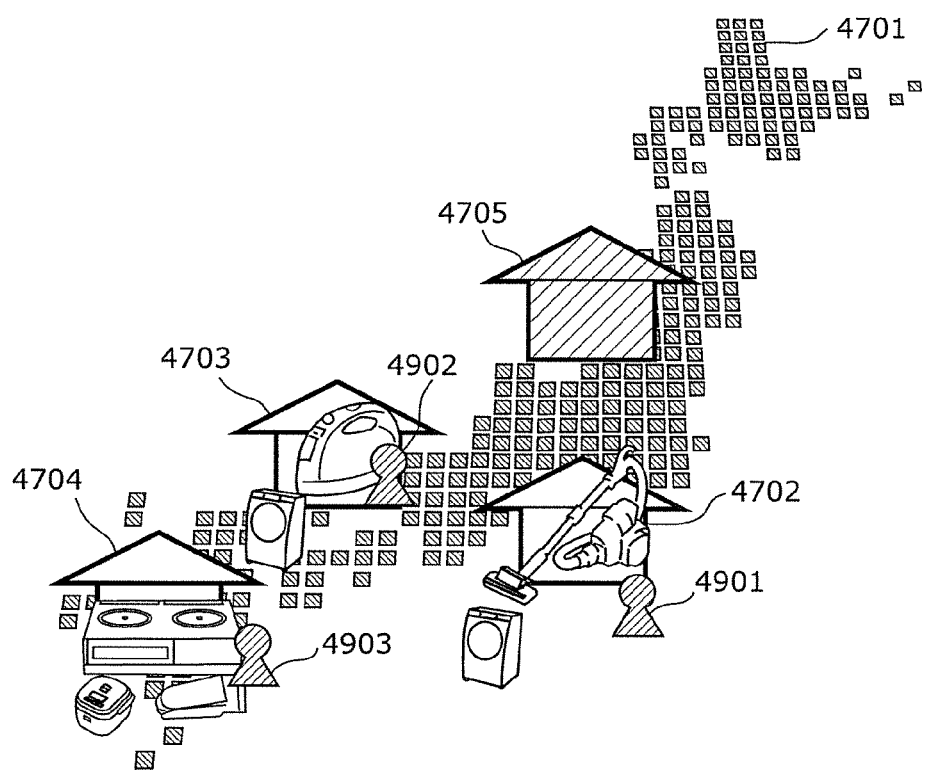
FIG. 29 illustrates an example of a display screen obtained by modifying the display screen in FIG. 27.

It should be noted that the display screens in FIGS. 26 and 27 may be further modified. FIG. 28 illustrates an example of a display screen obtained by modifying the display screen in FIG. 26, and FIG. 29 illustrates an example of a display screen obtained by modifying the display screen in FIG. 27.

FIG. 28 illustrates an example of the case where a person icon representing a user is displayed on the display screen in FIG. 26 when the user makes operation to put a consumer electronics device into operation. FIG. 29 illustrates an example of the case where a person icon representing a user is displayed on the display screen in FIG. 27 when the user makes operation to put a consumer electronics device into operation.

Specifically, the display unit of a display device displays an icon indicating that user operation is performed, near a consumer electronics icon associated with a consumer electronics device on which user operation is performed, among consumer electronics icons. Furthermore, the display unit of a display device may, as a specific display format, superimpose on a background image a consumer electronics icon and a person icon selected in accordance with a predetermined display priority level from among plural person icons indicating plural users who are display targets, and may display the resultant image on a display screen.

Here, a predetermined display priority level is determined using information pieces on plural consumer electronics devices received by the communication unit (1101) in the server (1100) or (3001), the information pieces pertaining to plural users.

In the present embodiment, as illustrated in FIG. 28, if the latest events stored in the consumer electronics DB group (1103) are included in the operations illustrated in (b) and (c) of FIG. 24 and require user operation, person icons (4801) and (4802), for example, are displayed during the average operation time, on the side of the consumer electronics icons of consumer electronics devices related to the events. Similarly, as illustrated in FIG. 29, if the latest events stored in the consumer electronics DB group (1103) are included in the operations illustrated in (b) and (c) of FIG. 24, and require user operation, person icons (4901), (4902), and (4903), for example, are displayed, during the average operation time, on the side of the consumer electronics icons of consumer electronics devices related to the events.

In this manner, the number of persons in a house can be estimated, and thus the state of a house can be shared in real time, on the portal screens (display screens) illustrated in FIGS. 28 and 29.

Advantageous Effects

As described above, the information providing method according to the present embodiment can provide a display mode focusing in particular on operation which a user has to perform to operate a consumer electronics device.

More specifically, according to the information providing device according to the present embodiment, a consumer-electronics operation time is predicted for each of the consumer electronics devices, based on the information pieces on the received consumer electronics devices, the consumer-electronics operation time indicating a time period in which the consumer electronics device operates, and the consumer-electronics operating time is weighted with a user operation time to calculate a display index value for determining a display size and a display position of each of one or more consumer-electronics icons that are the one or more objects associated with the one or more consumer electronics devices including the one or more filtered information pieces. Accordingly, based on the display index value transmitted by the server, the display size and the display position of each of the one or more consumer-electronics icons on the display screen can be determined, and the one or more consumer-electronics icons can be displayed on the display screen.

According to the information providing device according to the present embodiment, the one or more consumer-electronics icons and a person icon selected, in accordance with a display priority level that is predetermined, from among person icons representing users who are display targets, can be superimposed on a background image and displayed on the display screen, as the specific display format.

Here, the display priority level is determined using information pieces pertaining to the users, the information pieces being the information pieces on the received consumer electronics devices. It should be noted that the display priority level may be determined using an operating time of each of the consumer electronics devices, as the information pieces on the consumer electronics devices. Further, the display priority level may be determined using a cumulative operating time of each of the consumer electronics devices, as the information pieces on the consumer electronics devices.

In this way, according to the information providing method according to the present embodiment, in addition to the operation state of a consumer electronics device, the display priority level of a consumer electronics device which requires a user operation can be increased. Accordingly, the display mode of a portal screen can be provided on which the display size of information (icon) corresponding to a consumer electronics device which a user needs to operate is increased if the operation states of consumer electronics devices at houses are viewed on a portal screen. Accordingly, a user who is looking at this portal screen can see the actual action of a person at the house in real time on a portal screen, rather than simply checking the operation state of a consumer electronics device.

Accordingly, the information providing method according to the present embodiment can provide various types of voluminous information in a readily viewable manner.

Embodiment 4

A description is given of display information for display by a display device in a specific display format on a display screen, the display information being generated by a display format determination unit (1102) according to the present embodiment.

[Configuration]

The display format determination unit (1102) performs processing for generating a specific display format for deforming a background image such that plural person icons or plural consumer electronics icons do not overlap and displaying the resultant image. In addition to the processing by the display format determination unit (1102) according to Embodiments 1 to 3, the display format determination unit (1102) further restores a deformed shape of the background image to an original shape when the consumer-electronics icons displayed are switched after the background image is deformed and displayed, and if consumer-electronics icons superimposed and displayed on the background image in the original shape overlap, further performs processing for generating a specific display format for deforming again and displaying the background image. Here, a background image is a map, for example.

Figure 30:
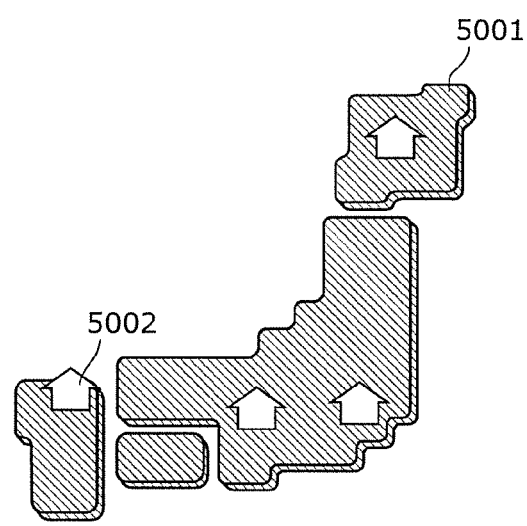
FIG. 30 illustrates an example of a display screen displayed in a specific display format in Embodiment 4.

FIG. 30 illustrates an example of a display screen displayed in a specific display format in Embodiment 4.

FIG. 30 illustrates an example of a UI generated by the display format determination unit (1102), and an example of a UI in the case of effectively displaying plural users within one screen.

A background map image (5001) in FIG. 30 is an image which shows areas to be displayed, and is an image determined by the service to be provided or a user. The background map image (5001) may be, for example, a global map other than a Japanese map, and may be a map of Kinki district, for instance. Furthermore, the background map image (5001) may be an actual map, and may be a virtual map used in contents of a game, for instance.

An user icon (5002) is an icon representing a user who is a display target. The user icon (5002) is superimposed and displayed on the background map image (5001) according to a current position of the user. The user icon (5002) may be, for example, an icon having the shape of a person, face, house, consumer electronics device, or the like, or a combination of some of these. If some of such shapes are combined, the sizes thereof may be different and may change dynamically.

[Processing Flow]

Figure 31:
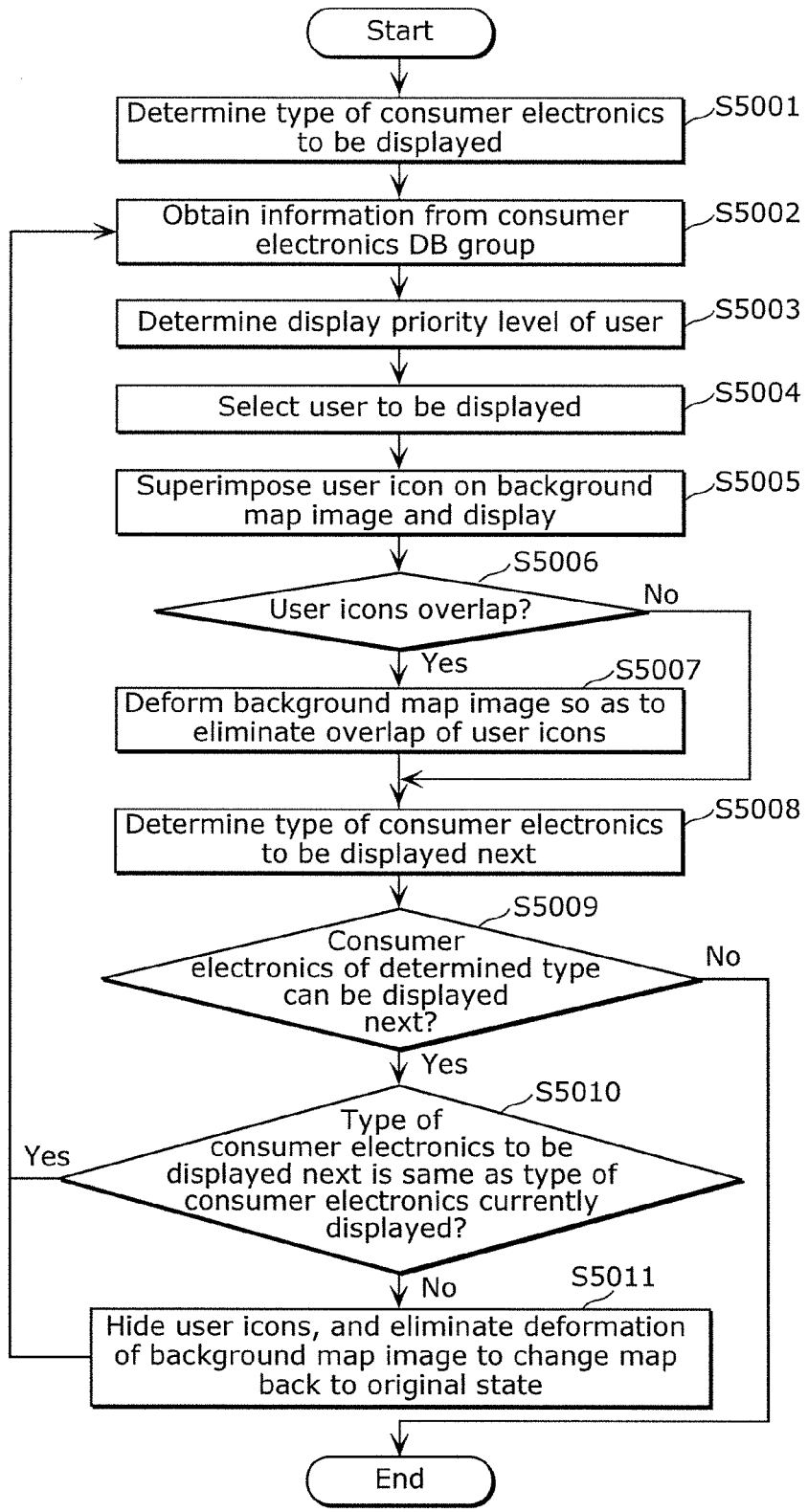
FIG. 31 is a flowchart illustrating an example of processing for generating the specific display format illustrated in FIG. 30.

FIG. 31 is a flowchart illustrating an example of processing for generating the specific display format illustrated in FIG. 30.

First, in S5001, the display format determination unit (1102) determines the type of a consumer electronics device to be displayed. The type may be determined by a service provider or may be determined by a user. Furthermore, a display target may be limited by a certain category such as the attribute of a consumer electronics device or the attribute of a user, rather than being limited to the type of a consumer electronics device.

Next, in S5002, the display format determination unit (1102) obtains information pertaining to a user who is a display target from the consumer electronics DB group (1103), the information including a house ID, a consumer electronics type, an event key, an event value, a date, and time, for instance.

Next, in S5003, the display format determination unit (1102) determines a display priority level of the user, based on the information obtained from the consumer electronics DB group (1103). In the present embodiment, the display format determination unit (1102) determines a display priority level, using an operating time of a consumer electronics device calculated from the information obtained from the consumer electronics DB group (1103) and a cumulative value of operating times. It should be noted that to determine a display priority level, a value may be used which indicates the degree of intimacy between users, a ranking of a game or the like, or the number of comments in the case of a service with a chat function, other than the operating time of a consumer electronics device.

Next, in S5004, the display format determination unit (1102) selects a user to be displayed, based on the determined display priority level. In the present embodiment, the display format determination unit (1102) compares the determined display priority level with a certain specific value, and selects a user associated with a display priority level exceeding the specific value.

Next, in S5005, the display format determination unit (1102) superimposes a user icon (5002) according to the selected user, at a place according to user position information on the background map image (5001), and display the resultant image.

Next, in S5006, the display format determination unit (1102) determines whether plural user icons (5002) displayed on, for instance, a display screen of the display device overlap. Here, if the icons overlap (YES in S5006), processing of S5007 is performed, whereas if the icons do not overlap (NO in S5006) processing of S5008 is performed.

Next, in S5007, the display format determination unit (1102) deforms the background map image (5001) so as to eliminate the overlap of the user icons (5002). Specifically, this is achieved by locally expanding the map image while leaving the shape as a map so that the user icons (5002) are separate. It should be noted that if the overlap of the user icons (5002) cannot be eliminated even by this deformation, icons may be hidden one by one in the ascending order of the display priority level.

Figure 32:
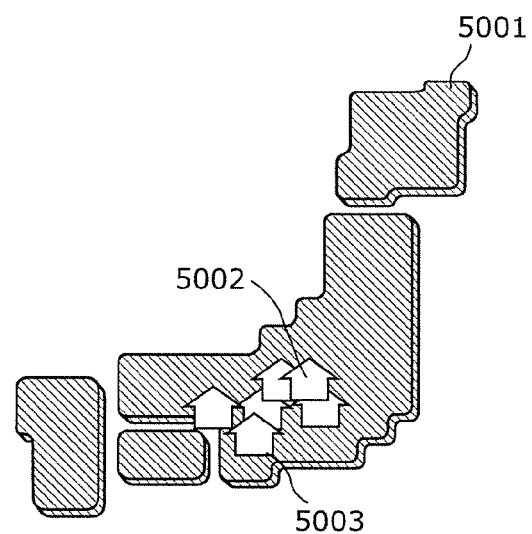
FIG. 32 illustrates an example of a display format in which user icons overlap in Embodiment 4.
Figure 33:
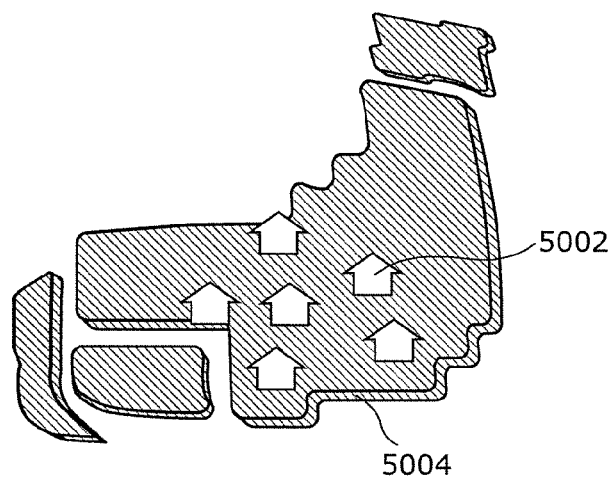
FIG. 33 illustrates an example of a display format obtained by deformation of the background map image in Embodiment 4.

FIG. 32 illustrates an example of a display format in which user icons overlap in Embodiment 4. FIG. 33 illustrates an example of a display format obtained by deformation of the background map image in Embodiment 4.

In other words, FIG. 32 illustrates an example in which the user icons (5002) are determined to be overlapping by the processing of S5006, resulting in a display (5003) in which the user icons (5002) are overlapping, and thus an icon under another icon is not readily viewed.

In contrast, FIG. 33 illustrates an example in which the background map image (5001) is deformed by the processing of S5007 to eliminate the overlap of the user icons (5002). Only a portion of a deformed background map image (5004) where the user icons (5002) are closely displayed is expanded while the original shape of the map is maintained. This eliminates the overlap of the user icons (5002) and achieves a readily viewable display.

Next, in S5008, the display format determination unit (1102) determines the type of a consumer electronics device to be displayed next. As with S5001, this may be determined by a service provider or by a user. Furthermore, a display target may be limited by a certain category such as the attribute of a consumer electronics device or the attribute of a user, rather than being limited to the type of a consumer electronics device.

Next, in S5009, the display format determination unit (1102) determines whether the type of a consumer electronics device can be displayed next. Here, if a device of this type can be displayed (YES in S5009), processing of S5010 is performed, whereas if a device of this type cannot be displayed (NO in S5009), the processing ends.

Next, in S5010, the display format determination unit (1102) determines whether the type of a consumer electronics device to be displayed next is the same as the type of a consumer electronics device currently displayed. Here, if the types are the same (YES in S5010), processing of S5002 is performed, and if the types are not the same (NO in S5010), processing of S5011 is performed.

Next, in S5011, the display format determination unit (1102) hides the user icons (5002), and eliminates the deformation of the background map image (5001) to restore the map to the original state.

Advantageous Effects

The information providing method according to the present embodiment can provide even various types of voluminous information in a readily viewable manner.

It should be noted that with the information providing method according to the present embodiment, when the types of consumer electronics devices to be displayed are switched one after another, a background map image in the original shape may be displayed between the switches, and the images may transition.

Figure 34:
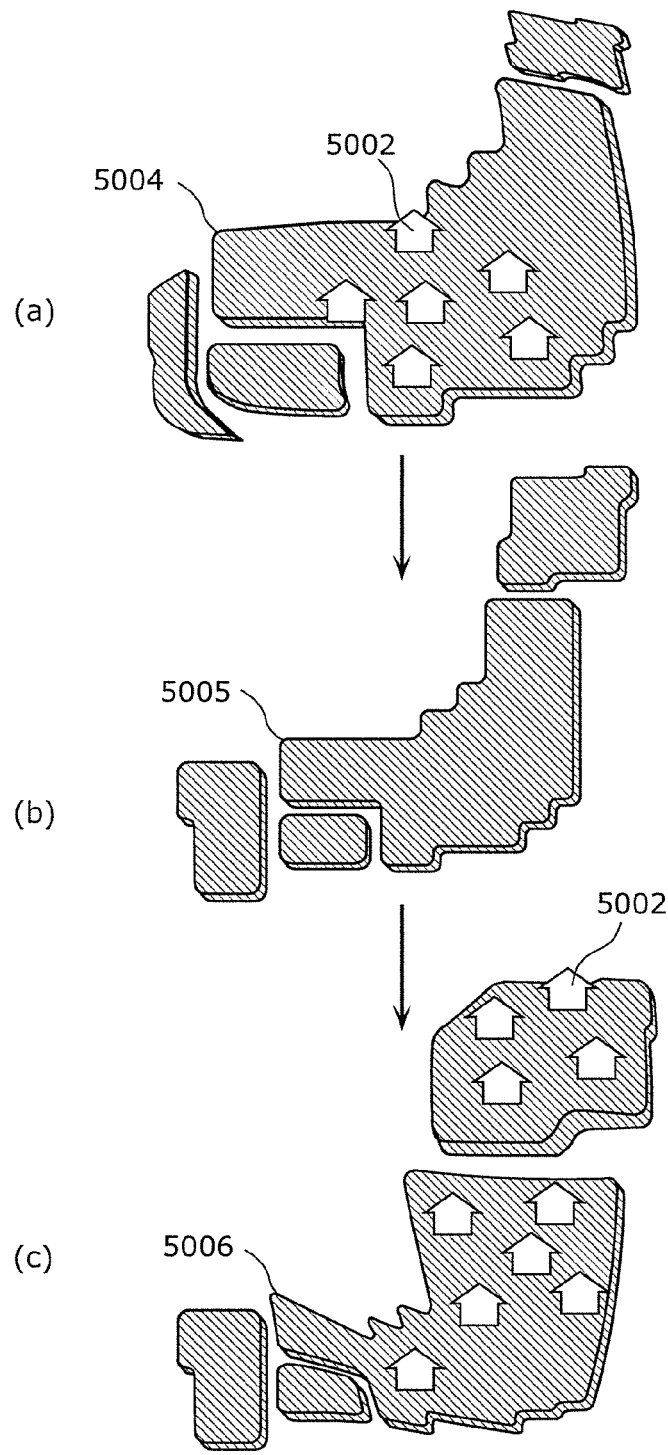
FIG. 34 illustrates in (a) to (c) an example of transition of display formats in Embodiment 4

FIG. 34 illustrates an example of transition of the display formats in Embodiment 4. Part (a) of FIG. 34 illustrates the background map image (5004) deformed in S5007, and (b) of FIG. 34 illustrates an example of a display format in the case where the user icons (5002) are hidden in S5011 and the image has transitioned to a background map image (5005) in the original shape.

Part (c) of FIG. 34 illustrates an example of a display format in which user icons (5002) associated with the type of consumer electronics devices which are the next display targets are displayed after that, and the image has transitioned to a background map image (5006) deformed according to the display targets.

In this way, when the types of consumer electronics devices to be displayed are switched one after another, a background map image in the original shape may be displayed between the switches and the images transition, which achieves advantageous effects of allowing a user to readily recognize the shape of a map.

Embodiment 5

The present embodiment describes the case where display information is created which is for display in a specific display format in which operation information and state change information of a consumer electronics device in a house, which are generated by, for example, user operation, are collected as events, and the events are shared by display devices on a social network.

In the present embodiment, a specific display format is generated in which when a user uses a consumer electronics device, life information of the user is obtained by the consumer electronics device itself or a sensor disposed near the consumer electronics device.

The present embodiment describes, in particular, the case where a consumer electronics device is a coaster which includes a weight sensor and a communication device, assuming a scene in which a user drinks coffee. Specifically, life information of a user is obtained since the user places a coffee cup on a coaster or lifts the coffee cup from the coaster in a scene in which the user drinks coffee.

[Configuration of Wireless Coaster]

Figure 35A:
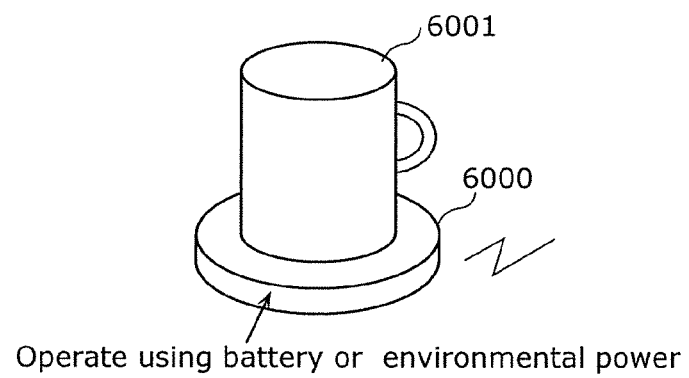
FIG. 35A illustrates an example of the external appearance of a wireless coaster in Embodiment 5.
Figure 35B:
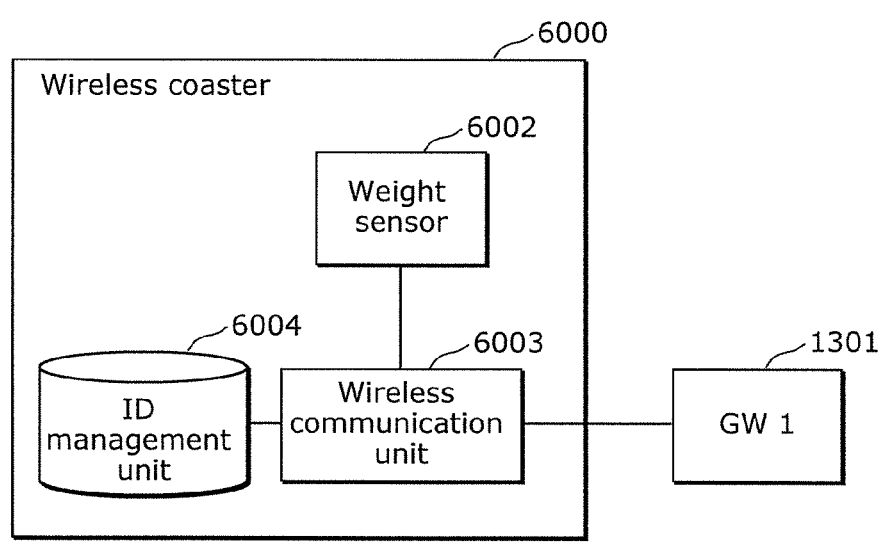
FIG. 35B illustrates an example of the configuration of the wireless coaster in Embodiment 5.

FIG. 35A illustrates an example of the external appearance of a wireless coaster in Embodiment 5. FIG. 35B illustrates an example of the configuration of the wireless coaster in Embodiment 5.

A wireless coaster (6000) illustrated in FIG. 35A is formed as a rest on which a cup (6001) is put. The wireless coaster (6000) receives power supply from a battery or environmental power such as solar power, and senses the weight and temperature of an object placed on top and sound, for instance. The wireless coaster (6000) transmits a result of the sensing to a server using a wireless function.

The wireless coaster (6000) illustrated in FIG. 35A is a first consumer electronics device that has a weight measuring function, for example, and includes a weight sensor (6002), a wireless communication unit (6003), and an ID management unit (6004), as illustrated in FIG. 35B.

The wireless coaster (6000) (in particular, the wireless communication unit (6003)) includes, for example, a third memory and a CPU as a hardware configuration. The third memory stores a program for achieving a function as, for example, the wireless communication unit (6003). The third memory is a readable recording medium or a readable and writable recording medium, for example. Examples of the recording medium include a semiconductor memory, an optical disc, a hard disk, and others.

For example, the wireless coaster (6000) reads the above program from the third memory and causes the CPU to execute the program, thus allowing the wireless communication unit (6003) to function.

The above example shows a configuration of causing the CPU to execute the program for achieving a function as the wireless communication unit (6003), but the present embodiment is not limited to this. For example, a dedicated signal processing circuit which functions as the wireless communication unit (6003) may be used for the configuration.

The ID management unit (6004) manages an identifier for uniquely identifying the wireless coaster (6000). Accordingly, the ID management unit (6004) manages the ID of the coaster itself.

The identifier which the ID management unit (6004) manages is stored in a memory (not illustrated), for example. A memory which stores an identifier is a readable and writable recording medium, for example. Examples of the readable and writable recording medium include a semiconductor memory, an optical disc, a hard disk, and others.

The weight sensor (6002) has a weight measuring function, and measures a change in weight. The weight sensor (6002) measures the weight of a cup by the cup being placed on the wireless coaster (6000). In the present embodiment, the weight sensor (6002) senses the weight of an object placed on top of the wireless coaster (6000), using a pressure sensor, a distortion sensor, or the like, from information such as pressure or distortion.

The wireless communication unit (6003) transmits, to the server (1100) via a network, weight information indicating a change in the weight of an object measured by the weight sensor (6002) and an ID which is an identifier for uniquely identifying the wireless coaster (6000). In the present embodiment, the wireless communication unit (6003) communicates with a GW 1 (1301) by, for example, ZigBee, Bluetooth (registered trademark), wireless means such as specified low power radio and a wireless LAN. It should be noted that the wireless communication unit (6003) may directly transmit data to the server (1100) via wireless means such as third generation (3G) wireless communication.

[Processing Flow by Wireless Coaster]

Figure 36:
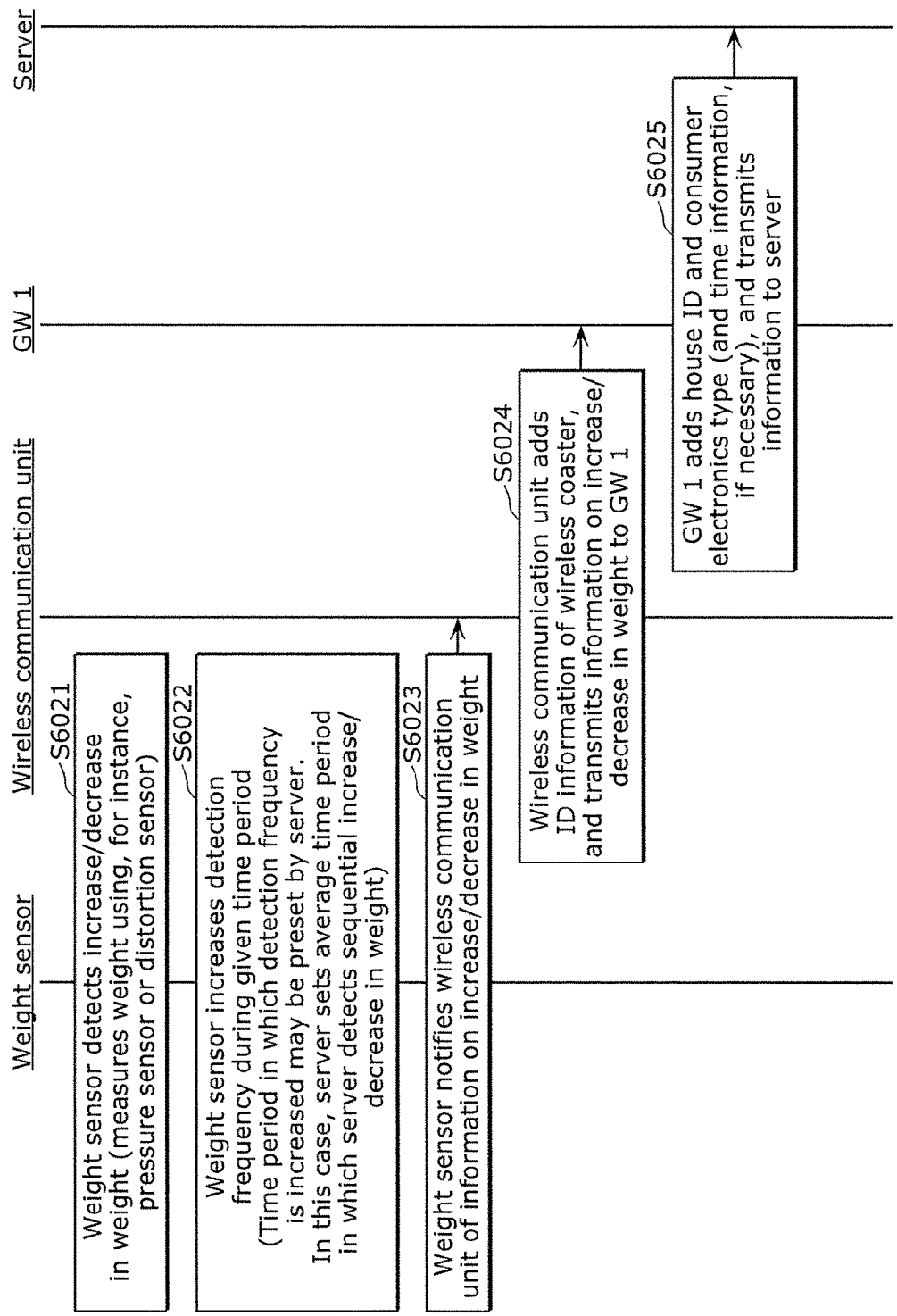
FIG. 36 is a flowchart illustrating an example of processing by the wireless coaster to detect a state in Embodiment 5.

FIG. 36 is a flowchart illustrating an example of processing by the wireless coaster to detect a state in Embodiment 5.

First, in S6021, the weight sensor (6002) detects an increase/decrease (change) in weight using a pressure sensor, a distortion sensor, or the like, and measures weight. It should be noted that the weight sensor (6002) may have a mechanism system such as a spring.

Next, in S6022, the weight sensor (6002) increases a detection frequency during a given time period. Here, the time in which detection frequency is increased may be preset by the server (1100). In this case, the server (1100) sets the average of time in which sequential increase and decrease in weight are detected. This saves power when a cup is usually not placed on the coaster and the coaster is not used.

Next, in S6023, the weight sensor (6002) notifies the wireless communication unit (6003) of information on the increase/decrease in weight (weight information indicating a change in weight).

Next, in S6024, the wireless communication unit (6003) adds ID information of the wireless coaster (6000), and transmits information on the increase/decrease in weight to the GW 1 (1301).

Next, in S6025, the GW 1 (1301) adds, to the information, a house ID and a consumer electronics type (and time information, if necessary), and thereafter transmits the information to the server (1100).

In this manner, the wireless coaster (6000) which has a weight measuring function can measure a change in the weight of an object, and transmit to the server (1100) weight information indicating a change in the measured weight and an identifier for uniquely identifying the wireless coaster (6000). Accordingly, if a cup is placed on top of the wireless coaster (6000), and also a liquid is further poured therein, the wireless coaster (6000) can detect a change in the weight and notify the server (1100) of the change.

[Configuration of Wired Coaster]

Figure 37:
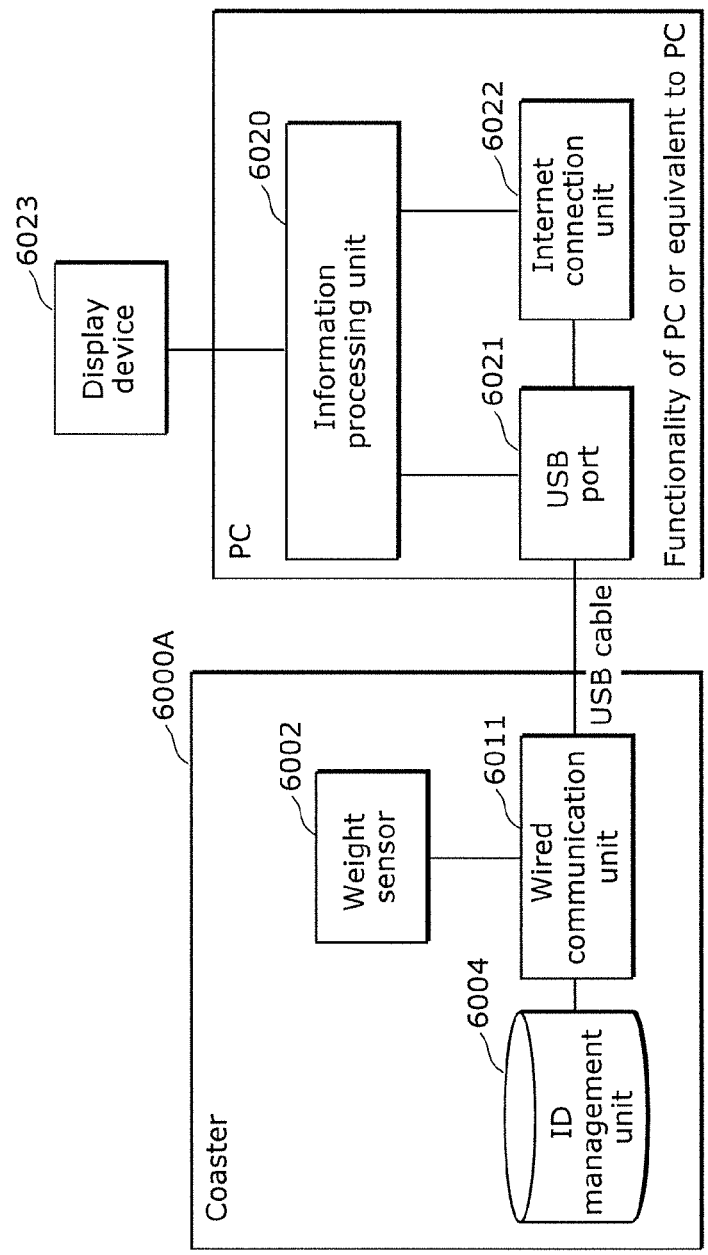
FIG. 37 illustrates an example of the configuration of a system when the wireless coaster is connected to a personal computer (PC) by wired connection, in Embodiment 5.

FIG. 37 illustrates an example of the configuration of a system when the wired coaster is connected to a personal computer by wired connection such as USB connection, in Embodiment 5. The same numerals are given to the equivalent elements to those in FIG. 35B, and a detailed description thereof is omitted.

A wired coaster (6000A) illustrated in FIG. 37 is, for example, a first consumer electronics device having a weight measuring function, and includes a weight sensor (6002), an ID management unit (6004), and a wired communication unit (6011), as illustrated in FIG. 37.

The wired coaster (6000A) (in particular, the wired communication unit (6011)) illustrated in FIG. 37 includes a third memory and a CPU, for example. The third memory stores a program for achieving a function as the wired communication unit (6011), for example. The third memory is a readable recording medium or a readable and writable recording medium, for example. Examples of the recording medium include a semiconductor memory, an optical disc, a hard disk, and others.

The wired coaster (6000A) illustrated in FIG. 37 has a configuration of, for example, reading the above program from the third memory, and causing the CPU to execute the program, thus allowing the wired communication unit (6011) to function.

The above example shows a configuration of causing the CPU to execute the program for achieving a function as the wired communication unit (6011), but the present embodiment is not limited to this. For example, a dedicated signal processing circuit which functions as the wired communication unit (6011) may be used for the configuration.

The wired communication unit (6011) transmits, to the server (1100) via a network, weight information indicating a change in the weight of an object measured by the weight sensor (6002), and an ID of an identifier for uniquely identifying the wired coaster (6000A). In the present embodiment, the wired communication unit (6011) is connected to a personal computer (hereinafter, PC) by, for example, a USB cable rather than wirelessly. Here, power may be supplied to the wired coaster (6000A) via a USB cable. In this case, the wired coaster (6000A) does not need to include a battery or the like.

A PC illustrated in FIG. 37 includes an information processing unit (6020), a USB port (6021), and an Internet connection unit (6022), and is connected to a display device (6023) such as a display.

The PC (in particular, the information processing unit (6020) and the Internet connection unit (6022)) illustrated in FIG. 37 includes a fourth memory and a CPU as a hardware configuration, for example. The fourth memory stores a program for achieving a function as the information processing unit (6020) and a program for achieving a function as the Internet connection unit (6022).

The fourth memory is a readable recording medium or a readable and writable recording medium, for example. Examples of the recording medium include a semiconductor memory, an optical disc, a hard disk, and others. The PC illustrated in FIG. 37 has a configuration of, for example, reading the above programs from the fourth memory and causing the CPU to execute the programs, thus allowing the information processing unit (6020) and the Internet connection unit (6022) to function.

The above example shows a configuration of causing the CPU to execute the program for achieving a function as the information processing unit (6020) and the program for achieving a function as the Internet connection unit (6022), but the present embodiment is not limited to this. For example, a dedicated signal processing circuit which functions as the information processing unit (6020) and a dedicated signal processing circuit which functions as the Internet connection unit (6022) may be used for the configuration.

Furthermore, the fourth memory which stores one of the information processing unit (6020) and the Internet connection unit (6022) and a dedicated signal processing circuit which functions as the other may be used for the configuration.

The information processing unit (6020) performs processing based on information notified from the USB port (6021)

and the wired coaster (6000A). Furthermore, the information processing unit (6020) displays images on the display device (6023).

It should be noted that although the present embodiment gives a description using a PC as an example, the present embodiment is not limited to this. The PC may be a consumer electronics device having a function equivalent to a PC, such as a tablet and a smart phone.

A main difference between the wireless coaster (6000) and the wired coaster (6000A) is the means of communication, and thus in the following description, if the difference as to whether the means of communication is wireless or wired does not involve the configuration and the method, the wireless coaster (6000) and the wired coaster (6000A) are not distinguished if not necessary, and are each simply referred to as a coaster.

[Processing Flow by Wired Coaster]

Figure 38:
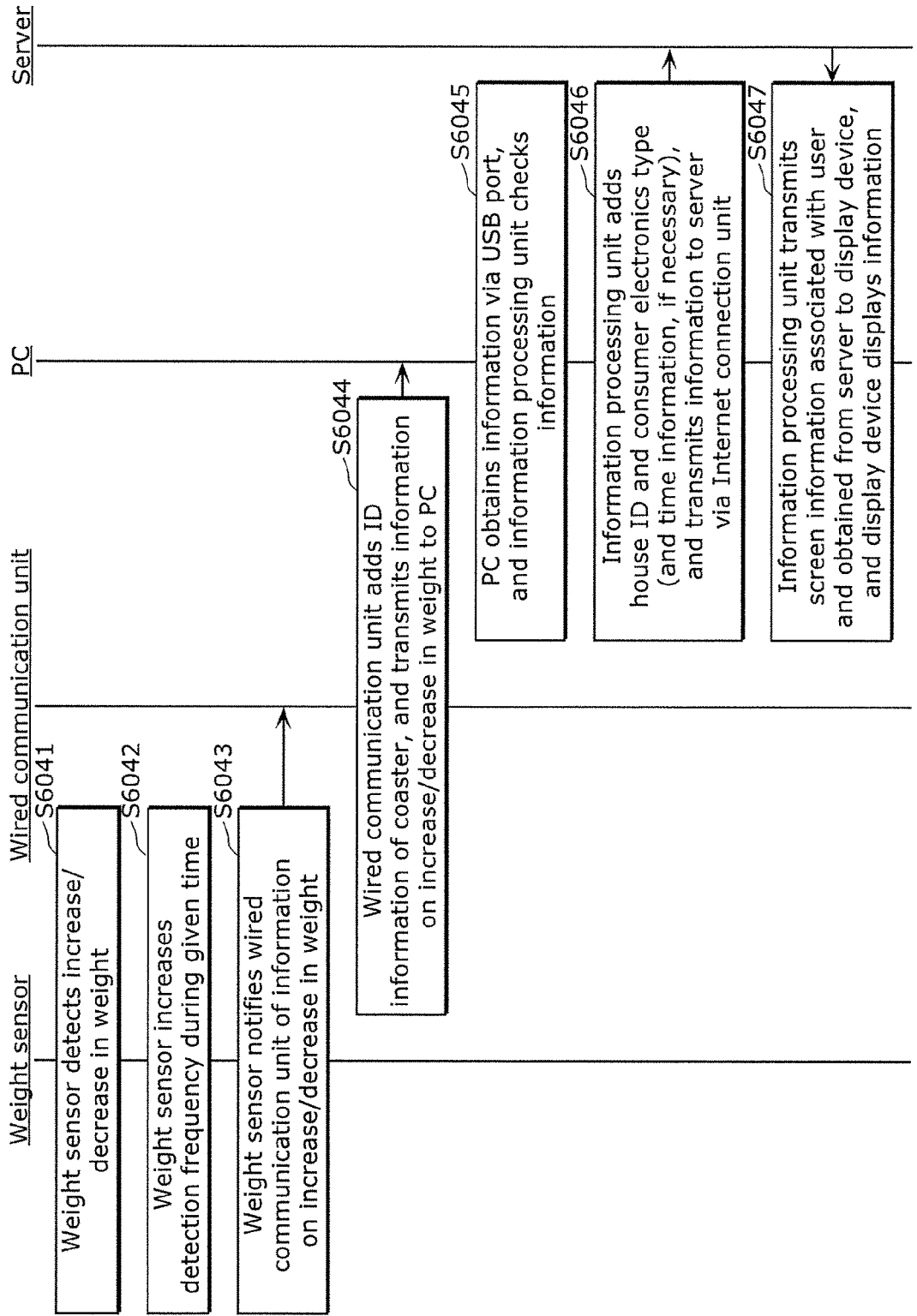
FIG. 38 is a flowchart illustrating an example of processing by the coaster to detect a state and cooperate with a PC in Embodiment 5.

FIG. 38 is a flowchart illustrating an example of processing by the coaster to detect a state and cooperate with a PC, in Embodiment 5.

First, in S6041, the weight sensor (6002) detects an increase/decrease in weight. Then, the weight sensor (6002) measures the weight using a pressure sensor, a distortion sensor, or the like, as stated above.

Next, in S6042, the weight sensor (6002) increases a detection frequency during a given time.

Next, in S6043, the weight sensor (6002) notifies the wired communication unit (6011) of information on the increase/decrease in weight.

Next, in S6044, the wired communication unit (6011) adds ID information of the wired coaster (6000A), and transmits the information on the increase/decrease in weight to a PC.

Next, in S6045, the PC obtains the information via the USB port (6021), and the information processing unit (6020) checks the information.

Next, in S6046, the information processing unit (6020) adds a coaster, a house ID and a consumer electronics type, (and time information, if necessary) to the information, and thereafter transmits the information to the server (1100) via the Internet connection unit (6022).

Next, in S6047, the information processing unit (6020) transmits screen information associated with a user and obtained from the server (1100) to the display device (6023), and the display device displays the information.

In this way, the PC can be used as a GW which transmits information to the server (1100) as the GW 1 (1301) functions. The PC itself also operates as an image display device, and thus a GW device may be excluded. Further, the mechanism of a power unit of the wired coaster (6000A) may be simplified.

[Example of Information Obtained from Coaster]

FIG. 39 illustrates an example of information obtained from the coaster in Embodiment 5.

As illustrated in (a) of FIG. 39, for example, information is obtained from a coaster, the information including a house ID assigned, a coaster as a consumer electronics type, a detection result as an event key, weight information indicating, for instance, 20.5 g as an event value, date, and time.

It should be noted that if the coaster has a clock function, the date and time may also be added to the information to be communicated. If the coaster does not have a clock function, the GW or the server (1100) assigns the date and time information. The coaster can notify information on a weight change to the server (1100) in such an information format.

An example of additional information is illustrated in (b) of FIG. 39. Additional information includes, for example, a coaster ID which is an identifier of a coaster.

It should be noted that a group ID may be further written in advance to the additional information when the coaster is to be shopped. If a group ID is assigned, when a user accesses a SNS site using the coaster, the user can join a community associated with the group ID. By setting a community, if a user does not use a coaster having the target group ID, the user may not participate in the community. Furthermore, a user ID can be prevented from being made public in the SNS site by adding in advance information indicating public or private. If such information is included in advance in a coaster in the above manner, a community to join can be explicitly determined, and the ID information of a coaster can be used to associate the coaster with a group, which is a setting at the server. Furthermore, it is also possible to prevent forgery by transmitting ID information of a coaster together with a home ID and others, being concealed by hashing.

[Example of Screen Information]

Figure 40:
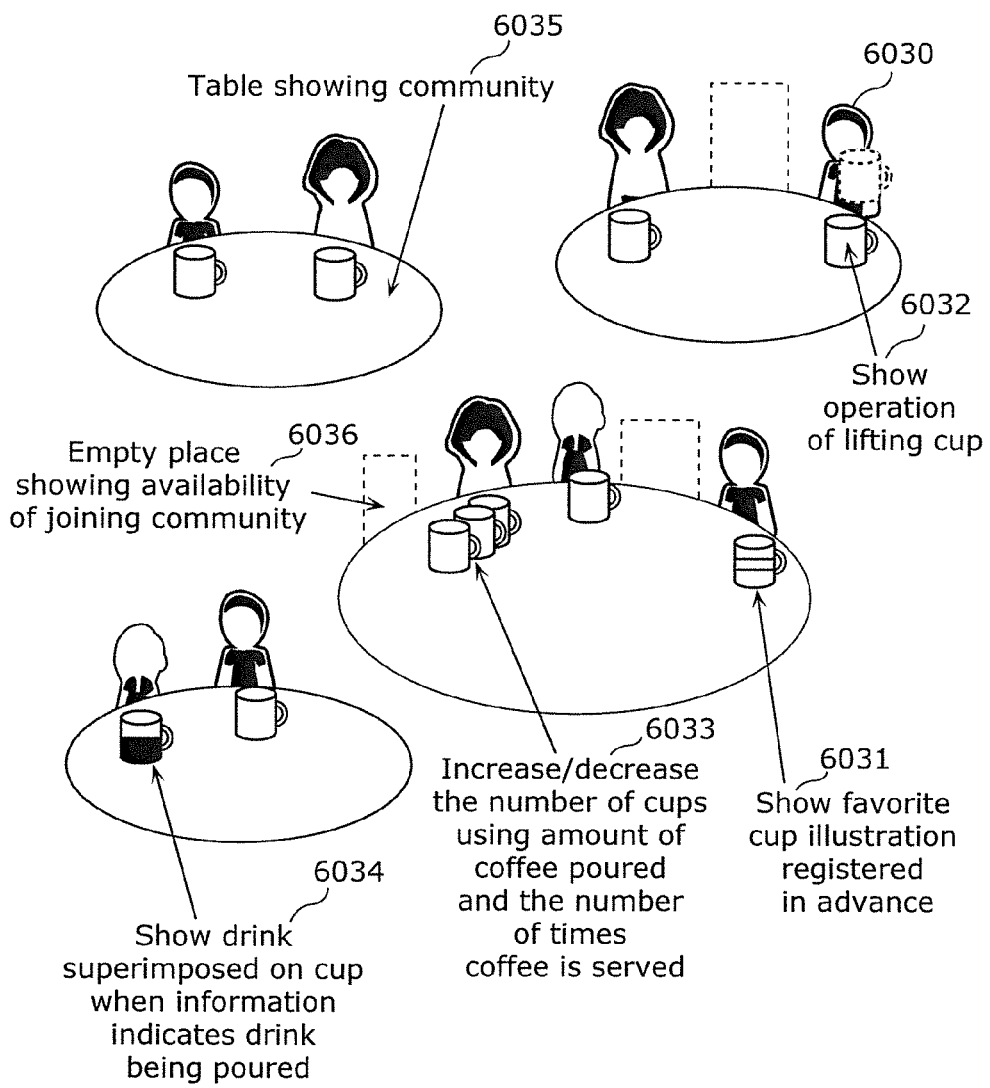
FIG. 40 illustrates an example of screen information displayed in conjunction with the coaster in Embodiment 5.

FIG. 40 illustrates an example of screen information displayed in conjunction with the coaster in Embodiment 5.

On the display screen illustrated in FIG. 40, communities as social networking service are each represented as a table (6035). Four communities are displayed on the display screen illustrated in FIG. 40.

Different subjects and friends are classified as categories at the tables illustrated in FIG. 40. Furthermore, at the tables, avatars (6030) representing characters with objects related to the characters are displayed, the characters appearing on a screen each as a user him/herself.

In the present embodiment, the avatars (6030) represent users at tables associated with the number of comments and the amount of recent coffee consumption of a user. The arrangement of the avatars (6030) or the sizes of the avatars (6030) may be changed depending on the number of comments and the amount of recent coffee consumption of a user. Furthermore, the arrangement and the sizes of the tables themselves can be changed based on the number of comments and the amount of recent coffee consumption of the entire community. This allows creating a screen that shows, in an intuitive manner, the state of comments being posted in the community and the state of comments being posted from users.

Cup illustration (6031) shows the illustration of a cup registered in advance, such as a user's favorite illustration, for example. In other words, if the weight of a cup and the illustration associated with the cup are registered in advance, a cup is estimated from weight information notified from a coaster, and the estimated cup or the estimated cup having an illustration associated therewith is displayed.

Reference numeral 6032 is an example of an avatar (screen) which shows operation of lifting a cup. Reference numeral 6033 is an example of an avatar (screen) which shows an increase/decrease in the number of cups, using information on the amount of coffee poured and the number of times coffee is served. Reference numeral 6034 is an example of an avatar (screen) showing coffee superimposed on a cup if the amount of coffee being currently poured is successfully measured based on the weight and estimated capacity of a cup. Reference numeral 6036 is an example of an image of an empty place showing the availability of joining a community. Reference numeral 6036 represents that a user can still join a community and participate in conversation, by a chair being simply prepared.

[Another Configuration of Wireless Coaster]

Figure 41:
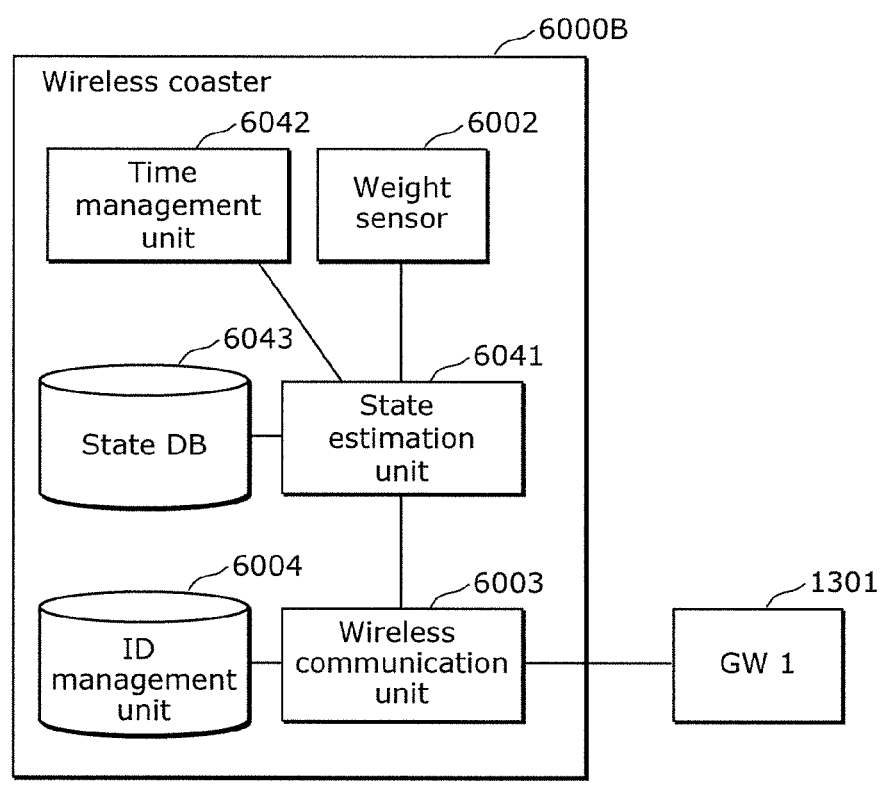
FIG. 41 illustrates an example of the configuration when the wireless coaster estimates a state in Embodiment 5.

FIG. 41 illustrates an example of the configuration when the wireless coaster estimates a state, in Embodiment 5. The same numerals are given to the equivalent elements to those in FIG. 35B, and a detailed description thereof is omitted.

Here, state estimation means estimating a state when a user drinks coffee, and the amount of coffee left, whether the user is holding a cup to drink coffee, and others are estimated.

In FIG. 41, a wireless coaster (6000B) includes a weight sensor (6002), a wireless communication unit (6003), an ID management unit (6004), a state estimation unit (6041), a state DB (6043), and a time management unit (6042)

The wireless coaster (6000B) (in particular, the wireless communication unit (6003), the state estimation unit (6041), and the time management unit (6042)) includes a third memory and a CPU as a hardware configuration, for example. The third memory stores, for example, a program for achieving a function as the wireless communication unit (6003), a program for achieving a function as the state estimation unit (6041), and a program for achieving a function as the time management unit (6042). The third memory is a readable recording medium or a readable and writable recording medium, for example. Examples of the recording medium include a semiconductor memory, an optical disc, a hard disk, and others.

The wireless coaster (6000B) has a configuration of, for example, reading the above programs from the third memory, and causing the CPU to execute the programs, thus allowing the wireless communication unit (6003), the state estimation unit (6041), and the time management unit (6042) to function.

The above example shows a configuration of causing the CPU to execute the programs for achieving functions of the wireless communication unit (6003), the state estimation unit (6041), and the time management unit (6042), but the present embodiment is not limited to this. For example, a dedicated signal processing circuit which functions as the wireless communication unit (6003), a dedicated signal processing circuit which functions as the state estimation unit (6041), and a dedicated signal processing circuit which functions as the time management unit (6042) may be used for the configuration.

Furthermore, a configuration may be adopted in which the third memory stores a program for causing at least one of the wireless communication unit (6003), the state estimation unit (6041), and the time management unit (6042) to function, and dedicated signal processing circuits are used for the rest of the units.

The state estimation unit (6041) estimates the amount of coffee left and whether a user is holding a cup to drink coffee, for instance. More specifically, the state estimation unit (6041) estimates the state of an object measured by the weight sensor (6002), from a change pattern of weight information received from the weight sensor (6002). Here, the state estimation unit (6041) may estimate, from the change pattern of the received weight information, whether a user of the wireless coaster (6000B) has placed a cup on the wireless coaster (6000B) or lifts the cup from the wireless coaster (6000B), as the state of an object. Furthermore, the state estimation unit (6041) may estimate the weight of an object used by a user of the wireless coaster (6000B), from the change pattern of the received weight information.

The state DB (6043) has information for determining a state.

The state DB (6043) is stored in the memory. The memory which stores the state DB (6043) is a readable and writable recording medium, for example. Examples of the readable and writable recording medium include a semiconductor memory, an optical disc, a hard disk, and others.

The time management unit (6042) manages time.

[Processing Flow by Coaster]

Figure 42:
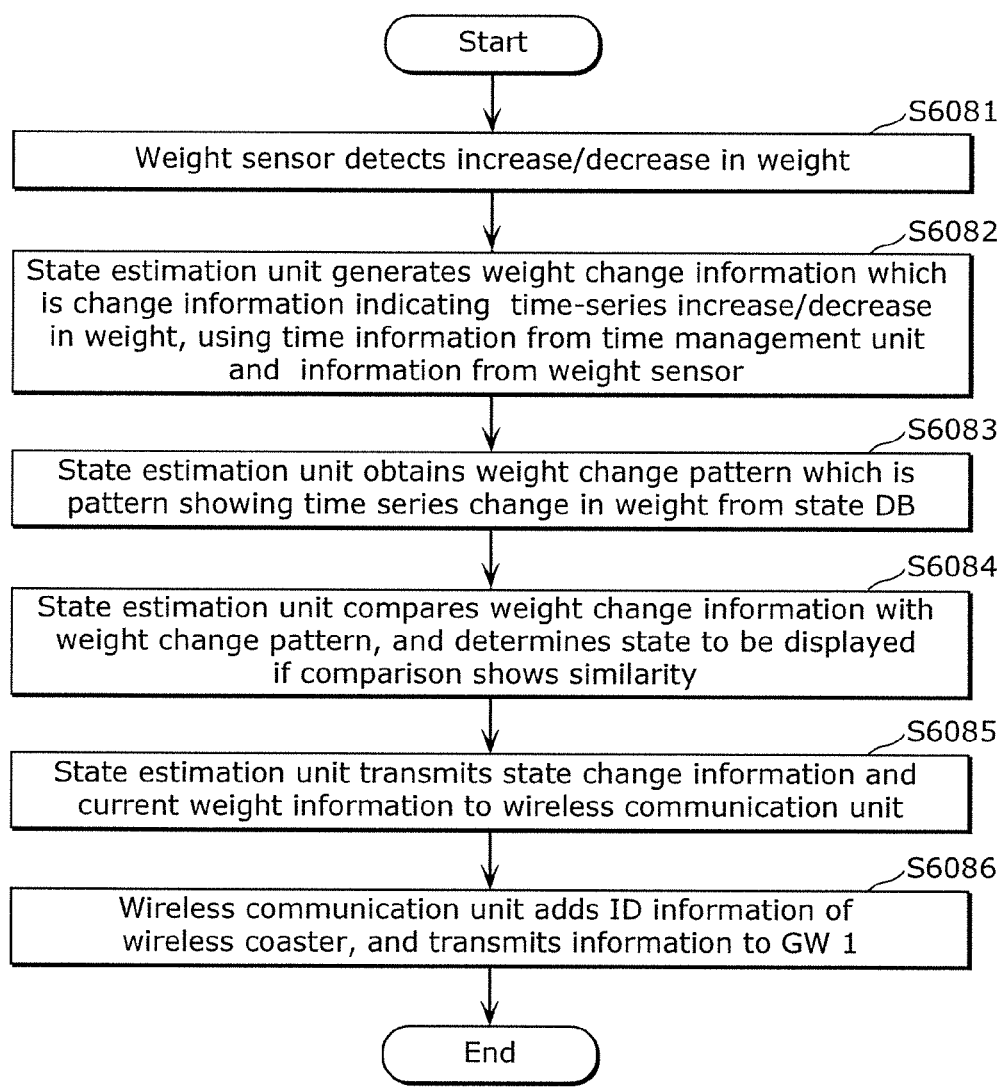
FIG. 42 is a flowchart illustrating processing by the coaster to detect a state in Embodiment 5.

FIG. 42 is a flowchart illustrating processing by the coaster to detect a state, in Embodiment 5.

As shown in FIG. 42, first, in S6081, the weight sensor (6002) detects an increase/decrease in weight.

Figure 43:
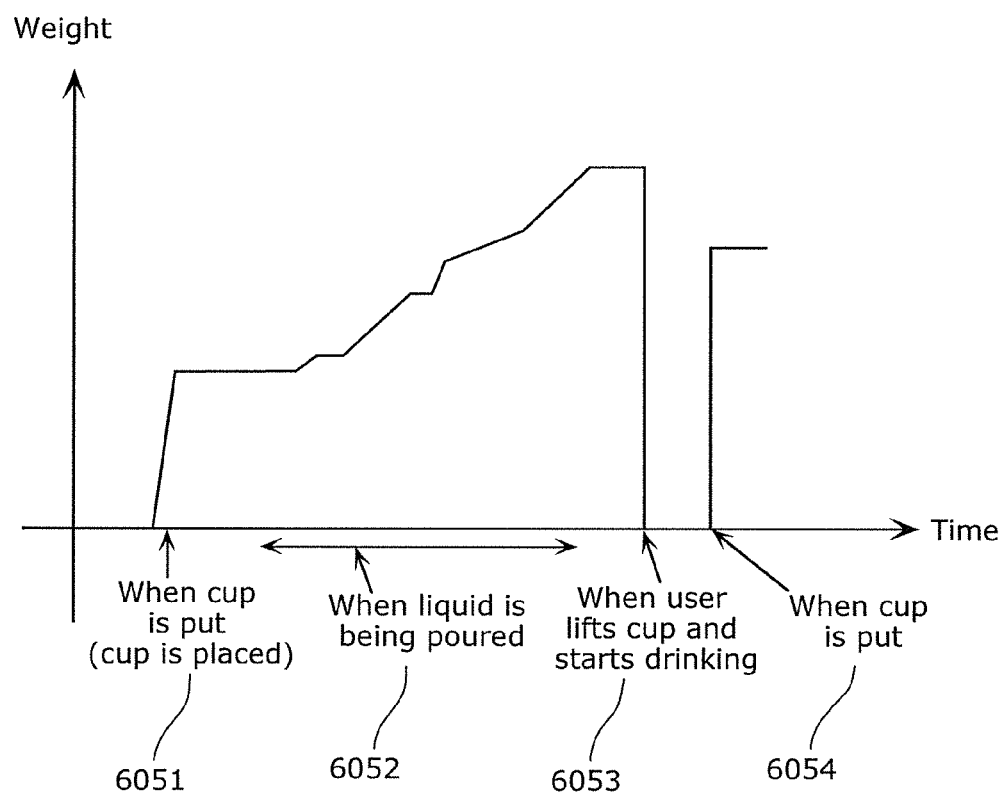
FIG. 43 illustrates an example of a weight change pattern in Embodiment 5.

Next, in S6082, the state estimation unit (6041) generates weight change information which is change information indicating a time-series increase/decrease in weight, using time information from the time management unit (6042) and information from a weight sensor. This weight change information shows a weight transition as shown in FIG. 43, for example.

Next, in S6083, the state estimation unit (6041) obtains a weight change pattern which is a pattern showing a time series change in weight from the state DB (6043). The state DB (6043) stores, for example, feature amount data of the change pattern showing states illustrated in FIG. 43.

Next, in S6084, the state estimation unit (6041) compares weight change information with a weight change pattern, and determines a state to be displayed if the comparison shows similarity.

Next, in S6085, the state estimation unit (6041) transmits state change information and the current weight information to the wireless communication unit (6003).

Next, in S6086, the wireless communication unit (6003) adds ID information of the wireless coaster (6000B) to information, and transmits the information to the GW 1 (1301).

In this manner, the wireless coaster (6000B) can estimate a state of a user when the user drinks coffee, and can notify the server (1100) of the state.

[Example of Weight Change Pattern]

FIG. 43 illustrates an example of a weight change pattern in Embodiment 5.

The weight sensor (6002) shows transition as shown in FIG. 43 according to operation of a user if a change in weight is plotted. When a horizontal axis indicates time and a vertical axis indicates weight, the weight of a cup is detected when a user places a cup (6051). If a cup is filled with a liquid such as coffee after that, the weight gradually increases, and thus a change as the section indicated by 6052 is shown. If a cup is lifted after that, the weight is 0 g, and thus a transition is as shown by 6053. At 6054, when a cup is placed, the weight obtained by subtracting the weight amount of drink that the user has had from the weight immediately before 6053 is detected.

A change in weight is plotted in such a manner. Accordingly, the state of a user can be estimated from the change in value of the weight detected by a coaster.

[Example of Information Obtained from a Coaster]

FIG. 44 illustrates an example of information obtained from the coaster in Embodiment 5. As event values shown in FIG. 44 indicate, state information such as cup placed indicating a state when a cup is placed, pouring, and end of pouring is detected, and is notified to the server (1100). This information may be obtained by the server (1100) through state estimation.

[Configuration of a Server]

Figure 45:
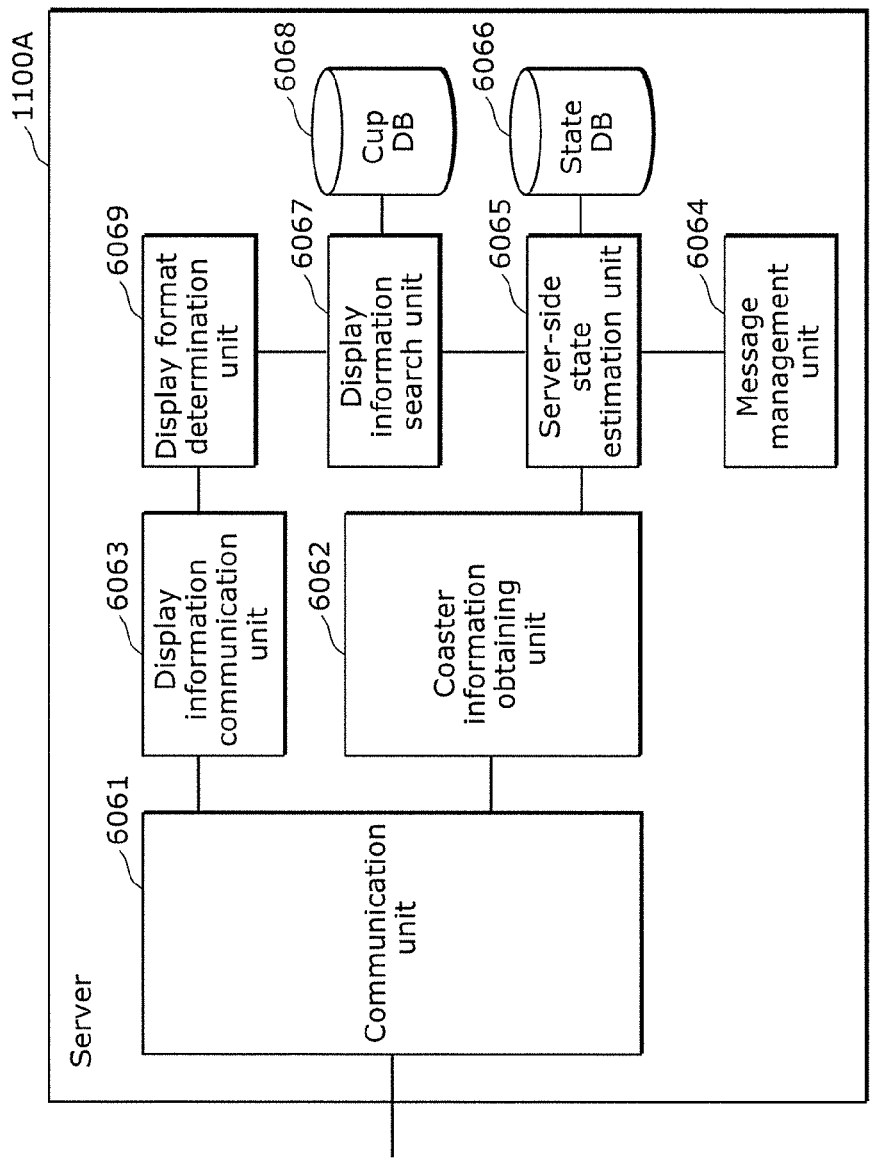
FIG. 45 illustrates an example of the configuration of a server having a state estimation function, in Embodiment 5.

FIG. 45 illustrates an example of the configuration of a server having a state estimation function, in Embodiment 5. A server (1100A) illustrated in FIG. 45 includes a communication unit (6061), a coaster information obtaining unit (6062), and a display information communication unit (6063), a message management unit (6064), a server-side state estimation unit (6065), a state DB (6066), a display information search unit (6067), a cup DB (6068), and a display format determination unit (6069).

The server illustrated in FIG. 45 (1100A) (in particular, the communication unit (6061), the coaster information obtaining unit (6062), the display information communication unit (6063), the message management unit (6064), the server-side state estimation unit (6065), the display information search unit (6067), and the display format determination unit (6069)) includes, as a hardware configuration, a first memory and a CPU, for example. The first memory stores, for example, a program for achieving a function as the communication unit (6061), a program for achieving a function as the coaster information obtaining unit (6062), a program for achieving a function as the display information communication unit (6063), a program for achieving a function as the message management unit (6064), a program for achieving a function as the server-side state estimation unit (6065), a program for achieving a function as the display information search unit (6067), and a program for achieving a function as the display format determination unit (6069).

The first memory is a readable recording medium or a readable and writable recording medium, for example. Examples of the recording medium include a semiconductor memory, an optical disc, a hard disk, and others.

The server (1100A) illustrated in FIG. 45 has a configuration of, for example, reading the above programs from the first memory, and causing the CPU to execute the programs, thus allowing the communication unit (6061), the coaster information obtaining unit (6062), the display information communication unit (6063), the message management unit (6064), the server-side state estimation unit (6065), the display information search unit (6067), and the display format determination unit (6069) to function.

The above example shows a configuration of causing the CPU to execute the programs for achieving functions of the communication unit (6061), the coaster information obtaining unit (6062), the display information communication unit (6063), the message management unit (6064), the server-side state estimation unit (6065), the display information search unit (6067), and the display format determination unit (6069), but the present embodiment is not limited to this. For example, a dedicated signal processing circuit which functions as the communication unit (6061), a dedicated signal processing circuit which functions as the coaster information obtaining unit (6062), a dedicated signal processing circuit which functions as the display information communication unit (6063), a dedicated signal processing circuit which functions as the message management unit (6064), a dedicated signal processing circuit which functions as the server-side state estimation unit (6065), a dedicated signal processing circuit which functions as the display information search unit (6067), and a dedicated signal processing circuit which functions as the display format determination unit (6069) may be used for the configuration.

A configuration may be adopted in which the first memory stores a program for achieving at least one of the functions of the communication unit (6061), the coaster information obtaining unit (6062), the display information communication unit (6063), the message management unit (6064), the server-side state estimation unit (6065), the display information search unit (6067), and the display format determination unit (6069), and dedicated signal processing circuits are used for the rest of the units.

The communication unit (6061) receives, from plural consumer electronics devices, information pieces on the plural consumer electronics devices. The communication unit (6061) transmits display information created (generated) by the display format determination unit (6069) to a display device. The communication unit (6061) receives state information transmitted from the coaster. The communication unit (6061) receives an identifier of a consumer electronics device and weight information which are transmitted.

The coaster information obtaining unit (6062) selects and obtains the state information transmitted from the coaster.

The server-side state estimation unit (6065) estimates the state of an object measured by the first consumer electronics device, from a change pattern of the received weight information. The server-side state estimation unit (6065) estimates, as the state of an object from the received change pattern of weight information, whether the user of the coaster has placed a cup on the coaster or lifts the cup from the coaster. The server-side state estimation unit (6065) estimates the weight of an object which the user of the coaster device uses, from the change pattern of the received weight information.

Information included in the state DB (6066) and information included in the cup DB (6068) are each stored in a memory. The memory is a readable and writable recording medium, for example. Examples of the readable and writable recording medium include a semiconductor memory, an optical disc, a hard disk, and others. The information included in the state DB (6066) and the information included in the cup DB (6068) may be stored in physically different memories or in the same memory, for example.

In the present embodiment, the server-side state estimation unit (6065) obtains a weight change pattern which is a time series change pattern of the weight, from the state DB (6066). The server-side state estimation unit (6065) compares weight change information with a weight change pattern, and determines a state to be displayed if the comparison shows similarity. Furthermore, if registered words include a word that frequently appears, the server-side state estimation unit (6065) notifies the display information search unit (6067) of the word.

The message management unit (6064) determines whether there is any user message registered at about a time at which the state to be displayed has occurred.

The display format determination unit (6069) filters information pieces on the plural consumer electronics devices received by the communication unit (6061), and performs processing for generating display information for a display device to display the filtered information in a specific display format. The display format determination unit (6069) generates display information for a display device to display, in a specific display format, display content in accordance with the state of the estimated object. For example, the display format determination unit (6069) generates a specific display format in which based on the display information, an avatar of a user in relation to the object is changed in accordance with the display content, among avatars displayed on the display screen.

[Processing Flow by Server]

Figure 46:
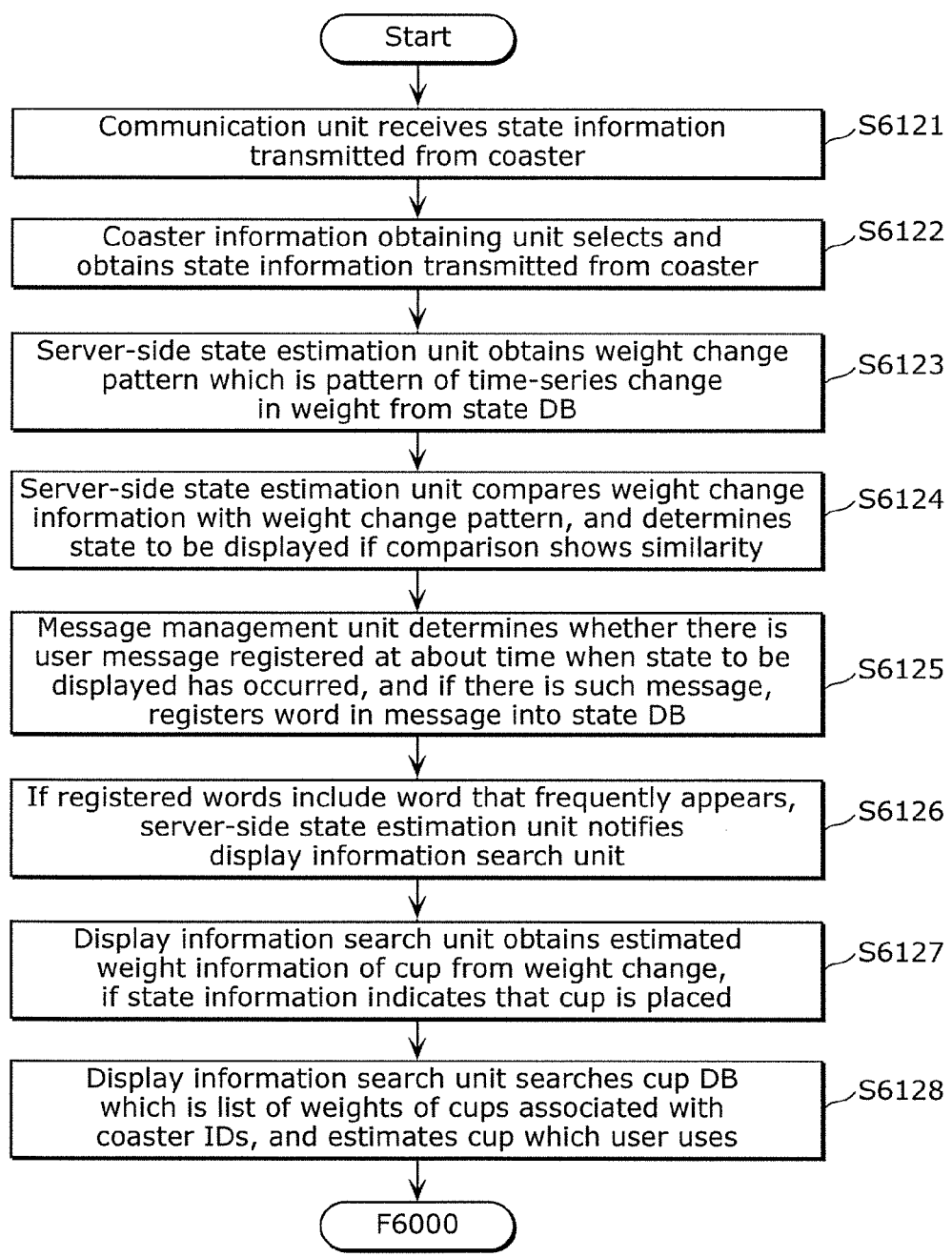
FIG. 46 is a flowchart illustrating an example of processing by a server in Embodiment 5.
Figure 47:
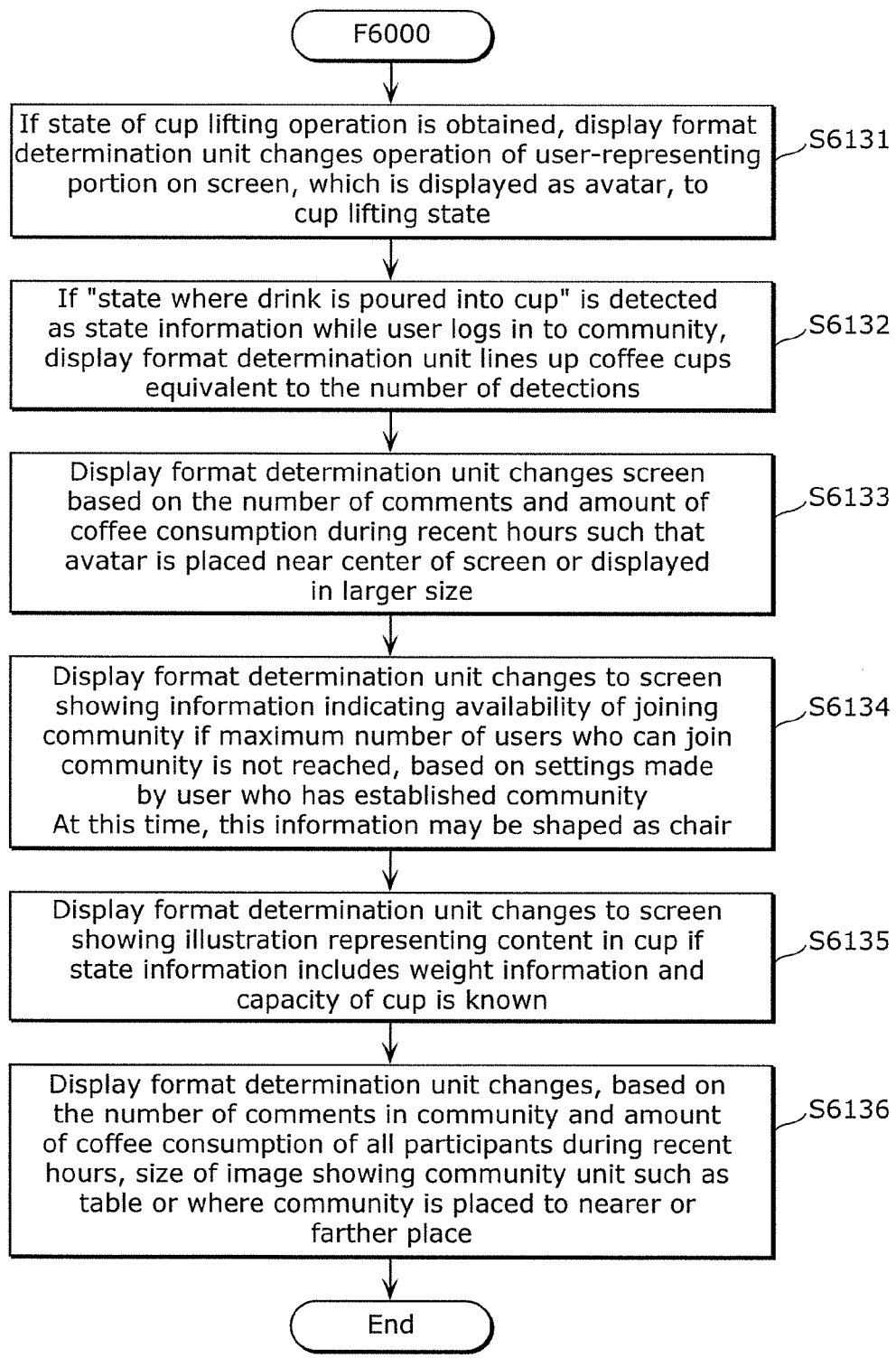
FIG. 47 is a flowchart illustrating an example of processing by the server in Embodiment 5.

FIGS. 46 and 47 are flowcharts illustrating examples of processing by the server in Embodiment 5.

First, in S6121, the communication unit (6061) receives state information transmitted from the coaster.

Next, in S6122, the coaster information obtaining unit (6062) selects and obtains the state information transmitted from the coaster.

Next, in S6123, the server-side state estimation unit (6065) obtains a weight change pattern which is a pattern of a time-series change in weight from the state DB (6066). At this time, if the coaster has determined the state, this processing may be skipped.

Next, in S6124, the server-side state estimation unit (6065) compares weight change information with a weight change pattern, and determines a state to be displayed if the comparison shows similarity. At this time, if the coaster has determined the state, this processing may be skipped.

Next, in S6125, the message management unit (6064) determines whether there is a user message registered at about a time at which a state to be displayed has occurred, and if there is such a message, registers a word in the message into the state DB.

Next, in S6126, if the registered words include a word that frequently appears, the server-side state estimation unit (6065) notifies the display information search unit (6067) of the word.

Next, in S6127, the display information search unit (6067) obtains estimated weight information of a cup from the weight change if state information indicates that the cup is placed.

Next, in S6128, the display information search unit (6067) searches the cup DB (6068) which is a list of weights of cups associated with the coaster ID, and estimates a cup used by a user. At this time, a user can register the weight and the design of a favorite cup in advance. At the time of registration, if a user is using this service for a certain time period, a list of estimated cups may be presented, based on the variations in the weight of a cup measured in advance.

Next, in S6131 in FIG. 47, if the state of a cup lifting operation is obtained, the display format determination unit (6069) changes operation of a user-representing portion on the screen, which is displayed as an avatar, to a cup lifting state.

Next, in S6132, if "the state where a drink is poured into a cup" is detected as state information while the user logs in to a community, the display format determination unit (6069) lines up coffee cups equivalent to the number of detections.

Next, in S6133, the display format determination unit (6069) changes the screen based on the number of comments and the amount of coffee consumption during recent hours such that an avatar is placed near the center of the screen or displayed in a larger size.

Next, in S6134, the display format determination unit (6069) changes the screen to a screen showing information indicating availability of joining a community if the maximum number of users who can join the community is not reached, based on the settings made by a user who has established community. At this time, this information may be shaped as a chair.

Next, in S6135, the display format determination unit (6069) changes the screen to a screen showing the illustration representing content in a cup if state information includes weight information and the capacity of the cup is known.

Next, in S6136, based on the number of comments in a community and the amount of coffee consumption of all the participants during recent hours, the display format determination unit (6069) changes the size of an image showing a community unit such as a table or changes where the community is placed to a nearer or farther place.

[Example of Information Stored in Cup DB]

FIG. 48 illustrates an example of information stored in the cup DB in Embodiment 5.

The design of a favorite cup is registered by the user in advance. The estimated amount of drink poured into a cup is obtained based on the weight obtained when a cup is placed and the highest value of the amount of drink poured after that, and stored. As illustrated by a main time period (6071) when a cup is used in FIG. 49, the main time period when a cup is used is obtained by estimating a time period in which a cup is used most from time periods and frequencies then. The number of times a cup is used is the number of times a corresponding cup is estimated to be used up to now.

FIG. 49 illustrates an example of use frequency information for calculating a main time period when a cup is used, in Embodiment 5.

As illustrated in FIG. 49, since frequencies at which a user uses a cup vary depending on time periods, the main time period (6071) when a cup is used is obtained by estimating a time period when a cup is most frequently used, from the time periods and frequencies then.

[Configuration of System]

FIG. 50 illustrates an example of the configuration of a system which uses coffee maker use information and coaster information at the same time, in Embodiment 5.

The system illustrated in FIG. 50 includes a coffee maker (6081), a current sensor (6082), and a wireless communication unit (6083), in addition to the wireless coaster (6000) and the GW 1 (1301).

The coffee maker (6081) is an example of a third consumer electronics device.

The current sensor (6082) is an example of a second consumer electronics device having a function of measuring an electric current amount, and measures the amount of electric current flowing through the third consumer electronics device. In the present embodiment, the current sensor (6082) measures power consumption of the coffee maker (6081). For example, the current sensor (6082) is disposed in the form like an extension cable between a power connector and an outlet, and detects the amount of electric current flowing through the extended portion. In this manner, the current sensor (6082) can measure the amount of electric current flowing through the coffee maker, without modifying the coffee maker (6081).

The wireless communication unit (6083) transmits, to the server (1100) via the GW 1 (1301), the amount of electric current flowing through the coffee maker (6081) measured by the current sensor (6082).

Figure 51:
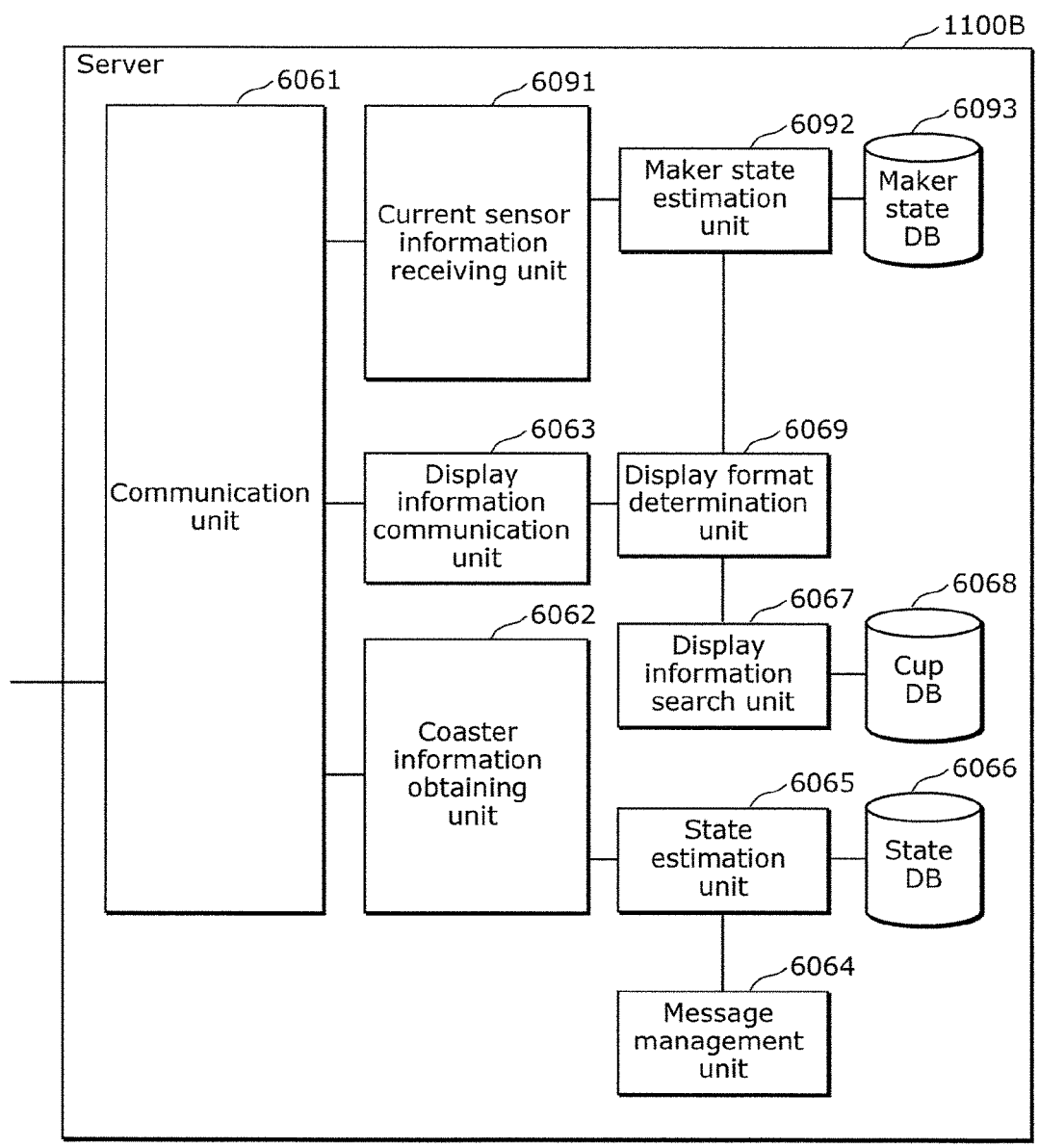
FIG. 51 illustrates an example of the configuration of the server for when information on a drink maker is used, in Embodiment 5.

FIG. 51 illustrates an example of the configuration of the server for when information on a drink maker is used, in Embodiment 5. The same numerals are given to the equivalent elements to those in FIG. 45, and a detailed description thereof is omitted.

The server (1100B) illustrated in FIG. 51 includes a current sensor information receiving unit (6091), a maker state estimation unit (6092), and a maker state DB (6093), in addition to the configuration of the server (1100A) illustrated in FIG. 45.

The server illustrated in FIG. 51 (1100B) (in particular, the communication unit (6061), the coaster information obtaining unit (6062), the display information communication unit (6063), the message management unit (6064), the server-side state estimation unit (6065), the display information search unit (6067), the display format determination unit (6069), the current sensor information receiving unit (6091), and the maker state estimation unit (6092)) includes, as a hardware configuration, a first memory and a CPU, for example. The first memory stores, for example, a program for achieving a function as the communication unit (6061) a program for achieving a function as the coaster information obtaining unit (6062), a program for achieving a function as the display information communication unit (6063), a program for achieving a function as the message management unit (6064), a program for achieving a function as the server-side state estimation unit (6065), a program for achieving a function as the display information search unit (6067), a program for achieving a function as the display format determination unit (6069), a program for achieving a function as the current sensor information receiving unit (6091), and a program for achieving a function as the maker state estimation unit (6092).

The first memory is, for example, a readable recording medium or a readable and writable recording medium. Examples of the recording medium include a semiconductor memory, an optical disc, a hard disk, and others.

The server (1100B) illustrated in FIG. 51 has a configuration of, for example, reading the above programs from the first memory and causing the CPU to execute the programs, thus allowing the communication unit (6061), the coaster information obtaining unit (6062), the display information communication unit (6063), the message management unit (6064), the server-side state estimation unit (6065), the display information search unit (6067), the display format determination unit (6069), the current sensor information receiving unit (6091), and the maker state estimation unit (6092) to function.

Although the above example shows a configuration of causing the CPU to execute the program for achieving a function as the wired communication unit (6011), the present embodiment is not limited to this. For example, a dedicated signal processing circuit which functions as a dedicated signal processing circuit which functions as the communication unit (6061), a dedicated signal processing circuit which functions as the coaster information obtaining unit (6062), a dedicated signal processing circuit which functions as the display information communication unit (6063), a dedicated signal processing circuit which functions as the message management unit (6064), a dedicated signal processing circuit which functions as the server-side state estimation unit (6065), a dedicated signal processing circuit which functions as the display information search unit (6067), a dedicated signal processing circuit which functions as the display format determination unit (6069), a dedicated signal processing circuit which functions as the current sensor information receiving unit (6091), and a dedicated signal processing circuit which functions as the maker state estimation unit (6092) may be used for the configuration.

A configuration may be adopted in which the first memory stores a program for achieving at least one of the functions of the communication unit (6061), the coaster information obtaining unit (6062), the display information communication unit (6063), the message management unit (6064), the server-side state estimation unit (6065), the display information search unit (6067), the display format determination unit (6069), the current sensor information receiving unit (6091), and the maker state estimation unit (6092), and dedicated signal processing circuits are used for the rest of the units.

The maker state DB (6093) is stored in a memory, for example. The memory which stores the maker state DB (6093) is, for example, a readable and writable recording medium. Examples of the readable and writable recording medium include a semiconductor memory, an optical disc, a hard disk, and others.

The display format determination unit (6069) generates display information for a display device to display, in a specific display format in accordance with the state of an estimated object, display content. For example, the display format determination unit (6069) generates a specific display format for a display device to dispose based on the display information, near an avatar displayed on the display screen, information indicating the third consumer electronics device which is determined to be used by the current sensor (6082) measuring the amount of electric current, and which is used within a given time difference from when the first consumer electronics device is used.

In the present embodiment, the display format determination unit (6069) generates a specific display format for creating a display screen on which an icon of a coffee maker is displayed at a place on a screen close to the target user avatar if the operating state of the coffee maker (6081) and information obtained by the coaster has similarity. Furthermore, if there are several drinks that may be poured into a cup, the display format determination unit (6069) may generate screen information including a specific display format for arranging, for example, a coffee maker and a blender on a screen in chronological order that the devices operated, from the nearest to a cup. It should be noted that although the above has described the coffee maker (6081) as an example, the present embodiment is not limited to this. The device may be a device such as a blender that produces a liquid drink or a mill that produces powdered food. In all the cases, screen information can be generated using a similar configuration.

[Example of Shared Screen]

Figure 52:
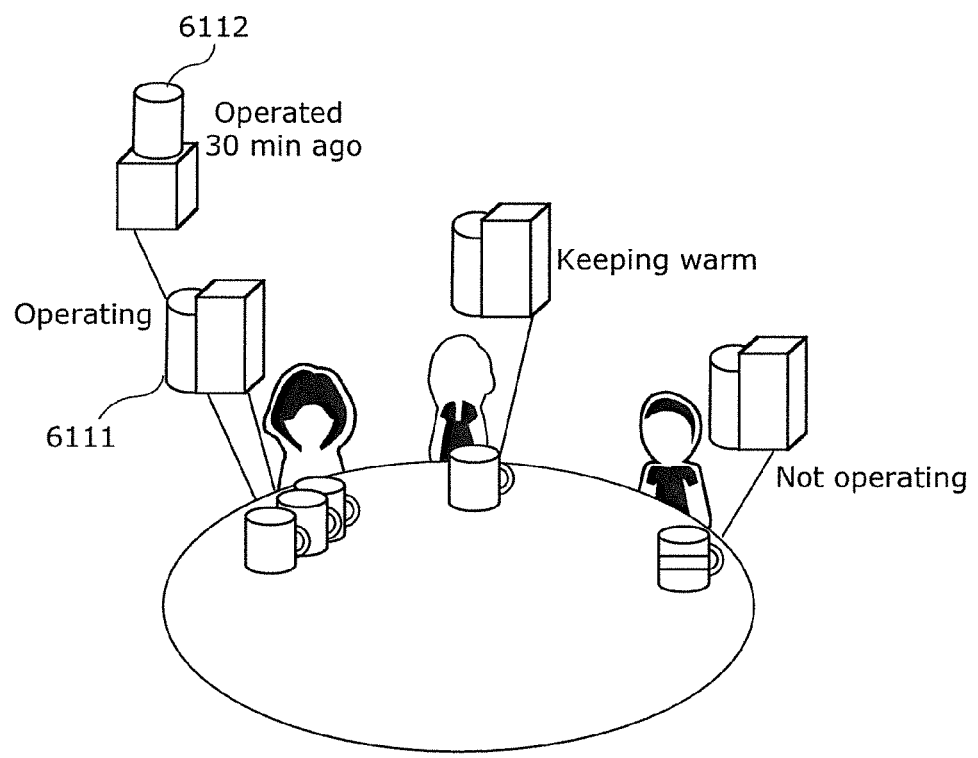
FIG. 52 illustrates an example of a shared screen on which information on a drink maker such as a coffee maker is displayed in Embodiment 5.

FIG. 52 illustrates an example of a shared screen on which information on a drink maker such as a coffee maker is displayed in Embodiment 5.

As illustrated in FIG. 52, a coffee maker (6111) is displayed near a user avatar, and a blender (6112) is displayed at a slightly distant position therefrom. At the same time, Information indicating, for instance, simultaneously operating and a time elapsed after the operation may also be displayed.

[Processing Flow by System]

Figure 53:
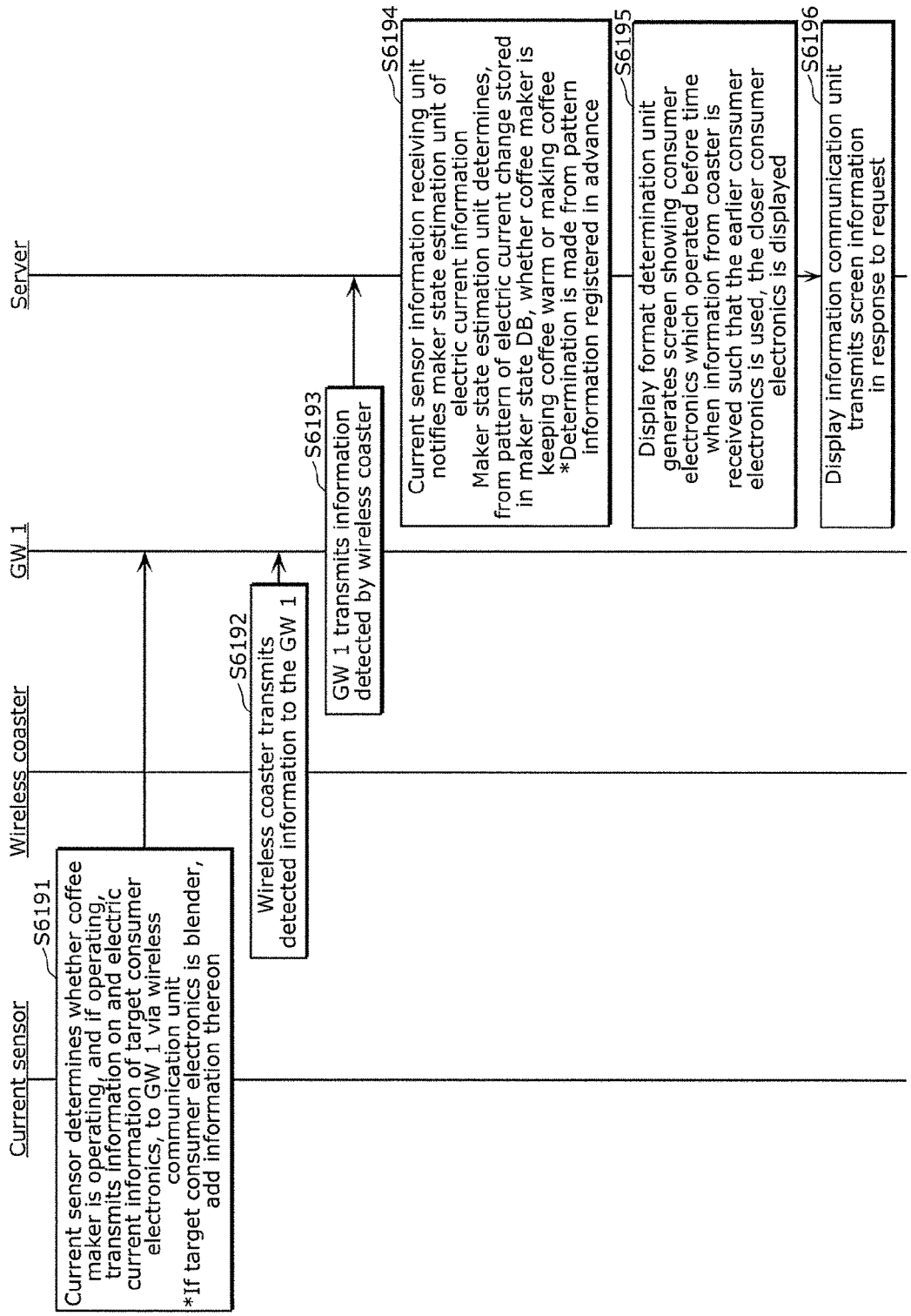
FIG. 53 is a flowchart illustrating an example of processing by the server using information on a drink maker, in Embodiment 5.

FIG. 53 is a flowchart illustrating an example of processing by the server using information on a drink maker, in Embodiment 5.

As illustrated in FIG. 53, first, in S6191, the current sensor (6082) determines whether the coffee maker (6081) is operating, and if the coffee maker is operating, transmits information on and electric current information of a target consumer electronics device, to the GW 1 (1301) via the wireless communication unit (6083). At this time, if a target consumer electronics device is a blender, information thereon may be added.

Next, in S6192, the wireless coaster (6000) transmits detected information to the GW 1 (1301).

Next, in S6193, the GW 1 (1301) transmits the information detected by the wireless coaster (6000).

Next, in S6194, the current sensor information receiving unit (6091) notifies the maker state estimation unit (6092) of information on electric current. The maker state estimation unit (6092) determines, from a pattern of an electric current change stored in the maker state DB (6093), whether the coffee maker is keeping coffee warm or making coffee. At this time, the maker state estimation unit (6092) may make determination from information on a feature amount which is pattern information registered in the maker state DB (6093) in advance. At this time, if product numbers of drink makers are registered in advance, the maker state estimation unit (6092) may use target information or learn from a peak of electric consumption, or the like.

Next, in S6195, the display format determination unit generates a screen showing drink makers (consumer electronics devices) which have operated before a time when information from coaster is received such that the earlier a consumer electronics device is used, the closer the consumer electronics device is displayed.

Next, in S6196, the display information communication unit (6063) transmits screen information in response to a request.

In this way, a screen is created which is emphasized by displaying an icon of a coffee maker, for instance, at a place close to a target user avatar on a shared screen. Furthermore, if there are plural drinks which may be poured into a cup, a coffee maker and a blender can be arranged on a screen in chronological order that the devices operated, from the nearest to a cup, for example.

Advantageous Effects

The information providing method according to the present embodiment can generate a specific display format for sharing life information of a user which is obtained by a sensor disposed in a consumer electronics device itself or near a consumer electronics device, when the user uses the consumer electronics device.

According to the information providing method according to the present embodiment, based on the display information, an avatar of a user in relation to the object can be changed in accordance with the display content, among avatars displayed on the display screen. Furthermore, according to the information providing method according to the present embodiment, based on the display information, the estimated weight of the object can be compared with images registered in advance according to the weight of the object, and an image showing the object in relation to the avatar displayed on the display screen can be changed to an image according to the weight of the object estimated by the comparison.

According to the information providing method according to the present embodiment, based on the display information, information indicating the third consumer electronics device which is determined to be used by the second consumer electronics device measuring the amount of electric current, and which is used within a given time difference from when the first consumer electronics device is used can be disposed near the avatar displayed on the display screen. Here, how far the information indicating the third consumer electronics device is disposed away from the first consumer electronics device is changed according to a difference between an operation time of the third consumer electronics device estimated from the amount of electric current and a time at which the first consumer electronics device is used and which is estimated from the change pattern of the weight information.

According to the information providing method according to the present embodiment, in a scene in which user drinks coffee, sensing allows sharing the actual state of a user accurately, and thus information can be shared with reality. This provides a screen to which realism is added. More specifically, if a consumer electronics device is a coaster, the weight of a coffee cup is obtained, which allows, when a specific display format for sharing is to be generated, estimation of whether a user has started drinking coffee, whether a user is holding a coffee cup, and further a supposed state of the cup. Then, according to the estimation result, the display format for screen information relevant to the user is changed. In this manner, natural screen representation can be adopted according to accurate state information of a scene in which a user drinks coffee, and thus life information can be shared with other users. In particular, in the case where a community in which participants are having drinks is formed on a social network, the actual user's state is shared, such as the user drinking coffee. Thus, life information with reality can be shared. This can provide a screen to which realism is added.

It should be noted that drinks such as juice and beer may be used, other than coffee, and furthermore, this technique may be applied to cruets for seasonings such as salt and pepper and soy sauce. Then, the weights of the cruets may be measured, and condition of use may be obtained. In the case of seasonings, a change on a one-week or one-month base may be obtained to acquire the amounts of the seasonings used. In that case, from a change of the amounts thereof used, the color of the face and the shape of the body of an avatar associated with a user can be changed on the shared screen.

Furthermore, if a pen holder is placed on a coaster, it can be determined from a change in weight of the pen holder whether a pen is taken out and put it back. In this case, a change may be added to an avatar associated with a user on the screen by providing an icon having a meaning of work or study or a headband, for instance.

Embodiment 6

The present embodiment describes an example in which a network-connected microphone device (7001) is used for a GW 1 (1301), as a method for connecting a consumer electronics device and a small sensing device to the GW 1 (1301).

Figure 54:
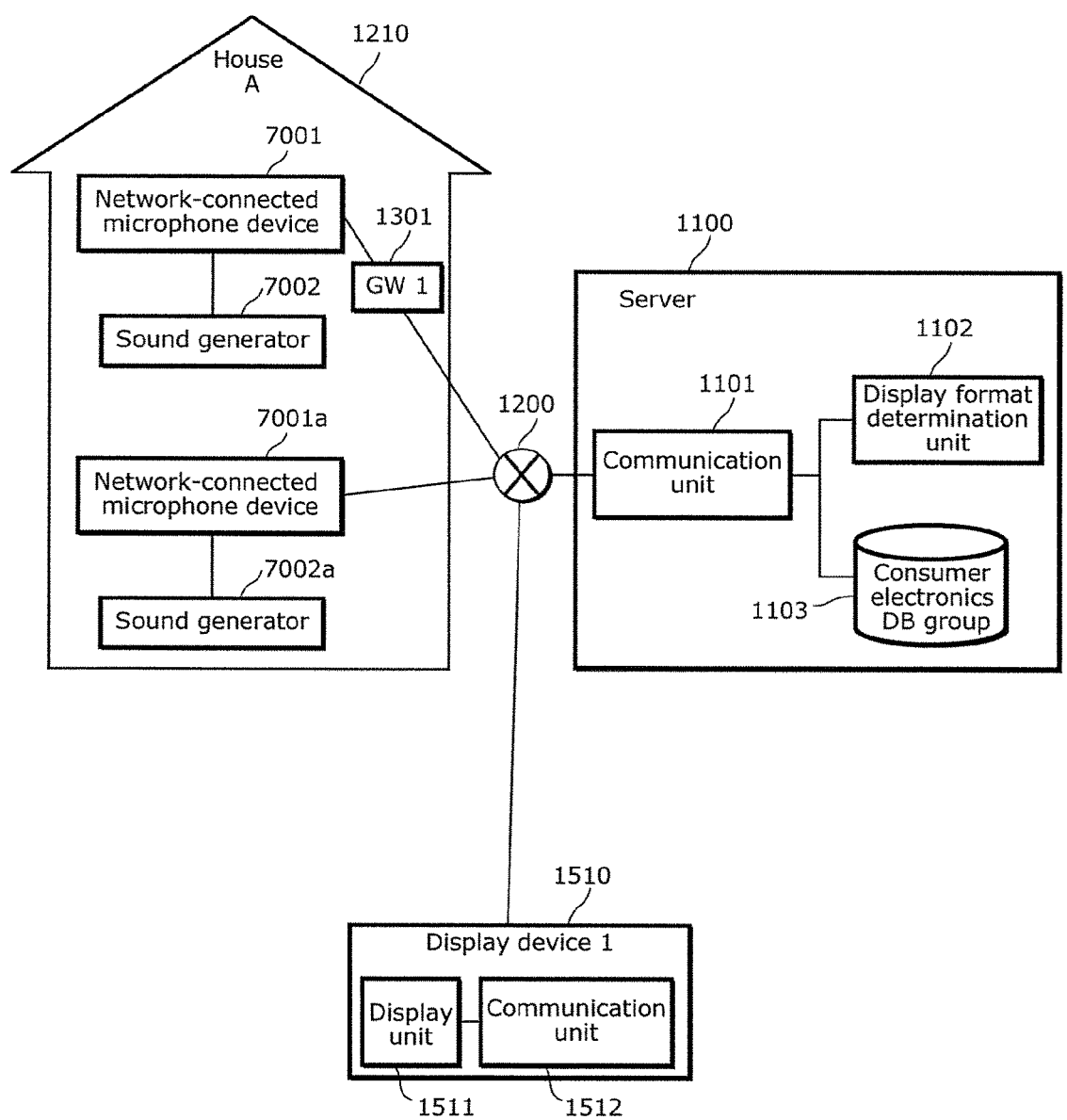
FIG. 54 illustrates an example of the configuration of a system in Embodiment 6.

FIG. 54 illustrates an example of the configuration of a system in Embodiment 6. It should be noted that in FIG. 54, the same numerals are given to the equivalent elements to those in FIG. 1, and a detailed description thereof is omitted.

In the system illustrated in FIG. 54, the GW 1 (1301), the network-connected microphone device (7001) and a network-connected microphone device (7001a) as examples of a sound-collecting device, and sound generators 7002 and 7002a are disposed in a house A (1210).

The sound generator (7002) is disposed in an area where the network-connected microphone device (7001) can collect a sound in the house A (1210). Similarly, the sound generator (7002a) is disposed in an area where the network-connected microphone device (7001a) can collect a sound in the house A (1210).

The network-connected microphone devices (7001) and (7001a) each have a function as a microphone for collecting a sound and a communication function. The communication function may be a wired communication function or a wireless communication function.

Here, examples of the area where the network-connected microphone device (7001) can collect a sound include the inside of a room in which the network-connected microphone device (7001) is disposed, the same floor as the floor where the network-connected microphone device (7001) is disposed, and the inside of a house where the network-connected microphone device (7001) is disposed. It should be noted that the area where the network connection microphone (7001) can collect a sound may be, for example, an area where a sound can be collected in a space that includes a predetermined specific direction, or an area where a sound can be collected in a space within a predetermined distance about a position at which the network-connected microphone device (7001) is disposed.

Similarly, examples of the area where the network-connected microphone device (7001*a*) can collect a sound include the inside of a room in which the network-connected microphone device (7001*a*) is disposed, the same floor as the floor where the network connection microphone (7001*a*) is disposed, and the inside of a house in which the network-connected microphone device (7001*a*) is disposed. It should be noted that examples of the area in which the network-connected microphone device (7001*a*) can collect a sound may include an area where a sound can be collected in a space that includes a predetermined specific direction, and an area where a sound can be collected in a space within a predetermined distance about the position at which the network-connected microphone device (7001*a*) is disposed.

The network-connected microphone device (7001) is connected with the GW 1 (1301), and transmits event information relevant to data obtained by collecting a sound, to a server (1100) via the GW 1 (1301) and a public network (1200).

The network-connected microphone device (7001*a*) transmits event information relevant to data obtained by collecting a sound via the public network (1200), not via the GW 1 (1301).

The network-connected microphone device (7001) collects voice (or speech) of a person in an area where a sound can be collected and a sound generated by the sound generator (7002). The network-connected microphone device (7001) converts the collected sound into electronic data, and transmits the converted electronic data being included in event information, to the server (1100) via the GW 1 (1301) and the public network (1200). It should be noted that the network-connected microphone device (7001) may convert the collected sound into electronic data, analyze the converted electronic data, and transmit the analyzed result being included in event information, to the server (1100) via the GW 1 (1301) and the public network (1200).

The network-connected microphone device (7001*a*) collects voice (or speech) of a person in an area where sound can be collected and sound generated by the sound generator (7002). The network-connected microphone device (7001) may convert the collected sound into electronic data, and transmit the electronic data being included in event information, to the server (1100) via the public network (1200). It should be noted that the network-connected microphone device (7001*a*) may analyze the collected sound, and transmit the analyzed result being included in event information, to the server (1100) via the public network (1200).

Figure 55:
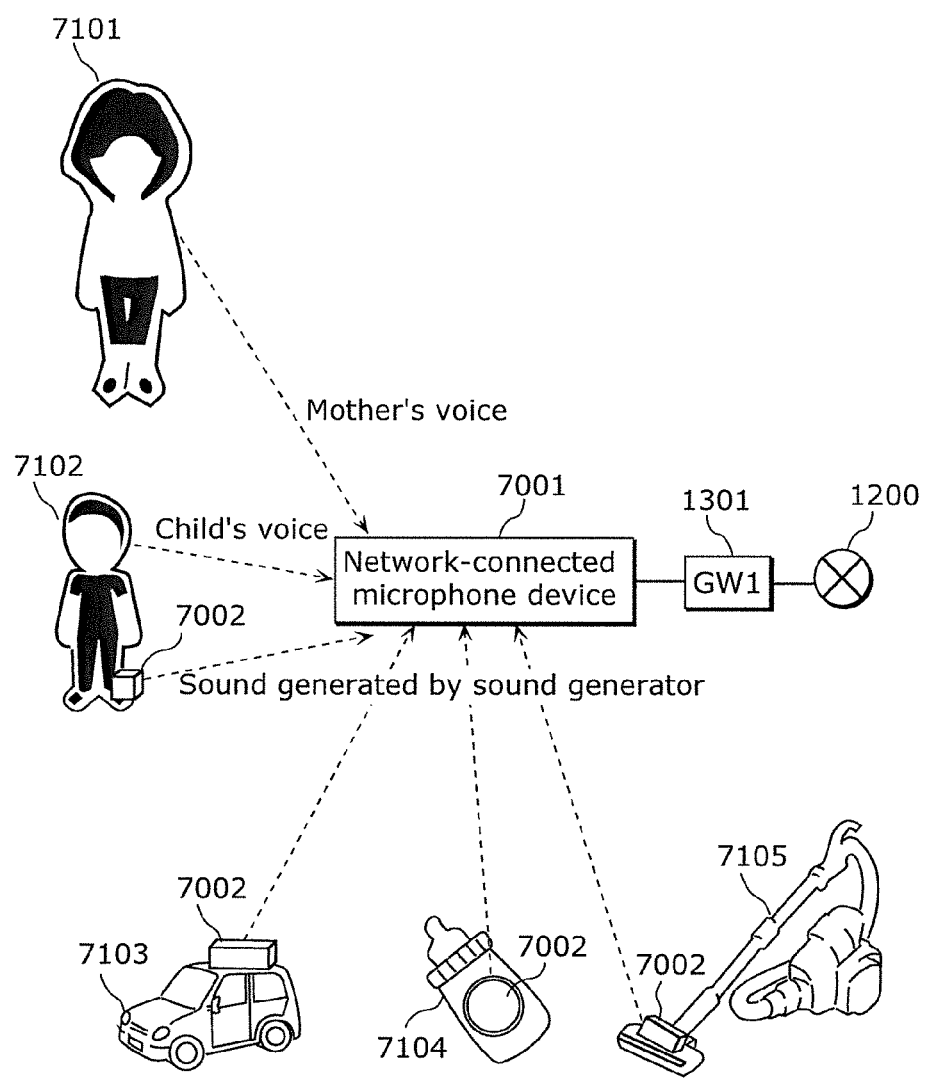
FIG. 55 illustrates examples of sounds generated by sound generators, which are collected by a network-connected microphone device in Embodiment 6.

FIG. 55 illustrates examples of sounds generated by sound generators, which are collected by the network-connected microphone device in Embodiment 6.

FIG. 55 illustrates specific examples in which speech of a person and a sound generated by the sound generators (7002) in the area where the network-connected microphone device (7001) can collect a sound are collected in the house A (1210). It should be noted that specific examples in which speech of a person and a sound generated by the sound generator (7002) in the area where the network-connected microphone device (7001*a*) can collect a sound are collected are the same as the relation illustrated in FIG. 55 between the network-connected microphone device (7001) and the sound generator (7002), and thus a description thereof is omitted.

The sound generator (7002) is attached to a person or a tool which does not have a communication function, for example. The sound generator 7002 may be attached to a consumer electronics device.

The example illustrated in FIG. 55 shows examples in which the sound generators (7002) are attached to a child (7102), a toy car (7103), a baby bottle (7104), and a vacuum cleaner (7105) which is an example of a consumer electronics device. It should be noted that the consumer electronics device (7105) may have or may not have a communication function.

The network-connected microphone device (7001), for example, collects speech of the mother (7101) and the child (7102) in the house A (1210), and a sound generated by the sound generator (7002).

The sound generator (7002) includes a sensor which detects that the sound generator itself has moved, for example. Examples of the sensor include an acceleration sensor, an angular velocity sensor, a gyro sensor, a temperature sensor, a humidity sensor, an illuminance sensor, a human sensing sensor, and others, for example.

If the sound generator (7002) is attached to the child (7102), the sound generator (7002) generates a sound if the sensor included in the sound generator (7002) detects movement of the child (7102) when the child (7102) has moved. If the sound generator (7002) is attached to the toy (7103), the sound generator (7002) generates a sound when, for example, the sensor included in the sound generator (7002) detects the movement of the toy (7103) when the child (7102) has moved the toy (7103).

If the sound generator (7002) is attached to the baby bottle (7104), the sound generator (7002) generates a sound when, for example, the sensor included in the sound generator (7002) detects the operation of the child tilting the baby bottle (7104) when the child (7102) tilts the baby bottle (7104) to drink the content in the baby bottle (7104). In addition, the sound generator (7002) attached to the baby bottle (7104) may generate a sound when the sensor included in the sound generator (7002) detects a change in temperature of the baby bottle (7104) when the child (7102) holds the baby bottle (7104), for example.

If the sound generator (7002) is attached to the vacuum cleaner (7105), the sound generator (7002) generates a sound when the sensor included in the sound generator (7002) detects the movement of the vacuum cleaner (7105) when the vacuum cleaner (7105) is operated, for example.

As described above, the sensor included in the sound generator (7002) detects the movement of a person or an object to which the sound generator (7002) is attached.

The sound generator (7002) includes a sound output unit which outputs a sound such as a speaker or a tuning fork, for example. If the sensor included in the sound generator (7002) detects the movement of a person or an object to which the sound generator (7002) is attached, the sensor controls the sound output unit so that the sound output unit outputs a sound associated with the movement detected. Examples of sounds associated with movements include the output of a sound having a predetermined frequency, the output of a sound having a predetermined frequency for a predetermined time period, and the repeated output of a sound having a predetermined frequency for a predetermined time period. For example, if a sensor can detect plural movements (such as quick movement, slow movement, big movement, and small movement), a configuration may be adopted in which different sounds are output for those movements.

Such a configuration allows the sound generator (7002) to output a sound according to the movement of a person or an the object to which the sound generator (7002) is attached.

It should be noted that a sound to be output may be a sound having a frequency which people can hear or a sound which people cannot hear.

The network-connected microphone device (7001) includes a memory, for example. Here, the memory is a recording medium for storing information, such as a semiconductor memory and a hard disk. The memory stores information for associating a sound generated by the sound generator (7002) with a corresponding movement. In addition, the memory stores an ID for identifying the network-connected microphone device (7001).

The network-connected microphone device (7001) analyzes, for example, the frequency, length, and intervals of a sound generated by the sound generator (7002) and included in the collected sound, and determines the corresponding movement and a person or an object to which the sound generator (7002) which has generated the sound is attached. In this manner, the state of a person can be determined from the movement of the person, and the state of a person moving an object can be determined from the movement of the object. For example, if the child (7102) is making a big movement of the toy car (7103), the state of the child (7102) is indirectly estimated as the child playing happily, from the movement of the toy car (7103).

The network-connected microphone device (7001) analyzes person's voice included in a collected sound, for example, and determines the surrounding states from content of the analyzed voice. For example, if the child (7102) like a baby or a little child is in the house A (1210), an adult (for example, a mother, a father, a babysitter) who takes care of the child (7102) is likely to be near the child (7102) in many cases. If a description is given using an example in which an adult who takes care of the child (7102) is the mother (7101) illustrated in FIG. 55, the mother (7101) keeps talking to the child (7102) to amuse him or her, in many cases. The same applies to adults such as a father and a babysitter.

Thus, it is possible to estimate the state of the child (7102) being amused, by collecting the mother's (7101) voice and analyzing voice content. Specifically, if the network-connected microphone device (7001) collects voice of the mother (7101) in the area where a sound can be collected, the network-connected microphone device (7001) analyzes content of the voice from the mother (7101), using the existing speech recognition technique.

The memory of the network-connected microphone device (7001) stores table information for associating voice content determined in advance and a state of a child in response to the voice content. If voice content is analyzed, content which is the same as or similar to the analyzed content is determined with reference to this table information, and the state of a child associated with the determined content is determined.

In addition, voice of the child (7102) is collected, and voice content is analyzed, thus estimating the state of the child (7102). Specifically, if the network-connected microphone device (7001) collects voice of the child (7102) in the area where a sound can be collected, the network-connected microphone device (7001) analyzes the content of voice from the child (7102), using the existing speech recognition technique.

The network-connected microphone device (7001) transmits event information in which an ID for identifying the device itself and the analysis result are associated, to the server (1100).

Such a configuration allows the server (1100) to store states of people relevant to sounds collected by the network-connected microphone device (7001).

A description is later given of a determination of the state of a child, based on a mother's speech. It should be noted that the sound generated by the sound generator (7002) may be a non-audible sound which people cannot perceive. In this case, discomfort given from the sound generated by the sound generator (7002) can be reduced.

[Example of Specific Configuration]

Figure 56A:
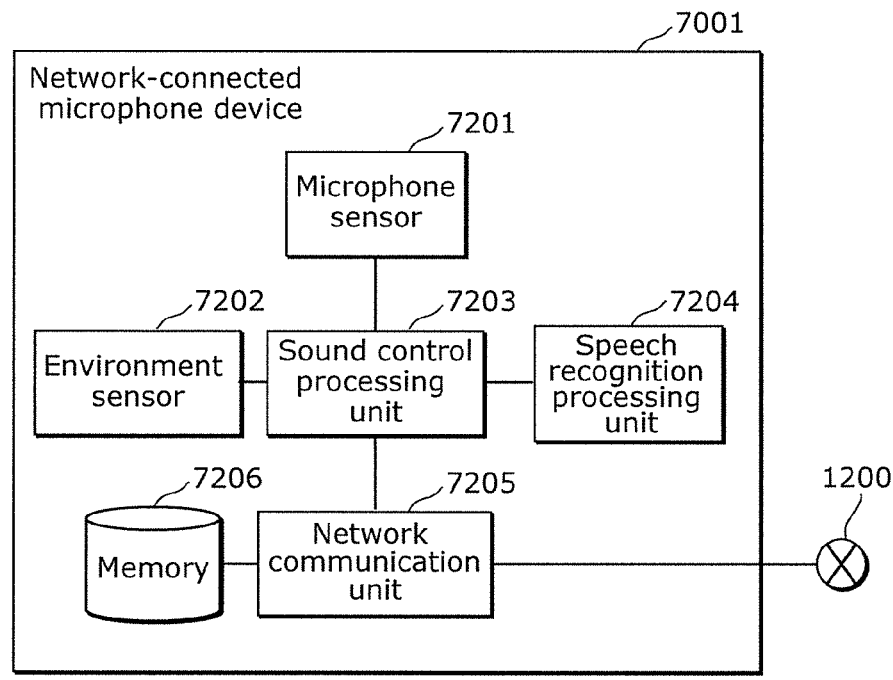
FIG. 56A illustrates an example of a specific configuration of the network-connected microphone device in Embodiment 6.
Figure 56B:
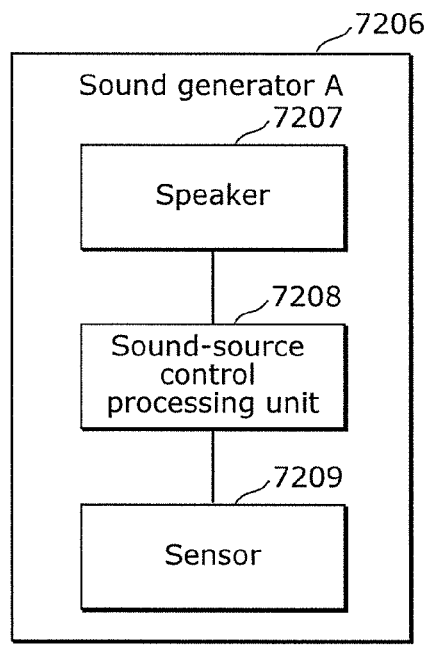
FIG. 56B illustrates an example of a specific configuration of a sound generator A in Embodiment 6.
Figure 56C:
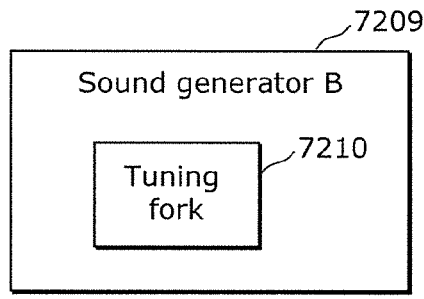
FIG. 56C illustrates an example of a specific configuration of a sound generator B in Embodiment 6.

FIG. 56A illustrates an example of a specific configuration of the network-connected microphone device in Embodiment 6. FIG. 56B illustrates an example of a specific configuration of a sound generator A in Embodiment 6, and FIG. 56C illustrates an example of a specific configuration of a sound generator B in Embodiment 6. It should be noted that the specific configurations of the network-connected microphone device (7001a) and the sound generator (7002a) are the same as those as illustrated in FIGS. 56A to 56C, and thus a description thereof is omitted here.

The network-connected microphone device (7001) is, for example, a fourth consumer electronics device having a function of recognizing speech, among plural consumer electronics devices, and collects a sound and performs speech recognition. In addition, the network-connected microphone device (7001) determines the state of an object, based on the recognized sound. In addition, the network-connected microphone device (7001) may collect a sound generated by a sound generator included in a fifth consumer electronics device used by an object, and performs speech recognition. In this case, the network-connected microphone device (7001) determines the state of the object using the fifth consumer electronics device, based on the recognized sound. In addition, the network-connected microphone device (7001) may determine the state of an object, based on a word included in the recognized sound.

In the present embodiment, the network-connected microphone device (7001) includes, for example, a microphone sensor (7201), an environment sensor (7202), a sound control processing unit (7203), a speech recognition processing unit (7204), a network communication unit (7205), and a memory (7206).

The network-connected microphone device (7001) (in particular, the sound control processing unit (7203), the speech recognition processing unit (7204), and the network communication unit (7205)) includes, as a hardware configuration, a fifth memory and a CPU, for example. The fifth memory stores, for example, a program for achieving a function as the sound control processing unit (7203), a program for achieving a function as the speech recognition processing unit (7204), and a program for achieving a function as the network communication unit (7205).

The fifth memory is a readable recording medium or a readable and writable recording medium, for example. Examples of the recording medium include a semiconductor memory, an optical disc, a hard disk, and others.

The network-connected microphone device (7001) illustrated in FIG. 56A has a configuration of, for example, reading the above programs from the fifth memory and causing the CPU to execute the above programs, thus allowing the sound control processing unit (7203), the speech recognition processing unit (7204), and the network communication unit (7205) to function.

Although the above example shows a configuration of causing the CPU to execute the programs for achieving functions of the sound control processing unit (7203), the speech recognition processing unit (7204), and the network communication unit (7205), the present embodiment is not limited to this. For example, a dedicated signal processing circuit which functions as the sound control processing unit (7203), a dedicated signal processing circuit which functions as the speech recognition processing unit (7204), and a dedicated signal processing circuit which functions as the network communication unit (7205) may be used for the configuration.

A configuration may be adopted in which the first memory stores a program for achieving at least one of the functions of the sound control processing unit (7203), the voice recognition processing unit (7204), and the network communication units (7205), and dedicated signal processing circuits are used for the rest of the units.

The memory (7206) is a readable and writable recording medium, for example. Examples of the readable and writable recording medium include a semiconductor memory, an optical disc, a hard disk, and others.

The microphone sensor (7201) collects voice and a sound within an area where a sound can be collected, and converts it into electronic data.

The environment sensor (7202) detects the state around the network-connected microphone device (7001). For example, if the environment sensor (7202) detects a predetermined state, the network-connected microphone device (7001) analyzes voice of a person and a sound generated from a sound generator (7002) included in a collected sound.

The environment sensor (7202) is an illuminance sensor which detects an illuminance, for example, and has a value, as a threshold, with which an illuminance obtained when the lighting is turned on and an illuminance obtained when the lighting is turned off in a room in which the network-connected microphone device (7001) is disposed can be distinguished. The environment sensor (7202) compares the detected illuminance with the threshold, and detects whether the lighting of the room is on, based on the result of the comparison.

If the environment sensor (7202) detects, for example, that the lighting of the room in which the network-connected microphone device (7001) is disposed is turned on, the network-connected microphone device (7001) analyzes human voice and a sound generated from the sound generator (7002) included in collected sound.

The sound control processing unit (7203) analyzes electronic data corresponding to the sound collected by the microphone sensor (7201), for example. For example, the sound control processing unit (7203) extracts human voice from the electronic data corresponding to the collected sound, and outputs the extracted voice to the speech recognition processing unit (7204) described below. In addition, the sound control processing unit (7203) extracts a sound other than the human voice, from the electronic data corresponding to the sound collected by the microphone sensor (7201), and analyzes a sound generated from the sound generator (7002) included in the extracted data. The speech recognition processing unit (7204) analyzes data corresponding to the human voice transmitted from the sound control processing unit (7203), and outputs the result to the sound control processing unit (7203).

The speech recognition processing unit (7204) analyzes content of the human voice, using the existing speech recognition technique.

The sound control processing unit (7203) transmits, to the server (1100), the analysis result of the human voice included in collected sound, which is obtained by the speech recognition processing unit (7204) and the analysis result of sound generated from the sound generator (7002) and included in the collected sound, which is obtained by the sound control processing unit (7203).

While the environment sensor (7202) keeps detecting a predetermined environment condition (for example, lighting is on), the sound control processing unit (7203) performs operation such as extraction of a sound other than human voice from electronic data corresponding to a collected sound, and analysis of a sound generated from the sound generator (7002).

The sound generator (7002) is included in the fifth consumer electronics device used by an object. The configuration of the sound generator (7002) is roughly divided into two, namely, configurations of the sound generator A (7206) and the sound generator B (7209), as illustrated in FIGS. 56B and 56C. The sound generator A (7206) determines a sound to be output by a sound-source control processing unit (7208), based on a value detected by the sensor (7209), and thereafter causes a speaker (7207) to output a sound.

The sound generator B (7209) (in particular, the sound-source control processing unit (7208)) in FIG. 56B includes a sixth memory and a CPU as a hardware configuration, for example. The sixth memory stores a program for achieving a function as the sound-source control processing unit (7208). The sixth memory is a readable recording medium or a readable and writable recording medium, for example. Examples of the recording medium include a semiconductor memory, an optical disc, a hard disk, and others.

The sound generator B (7209) illustrated in FIG. 56B has a configuration of, for example, reading the above program from the sixth memory, and causing the CPU to execute the program, thus allowing the sound-source control processing unit (7208) to function.

Although the above example shows a configuration of causing the CPU to execute the program for achieving a function as the sound-source control processing unit (7208), the present embodiment is not limited to this. For example, a dedicated signal processing circuit which functions as the sound-source-control processing unit (7208) may be used for the configuration.

It should be noted that the sensor (7209) is assumed to be an acceleration sensor, a gyroscope sensor, a temperature-humidity sensor, an illuminance sensor, or a motion detector. The speaker (7207) may be, for instance, a drive tuning fork as long as the mechanism can generate a sound determined by the sound-source control processing unit (7208).

The sound generator B (7209) comprises a tuning fork (7210). The tuning fork (7210) generates a sound according to, for example, the movement of an object to which the sound generator B (7209) is attached. For example, if opening and closing of a door in the house A (1210) is to be detected, the sound generator B (7209) is attached to the door, thus detecting opening and closing operation of the door.

[Processing Flow by Network-Connected Microphone Device]

Figure 57:
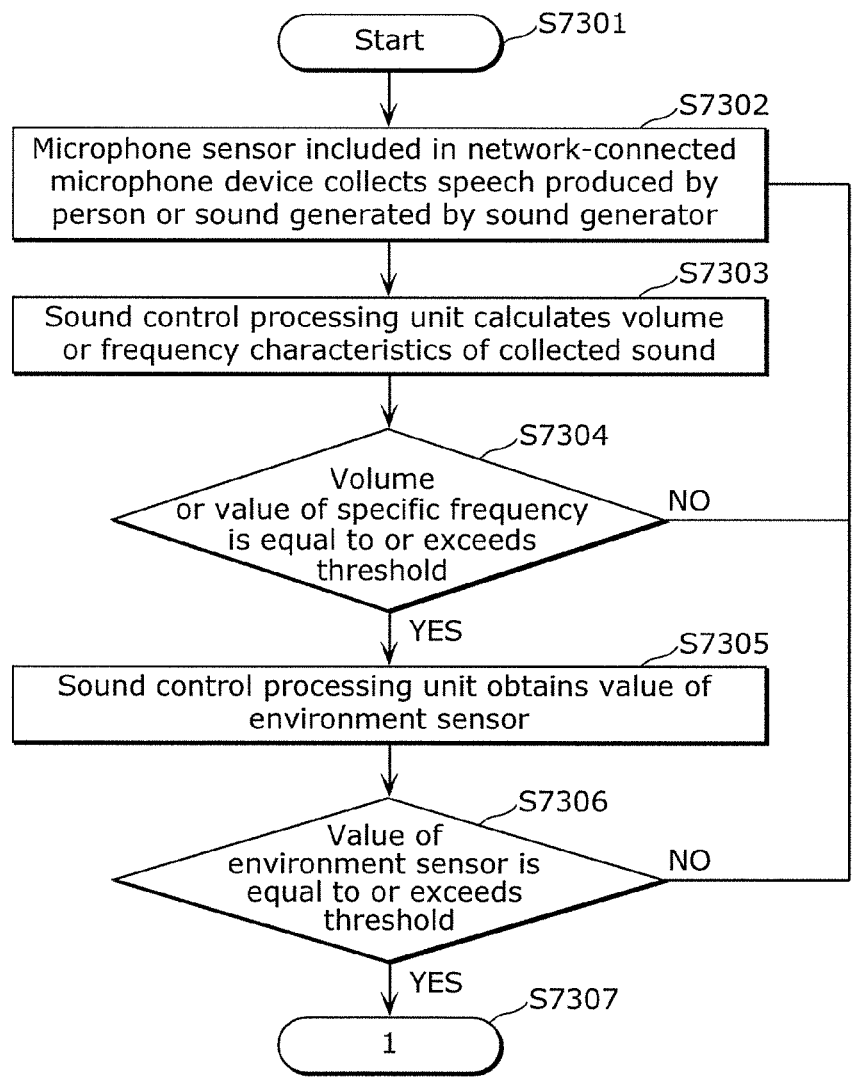
FIG. 57 is a flowchart for illustrating an example of operation of the network-connected microphone device in Embodiment 6.
Figure 58:
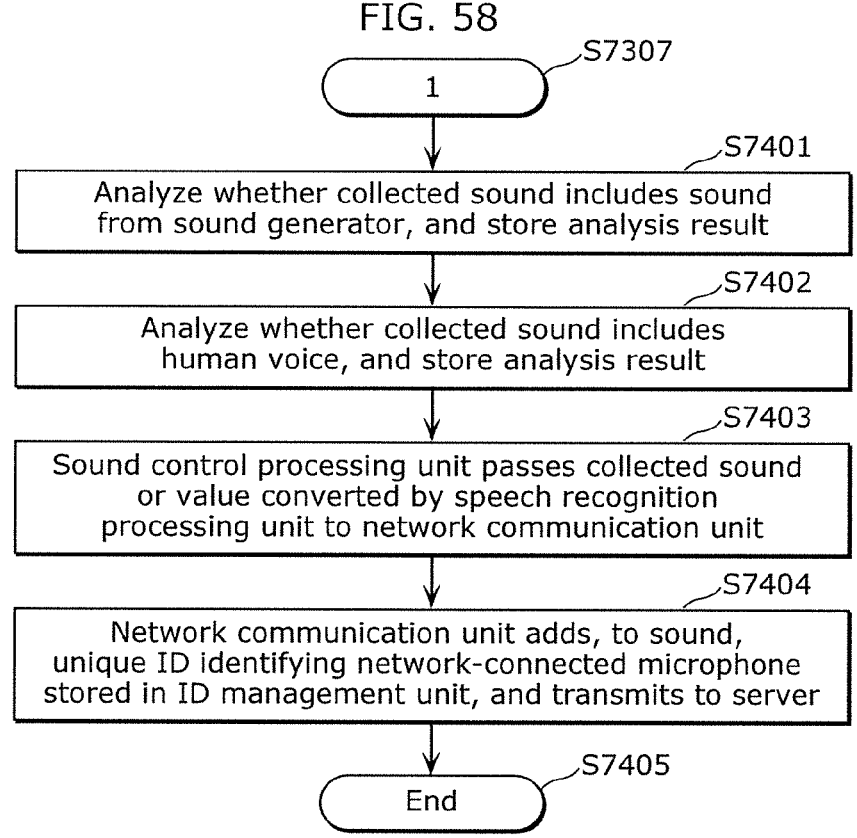
FIG. 58 is a flowchart for illustrating an example of operation of the network-connected microphone device in Embodiment 6.

FIGS. 57 and 58 are flowcharts for illustrating an example of operation of the network-connected microphone device in Embodiment 6.

In S7301, for example, the network-connected microphone device (7001) starts operating by turning on the network-connected microphone device (7001).

Next, in S7302, the microphone sensor (7201) included in the network-connected microphone device (7001) collects speech produced by a person or a sound generated by the sound generator A (7206) and the sound generator B (7209) in a sound-collecting area, and generates electronic data corresponding to the collected sound.

Next, in S7303, the sound control processing unit (7203) calculates the volume of the collected sound or a frequency characteristic.

Next, in S7304, the sound control processing unit (7203) determines whether the volume or the value of a specific frequency is equal to or exceeds a threshold. In S7304, if the sound control processing unit (7203) determines that the volume or the value of a specific frequency is equal to or exceeds a threshold, the sound control processing unit (7203) determines that the collected sound includes voice of a person or a sound generated by the sound generator A (7206) or the sound generator B (7209), and the processing proceeds to S7305.

On the other hand, if the sound control processing unit (7203) determines in S7304 that the volume and the value of a specific frequency is lower than a threshold, the sound control processing unit (7203) determines that the collected sound does not include voice of a person and sounds generated by the sound generator A (7206) and the sound generator B (7209), and the processing proceeds to S7302.

Next, in S7305, the sound control processing unit (7203) obtains the value of the environment sensor (7202).

Next, in S7306, the sound control processing unit (7203) determines whether the value of the environment sensor (7202) is equal to or exceeds a threshold. Here, the processing returns to S7307 if the value of the environment sensor (7202) is equal to or exceeds a threshold, and the processing returns to S7302 in other cases.

Next, in S7401, the sound control processing unit (7203) determines whether the collected sound includes a sound generated from the sound generator A (7206) or the sound generator B (7209), and if the sound control processing unit (7203) determines that the collected sound includes such a sound, analyzes the sound generated by the sound generator A (7206) or the sound generator B (7209) and included in the collected sound, and stores the analysis result. In addition, if the sound control processing unit (7203) determines that the collected sound does not include sounds generated from the sound generator A (7206) and the sound generator B (7209), the sound control processing unit (7203) does not store the analysis result.

Next, in S7402, the speech recognition processing unit (7204) analyzes a sound in a frequency band corresponding to human voice. Specifically, the speech recognition processing unit (7204) performs speech recognition, and sends, as an analysis result, a value converted into, for instance, a character string or a word indicating the state based on speech, which is obtained through speech recognition, back to the sound control processing unit (7203). The sound control processing unit (7203) stores the analysis result output from the speech recognition processing unit (7204).

Next, in S7403, the sound control processing unit (7203) requests the network communication unit (7205) to transmit the analysis results obtained in S7401 and S7402 to the server (1100).

Next, in S7404, the network communication unit (7205) associates an ID of the network-connected microphone device (7001) with the analysis results, and transmits the ID and the results to the server (1100).

It should be noted that a description is later given of a specific example of converting into a word indicating the state based on a speech recognition result, with reference to FIG. 61.

In addition, although the above has described the configuration of analyzing a sound collected by the network-connected microphone device (7001), the server (1100) may have the configuration of analyzing a collected sound. In this case, the network-connected microphone device (7001) may associate electronic data corresponding to a sound collected by the microphone with the ID of the network-connected microphone device (7001), and transmit the data and the ID to the server (1100).

[Processing Flow of Sound Generator A]

Figure 59:
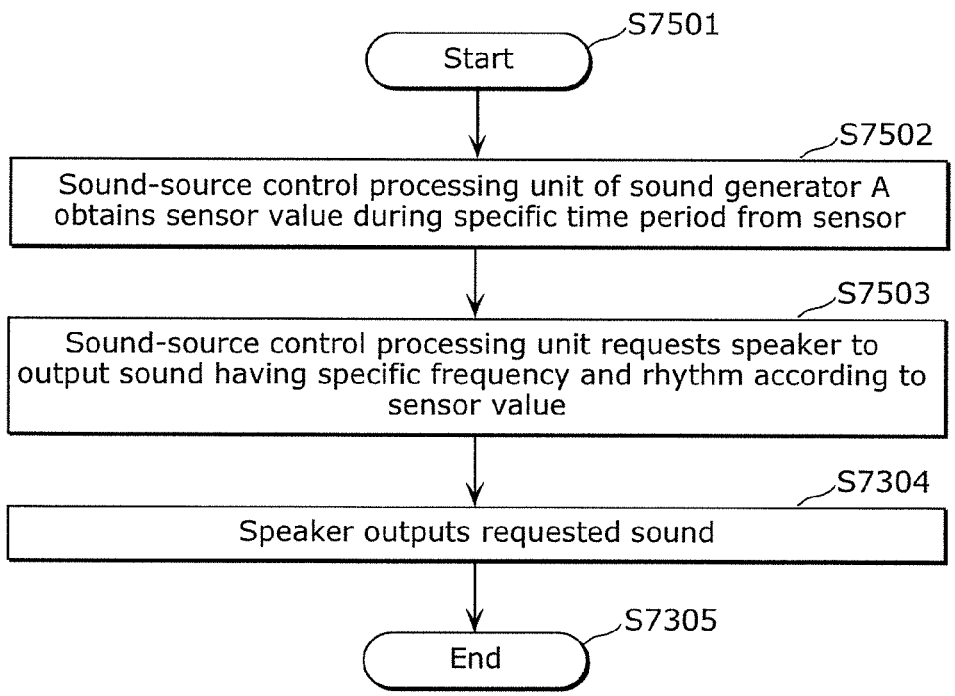
FIG. 59 is a flowchart for illustrating an example of operation of the sound generator A in Embodiment 6.

FIG. 59 is a flowchart for illustrating an example of operation of the sound generator A in Embodiment 6.

First, operation starts in S7501.

Next, in S7502, the sound-source control processing unit (7208) of the sound generator A (7206) obtains a sensor value during a specific time period from the sensor (7209). The sensor (7209) is an acceleration sensor, a gyroscope sensor, a temperature-humidity sensor, an illuminance sensor, or a motion detector, for instance. A sensor value is an average value, the highest value, or the lowest value during a specific time period.

Next, in S7503, the sound-source control processing unit (7208) requests the speaker (7207) to output a sound having a specific frequency and rhythm according to a sensor value. It should be noted that a description is later given of an example of a sound output according to a value of an XYZ 3-axis acceleration sensor, with reference to FIG. 60.

Next, in S7504, the speaker (7207) outputs the requested sound.

Then, processing ends in S7505.

[Example of Table]

FIG. 60 illustrates an example of a table used to determine a sound to be output from the sound generator A in Embodiment 6. In the present embodiment, the sound-source control processing unit (7208) determines a sound to be output according to values of the XYZ 3-axis acceleration sensor, based on the table illustrated in FIG. 60.

In the sound-source control processing unit (7208), thresholds (7601) of acceleration for X, Y, and Z directions are defined, and a frequency (7602) and a rhythm (7603) of the sound to be outputted according to a threshold are determined. A row 7604 indicates the frequency (7602) and the rhythm (7603) of a sound to be output when an acceleration value in the X axial direction is less than −10.0 mV/g. Similarly, rows 7605 and 7606 each indicate the frequency (7602) and the rhythm (7603) of sounds according to the acceleration values in the X axial direction.

FIG. 61 illustrates examples of states of a child associated with recognized mother's speech in Embodiment 6.

The speech recognition processing unit (7204) recognizes mother's speech, and thereafter determines the state of a child, based on the recognized mother's speech using the table illustrated in FIG. 61. Specifically, the speech recognition processing unit (7204) recognizes mother's speech, and thereafter estimates that the child's state corresponds to the action indicated by the column (7702), if a word corresponding to any word in the column (7701) is included. For example, if the word "smiling" is detected as a result of recognition of the mother's speech, the result of recognition of the mother's speech corresponds to a word in the row (7703), and thus the speech recognition processing unit (7204) determines (defines) that the child's state is "smiling". It should be noted that the conversion illustrated in FIG. 61 may be performed by the server (1100).

[Example of UI]

Figure 62:
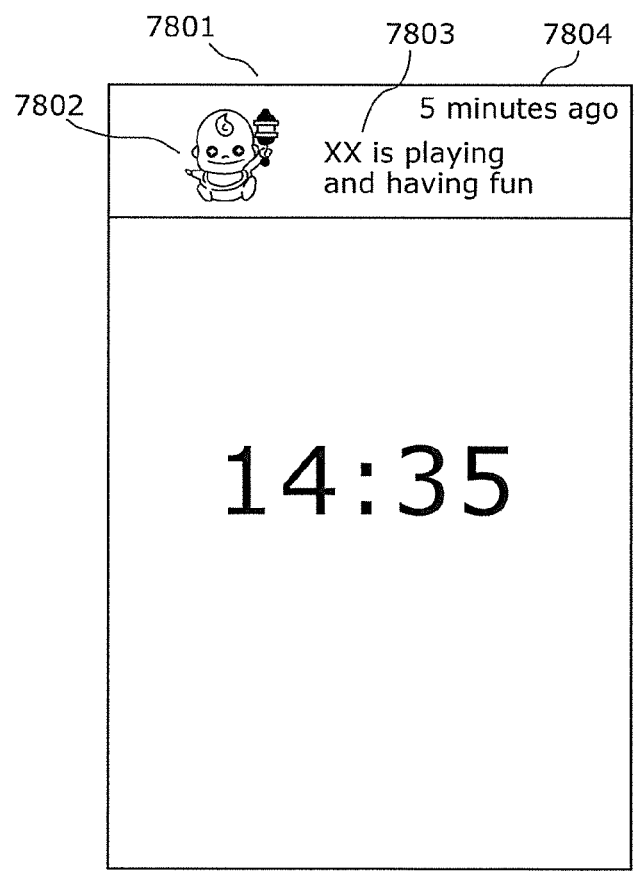
FIG. 62 illustrates an example of a UI displayed on a display device in Embodiment 6.
Figure 63:
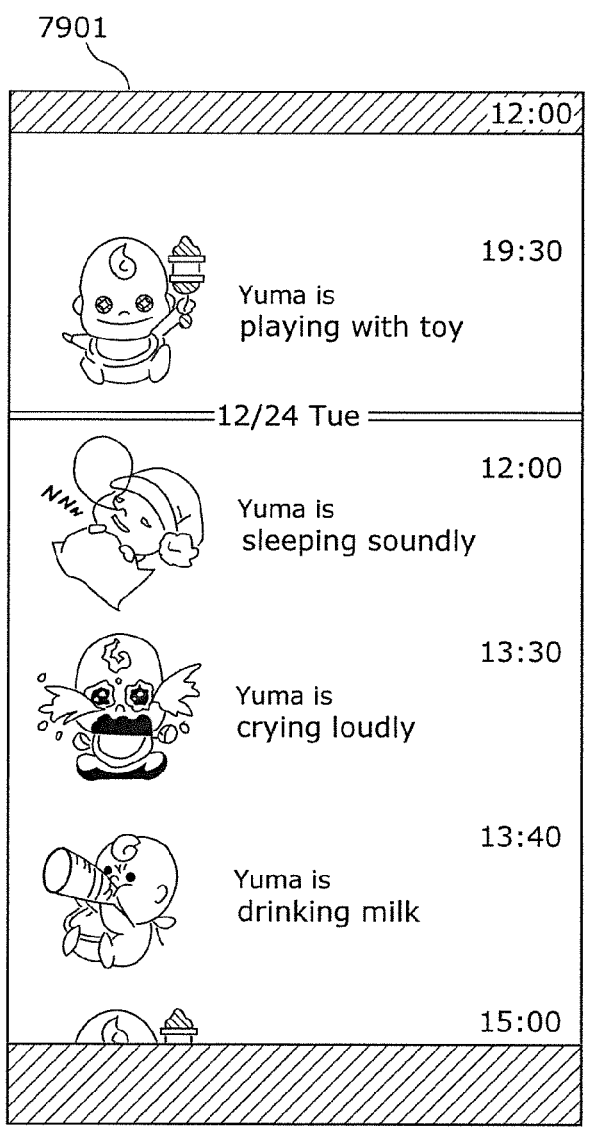
FIG. 63 illustrates an example of a UI displayed on the display device in Embodiment 6.

FIGS. 62 and 63 illustrate examples of a UI displayed on the display device in Embodiment 6. FIGS. 62 and 63 illustrate examples of a UI displayed when a value generated by the processing illustrated in FIG. 58 and converted by the speech recognition processing unit (7204) is transmitted to a display device (1510) directly or via the server (1100).

An icon (7802) and a message (7803) which are displayed on a UI (7801) on the display screen of the display device (1510) illustrated in FIG. 62 are determined based on a value converted by the speech recognition processing unit (7204). Furthermore, an elapsed time message (7804) indicates the elapsed time after being notified to the display device (1510).

On a UI (7901) on a display screen of the display device (1510) illustrated in FIG. 63, the values converted by the speech recognition processing unit 7204 in the past can be listed.

[Example of Display Effect]

Figure 64:
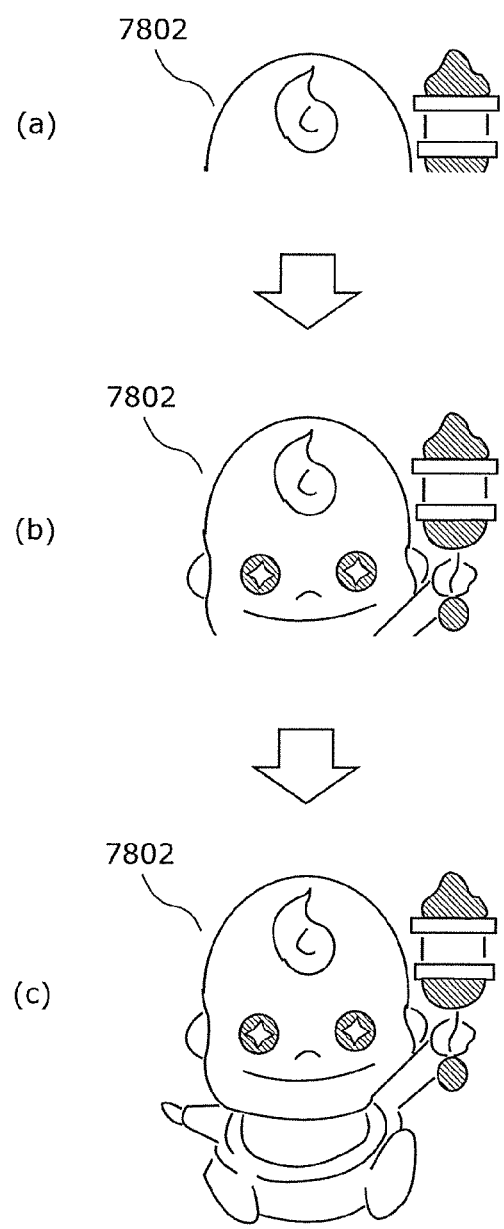
FIG. 64 illustrates in (a) to (c) an example of a display effect of a UI displayed on the display device in Embodiment 6.

FIG. 64 illustrates an example of a display effect of a UI displayed on the display device in Embodiment 6. FIG. 65 illustrates an example of the speed of a display effect according to the positional relationship between the network-connected microphone device and a display device in Embodiment 6.

The display device (1510) is a device that itself can determine a current position by, for instance, indoor positioning using a global positioning system (GPS) or WiFi, and the display unit (1511) of the display device (1510) determines the display effect, according to the relationship between the position registered in advance at which the network-connected microphone device (7001) is disposed and the current position of the display device (1510).

Parts (a) to (c) of FIG. 64 illustrate the display effect that the icon (7802) gradually appears on a display screen, as an example of the display effect achieved by the icon (7802) in FIG. 62. The speed of the display effect from the start to the termination of display is defined in a table as shown in FIG. 65, based on a physical positional relationship between the network-connected microphone device (7001) and the display device (1510). For example, if the distance between the network-connected microphone device (7001) and the display device (1510) is 38 km, the display unit (1511) determines that the distance is within the distance indicated by a row (8103) of a column (8101) in FIG. 65, and displays the icon such that the speed of a display effect of the icon (7802) from the start to the termination is 1.5 seconds as indicated in the row (8103) of the column (8102). It should be noted that the display effect may be an effect which makes the icon (7802) displayed gradually clearly, by lowering the transparency of the icon (7802) step by step.

FIG. 66 illustrates an example of a display effect according to an elapsed time from an event is notified to the display device (1510) in Embodiment 6. After a notification which includes the message (7803) as illustrated on the UI (7801) in FIG. 62 is given to the display device (1510), the display unit (1511) changes the elapsed time message (7804), according to the notified elapsed time, and also changes the transparency of the icon (7802). Accordingly, a user can be intuitively informed of the elapsed time from the notification, only by glancing at the UI (7801) on the display screen of the display device (1510). For example, if an elapsed time from the notification is 45 minutes, the elapsed time is in a range indicated by an elapsed time row (8203) of a column (8201) in FIG. 66, and thus the transparency will be 10%, and the icon is displayed on the display device (1510) in a slightly transparent state. Furthermore, along the elapse of time from a notification, the transparency gradually increases, and thus the icon (7802) changes into a transparent state.

[Processing Flow of UI Update Notification]

Figure 67:
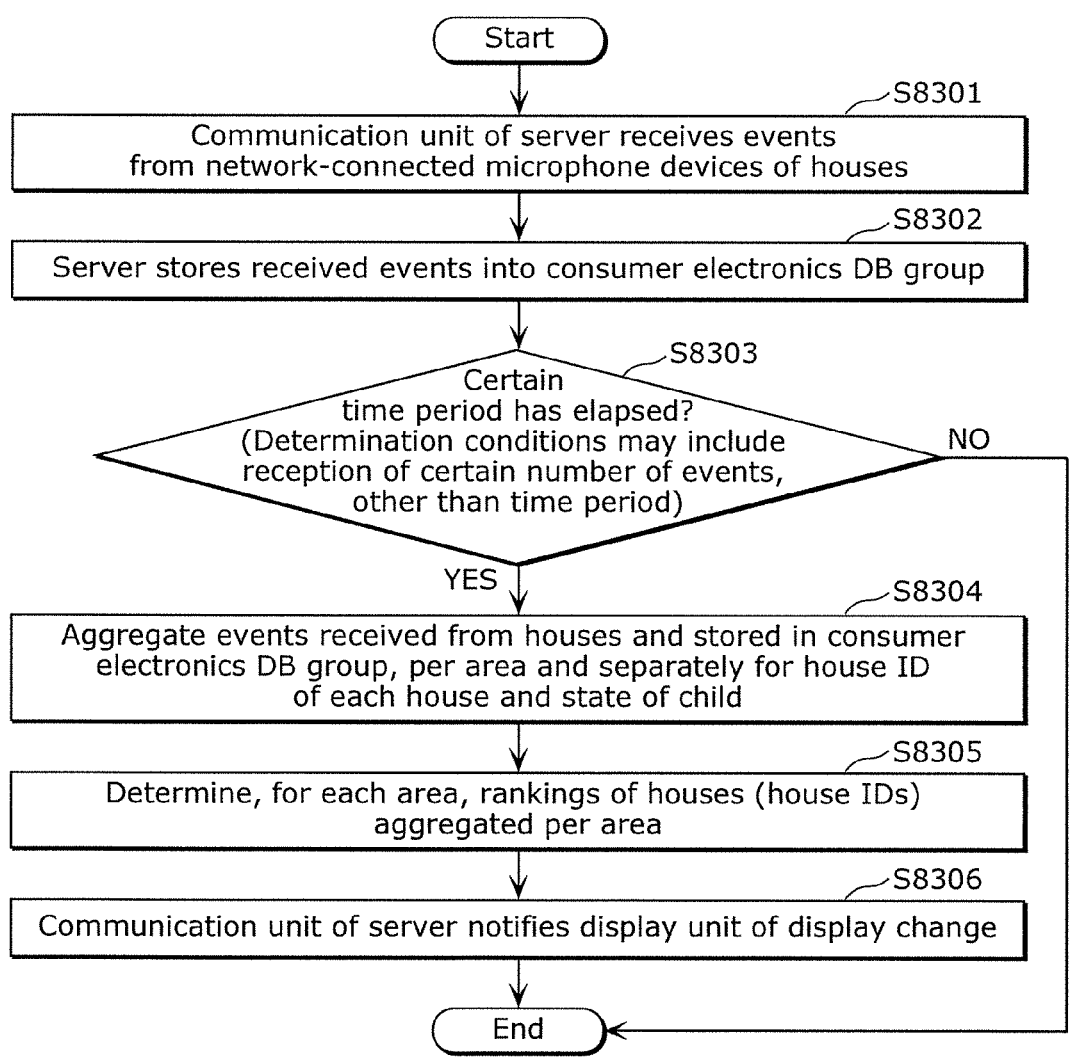
FIG. 67 is a flowchart illustrating an example of processing by a server to notify a display device 1 of an update of a UI, in Embodiment 6.

FIG. 67 is a flowchart illustrating an example of processing by the server to notify a display device 1 of the update of a UI, in Embodiment 6.

First, in S8301, a communication unit (1101) of the server (1100) receives events from the network-connected microphone devices (7001) of houses.

Next, in S8302, the server (1100) stores the received events into a consumer-electronics DB group (1103). A description is later given of an example of an event stored in the consumer-electronics DB group (1103), with reference to FIG. 68.

Next, in S8303, the server (1100) determines whether a certain time period has elapsed. It should be noted that determination conditions include reception of a fixed number of events, other than a time period.

Next, in S8304, the server (1100) aggregates events received from houses and stored in the consumer-electronics DB group (1103) per area and separately for a house ID of each house and a state of a child. A description is later given of an example of the aggregation result.

Next, in S8305, the server (1100) determines, for each area, rankings of houses (house IDs) aggregated in S8304 per area.

Next, in S8306, the communication unit (1101) of the server (1100) notifies the display unit (1511) of a display change. A description is later given of an example of a UI displayed by the display unit (1511) after a change notification is received, with reference to FIG. 70.

[Example of Notified Event]

FIG. 68 illustrates examples of events notified from the network-connected microphone device and stored in the consumer-electronics DB group, in Embodiment 6.

In FIG. 68, a house ID (8201) is a unique value for identifying a house. The house ID (8201) is a value stored in advance in an ID management unit (not illustrated) of the network-connected microphone device (7001) illustrated in FIG. 56A.

A date and time (8202) is a time at which an event is generated by the network-connected microphone device (7001).

A state of a child (8203) indicates a state of a child determined by the network-connected microphone device (7001).

The highest volume (8204) is the highest volume detected by the network-connected microphone device (7001) when collecting a sound, and the sound control processing unit (7203) illustrated in FIG. 56A gives the highest volume to an event notification to the server (1100) when the sound control processing unit (7203) generates the event notification.

A time (8205) indicates a time when the state of a child (8203) continuously occurs, and the sound control processing unit (7203) gives the time to an event notification to the server (1100) when the sound control processing unit (7203) generates the event notification.

A residence area (8206) is a value stored in advance in the ID management unit (not illustrated) of the network-connected microphone device (7001) illustrated in FIG. 56A, and indicates a user's residence area. For example, rows 8207 and 8208 show the same house ID (8201), namely, H000-0001, and thus indicate events transmitted to the server (1100) from the network-connected microphone device (7001) of the same house.

[Example of Result of Aggregating Events]

FIGS. 69A and 69B illustrate examples of results of aggregating events stored in the consumer-electronics DB group of the server, in Embodiment 6. FIG. 69A is a table in which values indicating that the child's state (8203) is crying in houses whose residence area (8206) illustrated in FIG. 68 is Osaka are aggregated. A row 8303 indicates aggregation of rows where the house ID (8201) in FIG. 68 is the same and the state of a child (8203) is crying, and the events that are aggregated are rows 8207 and 8208 in FIG. 68.

The highest volume (8301) in FIG. 69A indicates 72 dB which is the greatest value of the highest volumes (8204) in the rows 8207 and 8208 in FIG. 68, which is set as a result of aggregation. A time (8302) shows 464 seconds which indicate a total value of the times (8205) in the rows 8207 and 8208 in FIG. 68, which is set as a result of aggregation.

Furthermore, in a highest volume ranking (8304) illustrated in FIG. 69B, houses are ranked in descending order of the highest volume (8301). Similarly, houses are ranked in descending order of the time (8302) in a time ranking (8305).

It should be noted that the states (8203) of the child are collected from the child's states illustrated in FIG. 61.

[Example of UI after UI Change is Notified]

Figure 70:
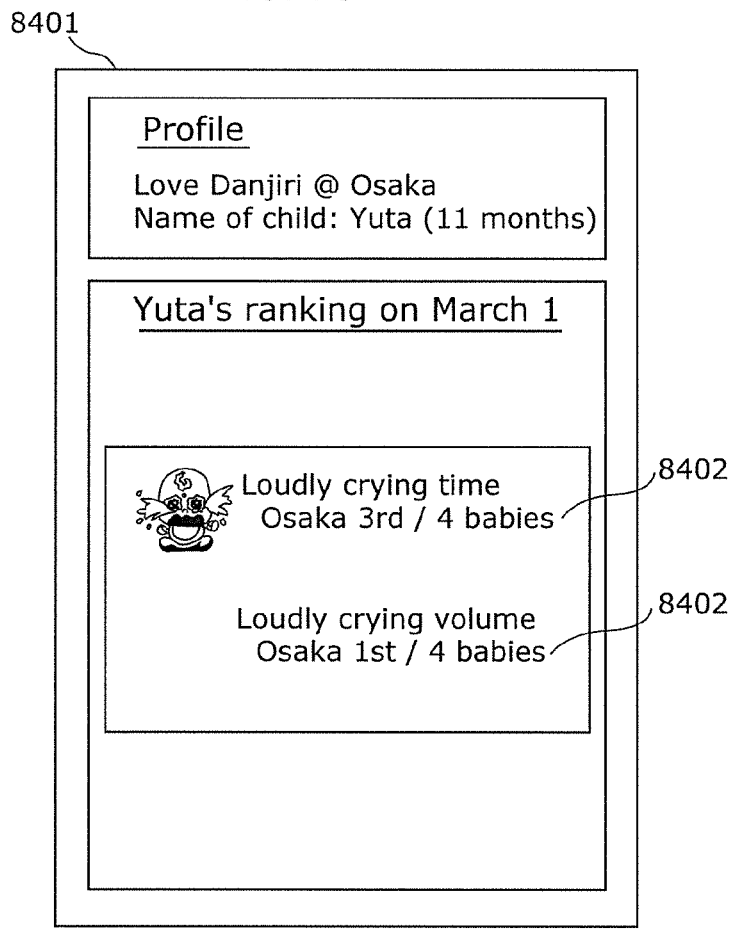
FIG. 70 illustrates an example of a UI which the display device displays after a UI change is notified from the server, in Embodiment 6.

FIG. 70 illustrates an example of a UI which the display device displays after a UI change is notified from a server, in Embodiment 6.

In FIG. 70, a UI (8401) on the entire display screen of the display device (1510) shows a UI for the house ID (8201), namely, H000-0001, and is displayed when a user operates to display a ranking screen, for instance. A loudly crying volume ranking message (8403) is displayed based on the highest volume ranking (8304) illustrated in FIG. 69B, and a loudly crying time ranking message (8402) is displayed based on the time ranking (8305) illustrated in FIG. 69B.

Advantageous Effect

As described above, according to the information providing method according to the present embodiment, a fourth consumer electronics device having a speech recognition function among the consumer electronics devices collects sound, to perform speech recognition; and determines a state of an object, based on the sound recognized by the speech recognition. Accordingly, display information for the display device to display, in the specific display format, display content according to the state of the object can be generated, thus allowing the display device to provide display in the specific display format on the display screen.

Thus, the information providing method can provide even various types of voluminous information in a readily viewable manner.

Embodiment 7

The present embodiment describes a service provided by the server described in the above embodiments.

Figure 71A:
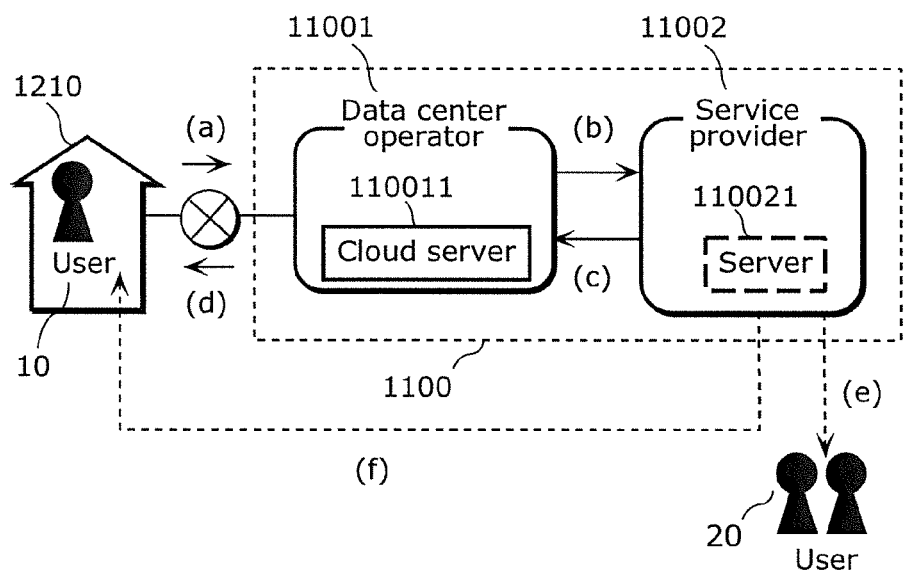
FIG. 71A illustrates an example of an aspect in which a service is provided using the server.
Figure 71B:
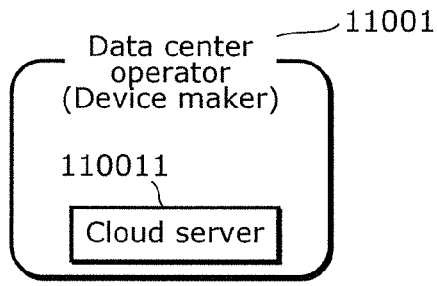
FIG. 71B illustrates an example of an aspect in which a service is provided using the server.
Figure 71C:
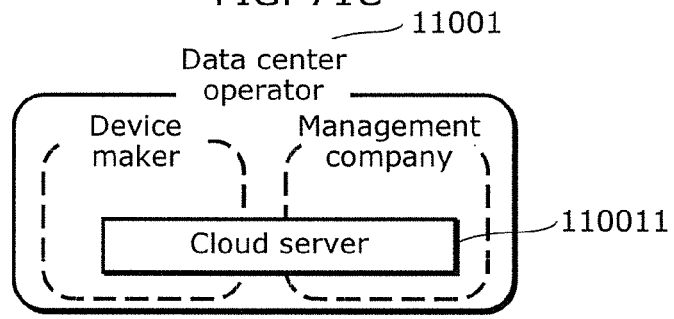
FIG. 71C illustrates an example of an aspect in which a service is provided using the server.

FIGS. 71A to 71C illustrate examples of aspects in which a service is provided using the server.

FIG. 71A illustrates a configuration in which a server (1100) includes a cloud server (110011) managed by a data center operator (11001), and a server (110021) managed by a service provider.

The cloud server (110011) is a virtual server which cooperates with various devices via the Internet. The cloud server (110011) mainly manages, for instance, voluminous data (big data) which is difficult to be handled using a typical database management tool or the like. The data center operator (11001) manages data and the cloud server (111), and operates a data center which manages data and the cloud server (111), for instance. A detailed description is later given of the service provided by the data center operator (110). Here, the data center operator (110) is not limited to a company which, for instance, merely manages data and operates the cloud server (11001).

For example, if a device manufacturer which develops and manufactures one of the consumer electronics devices described in Embodiments 1 to 6 also manages, for instance, data and the cloud server (11001), the device manufacturer corresponds to the data center operator (110) (FIG. 71B).

In addition, the data center operator (11001) is not limited to one company. For example, when the device manufacturer and another management company cooperate in or share data management and operation of the cloud server (111), both or one of the device manufacturer and the management company corresponds to the data center operator (11001) (FIG. 71C).

A service provider (11002) has the server (110021). Examples of the server (110021) here include a private PC and a device which operates using a gateway device, and the size of the server (110021) does not matter. The service provider may not have the server (110021).

The following describes a flow of information in the above service.

For example, event information on an event of a consumer electronics device which has occurred in a house A (1210) illustrated in FIG. 71A (which may be instead a house B (1211) illustrated in FIG. 1 although not illustrated in FIG. 71A) is transmitted to the cloud server (110011) (arrow (a) in FIG. 71A).

The cloud server (110011) receives and stores the event information of the consumer electronics device transmitted from the house A (1210) or the house B (1211), for example.

Next, the cloud server (110011) of the data center operator (11001) provides the service provider (11002) with the stored event information of the consumer electronics device in fixed units. Here, the unit may be a unit which allows organization of event information stored by the data center operator so as to provide the information to the service provider (110021) or a unit requested by the service provider (11002). Although the unit is stated as a fixed unit, the unit may not be fixed, and the amount of information to be provided may vary according to a state.

Event information of a consumer electronics device provided by the data center operator (11001) to the service provider (11002) is stored, as necessary, in the server (110021) which the service provider (11002) has (arrow (b) in FIG. 71A).

Then, the service provider (11002) organizes information to obtain information suitable for a service to be provided to a user (for example, information on a shared screen), based on the type of event information on a consumer electronics device or frequency information, and provides the information to the user.

A user who is to be provided with information may be a user (10) who uses one or more consumer electronics devices or a user (20) who is outside the house.

A service may be provided to a user by, for example, directly providing information from the service provider (11002) to a user without returning the information back to the cloud server (11001) again (arrow (e) or (f) in FIG. 71A).

Also, a service may be provided to a user by, for example, returning information back to the cloud server (11001) of the data center operator (110) again (arrows (c) and (d) in FIG. 71A). In addition, the cloud server (111) of the data center operator (110) may organize information to obtain information suitable for a service to be provided to a user, based on the type of event information of a consumer electronics device or frequency information.

The following describes types of services.

(Service Type 1: Own Data Center Type)

Figure 72:
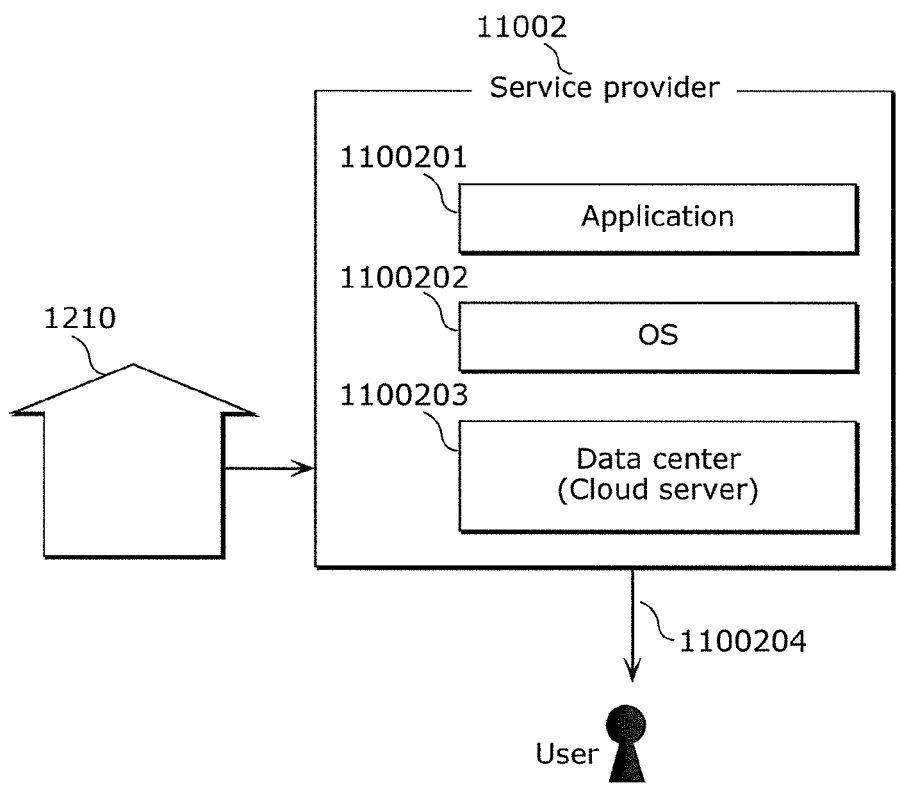
FIG. 72 illustrates an example of a type of a service.

FIG. 72 illustrates an example of a type of a service.

Specifically, FIG. 72 illustrates service type 1 (own data center type). In this type, the service provider (11002) obtains information from the house A (1210) illustrated in FIG. 72 (which may be instead the house B in FIG. 1 (1211) although not illustrated in FIG. 55), and provides a service to a user.

In this type, the service provider (11002) has a function as a data center operator. In other words, the service provider has the cloud server (110011) which manages big data. Thus, a data center operator is not present.

In this type, the service provider (11002) manages and operates a data center (1100203) (the cloud server (110011)). The service provider (11002) manages an operating system (OS) (1100202) and an application (1100201). The service provider (120) provides a service using the OS (1100202) and the application (1100201) which are managed by the service provider (120) (1100204).

(Service Type 2: IaaS-Based Type)

Figure 73:
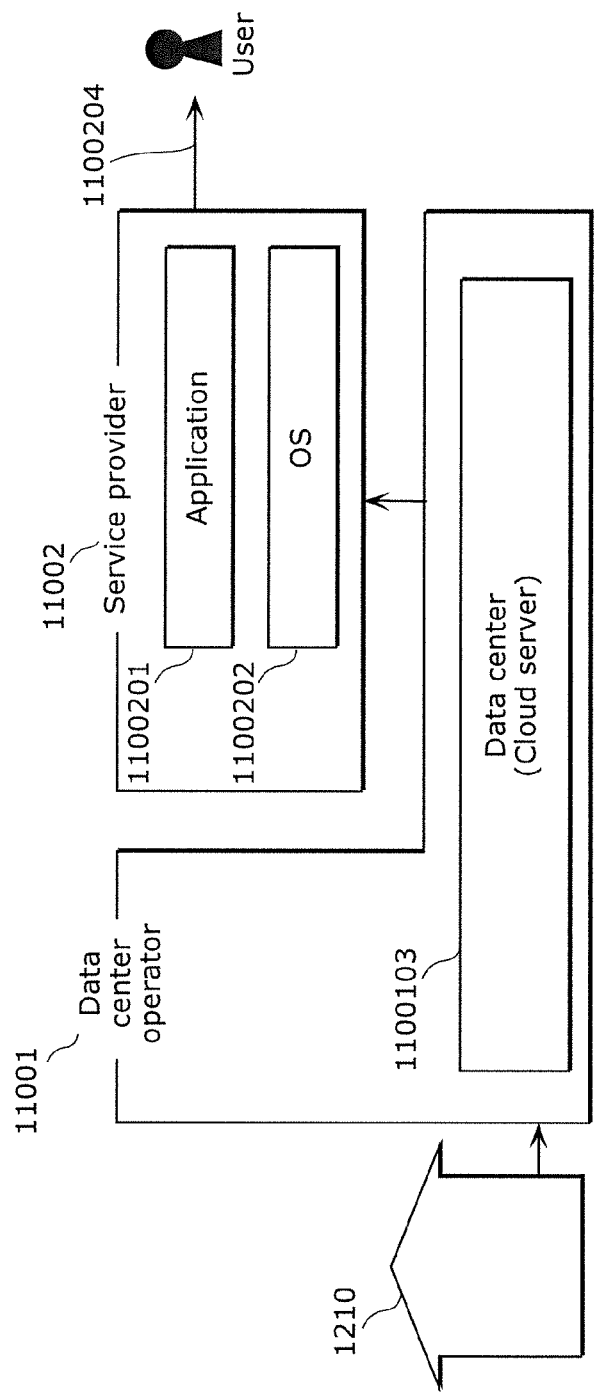
FIG. 73 illustrates an example of a type of a service.

FIG. 73 illustrates an example of a type of a service.

Specifically, FIG. 73 illustrates service type 2 (IaaS-based type).

Here, the term IaaS stands for Infrastructure as a Service, which is a cloud service providing model for providing, as a service via the Internet, an infrastructure itself for building and running a computer system.

In this type, the data center operator manages and operates a data center (1100103) (cloud server (11001)). In addition, the service provider (11002) manages the OS (1100202) and the application (1100201). The service provider (11002) provides a service using the OS (1100202) and the application (1100201) managed by the service provider (11002) (1100204).

(Service Type 3: PaaS-Based Type)

Figure 74:
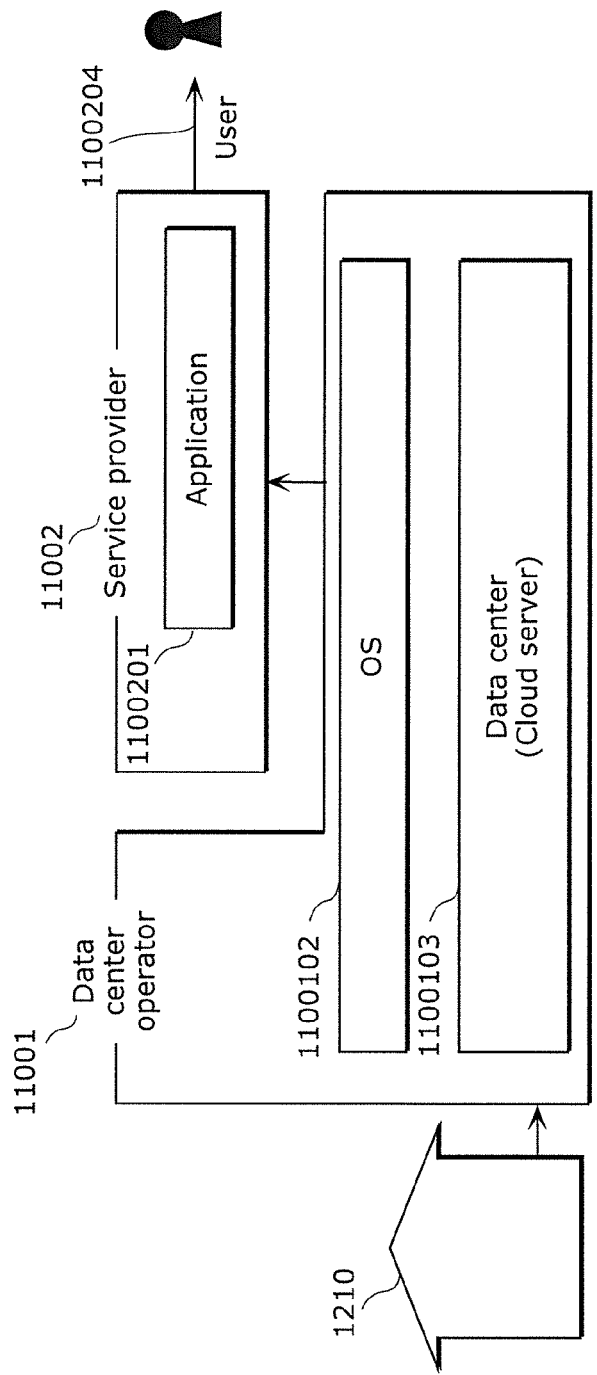
FIG. 74 illustrates an example of a type of a service.

FIG. 74 illustrates an example of a type of a service.

Specifically, FIG. 74 illustrates service type 3 (PaaS-based type). Here, the term PaaS stands for Platform as a Service, which is a cloud service providing model for providing, as a service via the Internet, a platform serving as a base for creating and running software.

In this type, the data center operator (11001) manages an OS (1100102), and operates and manages the data center (1100103) (the cloud server (110011)). In addition, the service provider (11002) manages the application (1100201). The service provider (11002) provides a service using the OS (1100102) managed by the data center operator, and the application (1100201) managed by the service provider (11002) (1100204).

(Service Type 4: SaaS-Based Type)

Figure 75:
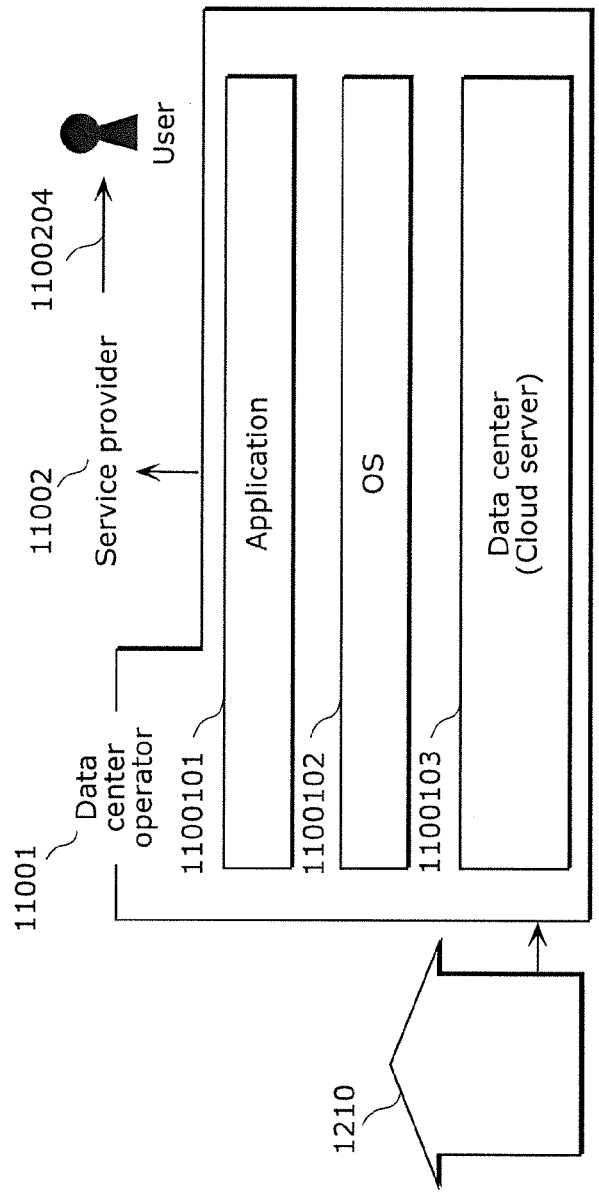
FIG. 75 illustrates an example of a type of a service.

FIG. 75 illustrates an example of a type of a service.

Specifically, FIG. 75 illustrates service type 4 (SaaS-based type). Here, the term SaaS stands for Software as a Service. For example, SaaS is a cloud service providing model having a function of allowing a company or a person (user) not having a data center (cloud server) to use an application provided by a platform provider having a data center (cloud server), via a network such as the Internet.

In this type, the data center operator (11001) manages an application (1100101) and the OS (1100102), and operates and manages the data center (1100103) (the cloud server (110011)). In addition, the service provider 120 provides a service using the OS (1100102) and the application (1100101) managed by the data center operator (11001) (1100204).

In any of the above types, the service provider 11002 is considered to be the provider of services. For example, the service provider or the data center operator may develop, for instance, operating systems, applications, or big data databases by itself or may outsource the development thereof to a third party.

As described above, the information providing method according to the present disclosure can provide even various types of voluminous information in a readily viewable manner. In addition, the information providing method can provide various types of voluminous information on consumer electronics devices and others connected to the network in plural houses, on a portal screen readily viewable for a user in each house according to the purpose of later use.

It should be noted that "consumer electronics and others" in the statement, information on consumer electronics and others connected to the network, may include not only AV consumer electronics devices, such as televisions and recorders and so-called white home appliances such as air conditioners and refrigerators, but also any hardware and software which are connected to a network and can communicate the device's own data, such as beauty care consumer electronics devices, health-care devices, and digital cameras. Thus, a NFC sensor, for instance, which can communicate data by M2M may be included.

It should be noted that in the above embodiments, each of the constituent elements may be constituted by dedicated hardware, or may be obtained by executing a software program suitable for the constituent element. Each constituent element may be obtained by a program execution unit such as a CPU or a processor reading and executing a software program stored in a recording medium such as a hard disk or semiconductor memory.

Although the above is a description of an information providing method and others according to one or more aspects of the present disclosure based on embodiments, the present disclosure is not limited by those embodiments. The one or more aspects of the present disclosure also include various modifications to the embodiments and embodiments that include combinations of the constituent elements in different embodiments, which may be conceived by those skilled in the art, without departing from the principles and spirit of the present disclosure.

INDUSTRIAL APPLICABILITY

Accordingly, compared to the existing information-sharing service such as an SNS on the Internet, the reality and real time nature of information can be enhanced, and thus a service which makes content more enjoyable and attractive can be provided. Furthermore, a message from an information sender can be more easily associated with an event related to the message when information is sent, and thus such a service appears attractive also to the information sender.

REFERENCE SIGNS LIST 1100, 3001 Server
1101, 1512 Communication unit

1102 Display-format determination unit
1103 Consumer electronics DB group
1200 Public network
1201 House A
1211 House B
1251 Consumer electronics icon
1252, 1254, 3030, 4601 House icon
1253 Message
1301 GW 1
1302 GW 2
1401 Consumer electronics device 1
1402 Consumer electronics device 2
1403 Consumer electronics device 3
1404 Consumer electronics device 4
1405 Consumer electronics device 5
1406 Consumer electronics device N
1510 Display device 1
1511 Display unit
3002 Category display size determination unit
3003 Consumer electronics icon display size determination unit
3004 Consumer electronics category DB
3005 Consumer electronics category DB update unit
3011 Category ID
3031 Category display area
3032-3039 Individual category display area
3040 Balloon
4001 Consumer electronics operating-time prediction unit
4002 Display index value calculation unit
4602, 4603, 4604, 4605, 4606 Consumer electronics icon display area
4701 Map image
4702, 4703, 4704 Consumer electronics icon
4705 House icon
4801, 4802, 4901, 4902, 4903 Person icon
5001 Background map image
5002, 5003 User icon
5004, 5005 Background map image
6000 6000B Wireless coaster
6000A Wired coaster
6001 Cup
6002 Weight sensor
6003 Wireless communication unit
6004 ID management unit
6011 Wired communication unit
6020 Information processing unit
6021 USB port
6022 Internet connection unit
6023 Display device
6041 State estimation unit
6042 Time management unit
6043 State DB
6081, 6111 Coffee maker
6082 Current sensor
6083 Wireless communication unit
6091 Current sensor information receiving unit
6092 Maker state estimation unit
6093 Maker state DB
6112 Blender
7001 Network-connected microphone device
7002 Sound generator
7101 Mother
7102 Child
7103 Toy car
7104 Baby bottle
7105 Vacuum cleaner
7201 Microphone sensor
7202 Environment sensor
7203 Sound control processing unit
7204 Speech recognition processing unit
7205 Network communication unit
7206 ID management unit
7801, 7901, 8401 UI
7802 Icon
7803 Message
7804 Elapsed time message
8402 Loudly crying time ranking message
8403 Loudly crying volume ranking message
110011 Cloud server
110021 Server
1100101, 1100201 Application
1100102, 1100202 OS
1100103, 1100203 Data center

The invention claimed is:

1. An information providing method for consumer electronics devices, a display device, and a server, all of which are connected via a network, the information providing method comprising:
  receiving, by the server from the consumer electronics devices, information pieces on the consumer electronics devices;
  filtering, by a processor of the server, according to a purpose of use, the information pieces on the consumer electronics devices received in the receiving, to obtain one or more filtered information pieces, and performing, by the server, processing for generating display information for display, by the display device, in a specific display format which allows the one or more filtered information pieces to be viewed within one display screen; and
  transmitting, by the server, the display information generated in the filtering to the display device,
  wherein the filtering includes:
    aggregating the information pieces on the consumer electronics devices received in the receiving per category, at certain time intervals or when a certain number of the information pieces on the consumer electronics devices is received; and
    calculating display format information indicating the specific display format, using a result of the aggregating, the specific display format including a display size and a display position of each of one or more objects associated with, among the consumer electronics devices, one or more consumer electronics devices including the one or more filtered information pieces,
  in the transmitting, the display information is transmitted to the display device, the display information including the display format information,
  in the receiving, the information pieces on and transmitted by the consumer electronics devices are received when states of the consumer electronics devices change,
  in the aggregating, an operating rate for each of types of the consumer electronics devices is further estimated based on a total number of times the information pieces on the consumer electronics devices is received in the receiving, and
  in the calculating, the display format information is calculated based on the operating rate.

2. The information providing method according to claim 1,
  wherein, in the calculating, the display format information indicating the specific display format is calculated, the specific display format being independent of a size of the display screen of the display device and including the display position and the display size which are a relative display position and a relative display size on the display screen.

3. An information providing method for consumer electronics devices, a display device, and a server, all of which are connected via a network, the information providing method comprising:
receiving, by the server from the consumer electronics devices, information pieces on the consumer electronics devices;
filtering, by a processor of the server, according to a purpose of use, the information pieces on the consumer electronics devices received in the receiving, to obtain one or more filtered information pieces, and performing, by the server, processing for generating display information for display, by the display device, in a specific display format which allows the one or more filtered information pieces to be viewed within one display screen;
transmitting, by the server, the display information generated in the filtering to the display device; and
displaying, by the display device on the display screen of the display device in the specific display format, one or more objects associated with, among the consumer electronics devices, one or more consumer electronics devices including the one or more filtered information pieces, based on the display information transmitted by the server,
wherein, in the receiving, the received information pieces on the consumer electronics devices are stored in a database,
the filtering further includes:
assigning a category ID indicating a category type to each of the information pieces on the consumer electronics devices received in the receiving, and determining a category display priority level indicating a display priority level of the category type and a consumer-electronics display priority level indicating a display priority level of each of the consumer electronics devices, based on the information pieces on the consumer electronics devices received in the receiving and the stored information pieces on the consumer electronics devices,
in the filtering, the processing for generating the display information is performed, the display information including the assigned category ID, the determined category display priority level, and the determined consumer-electronics display priority level, and
in the displaying, based on the display information, one or more consumer electronics devices having an identical category ID among the consumer electronics devices are displayed in a group on the display screen, and an information piece on a consumer electronics device having a category ID given a higher category display priority level is displayed in a larger size on the display screen.

4. The information providing method according to claim 3,
wherein, in the assigning, the category display priority level is determined according to a sum total of frequencies of use of the one or more consumer electronics devices having the identical category ID.

5. The information providing method according to claim 3,
wherein, in the filtering, when a user uses a consumer electronics device a frequency of use of which is equal to or below a frequency of use determined in advance, the category display priority level of a category ID of the consumer electronics device used by the user is temporarily set higher than a predetermined value.

6. The information providing method according to claim 3,
wherein, in the assigning, a category ID indicating an identical category type is assigned to two or more of the consumer electronics devices which are used in a preset time period at a preset frequency of use or more frequently than the preset frequency of use.

7. The information providing method according to claim 3,
wherein, in the displaying, based on the consumer-electronics display priority level, one or more icons representing the one or more consumer electronics devices having the identical category ID are displayed in a group on the display screen, and among the one or more icons representing the one or more consumer electronics devices, an icon associated with a consumer electronics device given a higher consumer-electronics display priority level is further displayed in a larger size.

8. An information providing method for consumer electronics devices, a display device, and a server, all of which are connected via a network, the information providing method comprising:
receiving, by the server from the consumer electronics devices, information pieces on the consumer electronics devices;
filtering, by a processor of the server, according to a purpose of use, the information pieces on the consumer electronics devices received in the receiving, to obtain one or more filtered information pieces, and performing, by the server, processing for generating display information for display, by the display device, in a specific display format which allows the one or more filtered information pieces to be viewed within one display screen;
transmitting, by the server, the display information generated in the filtering to the display device; and
displaying, by the display device on the display screen of the display device in the specific display format, one or more objects associated with, among the consumer electronics devices, one or more consumer electronics devices including the one or more filtered information pieces, based on the display information transmitted by the server,
wherein the filtering further includes:
predicting a consumer-electronics operating time for each of the consumer electronics devices, based on the information pieces on the consumer electronics devices received in the receiving, the consumer-electronics operating time indicating a time period in which the consumer electronics device has operated; and
weighting the consumer-electronics operating time with a user operation time to calculate a display index value for determining a display size and a display position of each of one or more consumer-electronics icons that are the one or more objects associated with the one or more consumer electronics devices including the one or more filtered information pieces, and
in the displaying, based on the display index value transmitted by the server, the display size and the display position of each of the one or more consumer-electronics icons on the display screen are determined, and the one or more consumer-electronics icons are displayed on the display screen.

9. The information providing method according to claim 8,
wherein, in the displaying, an icon indicating that a user operation is performed is displayed near a consumer-electronics icon associated with a consumer electronics device on which the user operation is performed among the one or more consumer-electronics icons.

10. The information providing method according to claim 8,
wherein, in the displaying, the one or more consumer-electronics icons and a person icon selected, in accordance with a display priority level that is predetermined, from among person icons representing users who are display targets, are superimposed on a background image and displayed on the display screen, as the specific display format, and
the display priority level is determined using information pieces pertaining to the users, the information pieces being the information pieces on the consumer electronics devices received in the receiving.

11. The information providing method according to claim 10,
wherein the display priority level is determined using, as the information pieces on the consumer electronics devices, an operating time of each of the consumer electronics devices.

12. The information providing method according to claim 11,
wherein the display priority level is determined using, as the information pieces on the consumer electronics devices, a cumulative operating time of each of the consumer electronics devices.

13. The information providing method according to claim 10,
wherein, in the displaying, the background image is further deformed and displayed to avoid overlapping of the person icons or the consumer-electronics icons.

14. The information providing method according to claim 13,
wherein, in the displaying,
when the consumer-electronics icons displayed are switched after the background image is deformed and displayed, a deformed shape of the background image is further restored to an original shape, and
if consumer-electronics icons superimposed and displayed on the background image in the original shape overlap, the background image is deformed again and displayed.

15. The information providing method according to claim 8,
wherein the background image is a map.

16. An information providing method for consumer electronics devices, a display device, and a server, all of which are connected via a network, the information providing method comprising:
measuring, by a first consumer electronics device, a change in weight of an object, the first consumer electronics device having a weight measuring function and being one of the consumer electronics devices;
transmitting weight information indicating the change in weight measured in the measuring and an identifier for uniquely identifying the first consumer electronics device, to the server via the network;
receiving, by the server from the consumer electronics devices, information pieces on the consumer electronics devices;
filtering, by a processor of the server, according to a purpose of use, the information pieces on the consumer electronics devices received in the receiving, to obtain one or more filtered information pieces, and performing, by the server, processing for generating display information for display, by the display device, in a specific display format which allows the one or more filtered information pieces to be viewed within one display screen;
transmitting, by the server, the display information generated in the filtering to the display device; and
displaying, by the display device on the display screen of the display device in the specific display format, one or more objects associated with, among the consumer electronics devices, one or more consumer electronics devices including the one or more filtered information pieces, based on the display information transmitted by the server,
wherein, in the receiving, the transmitted identifier of the first consumer electronics device and the transmitted weight information are received,
the filtering further includes
estimating, from a change pattern of the received weight information, a state of the object for which the measurement is performed by the first consumer electronics device,
in the filtering, the display information for the display device to display, in the specific display format, display content in accordance with the state of the object estimated in the estimating is generated, and
in the displaying, based on the display information, an avatar of a user in relation to the object is changed in accordance with the display content, among avatars displayed on the display screen.

17. The information providing method according to claim 16,
wherein, in the measuring, a weight of a cup is measured by the cup being placed on the first consumer electronics device, and
in the estimating, whether a user of the first consumer electronics device has placed the cup on the first consumer electronics device or lifted the cup from the first consumer electronics device is estimated, as the state of the object, from the change pattern of the received weight information.

18. The information providing method according to claim 16,
wherein, in the estimating, from the change pattern of the received weight information, the weight of the object used by a user of the first consumer electronics device is estimated,
the displaying further includes
comparing, based on the display information, the estimated weight of the object with images registered in advance according to the weight of the object, and
in the displaying, an image showing the object in relation to the avatar displayed on the display screen is changed to an image according to the weight of the object estimated in the comparing.

19. The information providing method according to claim 16,
wherein, in the measuring, a second consumer electronics device having an electric-current amount measuring function further measures an amount of electric current flowing through a third consumer electronics device, in the transmitting of the weight information, the amount of electric current flowing through the third consumer electronics device measured in the measuring is further transmitted to the server, the displaying further includes disposing based on the display information, near the avatar displayed on the display screen, information indicating the third consumer electronics device which is determined to be used by the second consumer electronics device measuring the amount of electric current, and which is used within a given time difference from when the first consumer electronics device is used, and in the disposing, how far the information indicating the third consumer electronics device is disposed away from the first consumer electronics device is changed according to a difference between an operation time of the third consumer electronics device estimated from the amount of electric current and a time at which the first consumer electronics device is used and which is estimated from the change pattern of the weight information.

* * * * *